United States Patent
Watanabe et al.

(10) Patent No.: US 9,632,861 B1
(45) Date of Patent: Apr. 25, 2017

(54) COMPUTER-IMPLEMENTED METHOD, SYSTEM, AND STORAGE MEDIUM

(71) Applicant: FUJITSU LIMITED, Kawasaki-shi, Kanagawa (JP)

(72) Inventors: Yukihiro Watanabe, Kawasaki (JP); Hiroshi Otsuka, Kawasaki (JP); Masahiro Asaoka, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/378,916

(22) Filed: Dec. 14, 2016

(30) Foreign Application Priority Data

Dec. 16, 2015 (JP) ................................. 2015-245044

(51) Int. Cl.
| | | |
|---|---|---|
| G06F 11/00 | (2006.01) | |
| G06F 11/07 | (2006.01) | |
| H04L 12/24 | (2006.01) | |
| G06F 7/08 | (2006.01) | |

(52) U.S. Cl.
CPC .............. *G06F 11/079* (2013.01); *G06F 7/08* (2013.01); *G06F 11/0709* (2013.01); *G06F 11/0751* (2013.01); *G06F 11/0778* (2013.01); *G06F 11/0787* (2013.01); *H04L 41/069* (2013.01); *H04L 41/0631* (2013.01)

(58) Field of Classification Search
CPC ............. G06F 11/0709; G06F 11/0751; G06F 11/0778; G06F 11/0787; H04L 41/0631; H04L 41/069
See application file for complete search history.

(56) References Cited

U.S. PATENT DOCUMENTS

| | | | | |
|---|---|---|---|---|
| 5,933,590 A | * | 8/1999 | Allen ..................... | H04B 1/745 340/2.9 |
| 5,955,968 A | * | 9/1999 | Bentrott ................. | G08G 1/087 340/7.2 |
| 2011/0161740 A1 | | 6/2011 | Sonoda et al. | |
| 2012/0151282 A1 | * | 6/2012 | Watanabe ............. | G06F 11/076 714/49 |

(Continued)

FOREIGN PATENT DOCUMENTS

| | | |
|---|---|---|
| JP | 2011-138405 | 7/2011 |
| JP | 2012-094049 | 5/2012 |

(Continued)

*Primary Examiner* — Joshua P Lottich
(74) *Attorney, Agent, or Firm* — Fujitsu Patent Center

(57) ABSTRACT

A method includes: acquiring messages output by items in the system, each of messages including an output time; referring to the messages and setting item pairs which combine two items among the items, as target item pairs; determining, for each of the item pairs, a strength of relevancy between the target item pairs based on a co-occurrence probability which indicates that a message is output from one of the target item pair within a prescribed time period before or after the output time of a message output from other of the target item pair; and determining a priority ranking for investigating one or more the items among the items other than a certain item based on the strength of relevancy of each of item pairs, as a response to an input of an investigation ranking determination instruction which designates the certain item among the items as an investigation start position.

15 Claims, 59 Drawing Sheets

(56) References Cited

U.S. PATENT DOCUMENTS

| | | | |
|---|---|---|---|
| 2014/0143625 A1* | 5/2014 | Watanabe | G06F 11/008 714/741 |
| 2014/0149524 A1 | 5/2014 | Watanabe et al. | |
| 2014/0298112 A1 | 10/2014 | Otsuka et al. | |
| 2015/0154062 A1* | 6/2015 | Watanabe | G06F 11/0727 714/26 |
| 2016/0335146 A1* | 11/2016 | Otsuka | G06F 11/079 |

FOREIGN PATENT DOCUMENTS

| | | |
|---|---|---|
| JP | 2014-106851 | 6/2014 |
| JP | 2014-199579 | 10/2014 |

\* cited by examiner

FIG. 6

| TIME | OUTPUT ORIGIN CI | MESSAGE CLASS | MESSAGE CONTENTS |
|---|---|---|---|
| 2012-03-13T10:31:02-09:00 | Web001 | SV0425 | ServerView RAID, 0, 10526, vcsv01, Adapter [172.26.20.23] LSI 1064SASIME-3030 (8): Adapter missing after reboot,FAILURE=SERVER BLADE,MODEL=BX620 S5 |
| 2012-03-13T10:35:28-09:00 | Db001 | PP0099 | machine4:FJSVcsl:A:Rack#0-PCI/DISKBOX#0:SCF:Correctable error count over flow |
| 2012-03-25T21:00:18-09:00 | App002 | SV0188 | Adapter FTS RAID Ctrl SAS 6G 5/6 512MB (D2616) (0): Disk (4) missing after reboot (Server HOST-SERVER),MIB="",SPC="",SVOMHOST="Host-Server",FROM="SERVER_VIEW" |
| ... | ... | ... | ... |

120
121
MESSAGE ID

FIG. 12

| STARTING POINT \ END POINT | Web001 | Web002 | App001 | App002 | ... | DB001 |
|---|---|---|---|---|---|---|
| Web001 | | 0.0<br>0.06 | 0.46<br>0.54 | 0.20<br>0.74 | ... | 0.0<br>0.15 |
| Web002 | 0.0<br>0.06 | | 0.24<br>0.11 | 0.73<br>0.75 | ... | 0.01<br>0.04 |
| App001 | 0.32<br>0.54 | 0.09<br>0.11 | | 0.31<br>0.66 | ... | 0.58<br>0.67 |
| App002 | 0.72<br>0.74 | 0.54<br>0.75 | 0.24<br>0.66 | | ... | 0.06<br>0.07 |
| ⋮ | ⋮ | ⋮ | ⋮ | ⋮ | | ⋮ |
| DB001 | 0.01<br>0.15 | 0.02<br>0.04 | 0.22<br>0.67 | 0.05<br>0.07 | ... | |

| PRIOR MESSAGE | SUBSEQUENT MESSAGE | APPEARANCE FREQUENCY OF PRIOR MESSAGE | APPEARANCE FREQUENCY OF SUBSEQUENT MESSAGES WITHIN CO-OCCURRENCE PERIOD | PRIOR MESSAGE STARTING POINT TYPE CO-OCCURRENCE PROBABILITY |
|---|---|---|---|---|
| Web001_SV1425 | Db001_PP1099 | 421 | 421 | 1.00 |
| Db001_PP1099 | Db002_PP1099 | 421 | 381 | 0.90 |
| Db001_PP1099 | App002_SV1188 | 421 | 56 | 0.13 |
| ⋮ | ⋮ | ⋮ | ⋮ | ⋮ |

FIG. 24

| MESSAGE ID1 | MESSAGE ID2 | MESSAGE ID1 GENERATION FREQUENCY | CO-OCCURRENCE FREQUENCY |
|---|---|---|---|
| web003_SV0115 | Db001_PP0101 | 421 | 402 |
| App002_SV0188 | Db001_PP0099 | 352 | 320 |
| Web001_SV0425 | App002_SV0188 | 158 | 16 |
| ⋮ | ⋮ | ⋮ | ⋮ |

FIG. 28

| GROUP PAIR ID | GROUP 1 | GROUP 2 | GROUP 1 GENERATION FREQUENCY | CO-OCCURRENCE FREQUENCY | CO-OCCURRENCE PROBABILITY |
|---|---|---|---|---|---|
| P0001 | I0002 | D0003 | 251 | 210 | 0.84 |
| ⋮ | ⋮ | ⋮ | ⋮ | ⋮ | ⋮ |
| P1001 | D0003 | D0141 | 152 | 99 | 0.65 |
| ⋮ | ⋮ | ⋮ | ⋮ | ⋮ | ⋮ |
| P2001 | P0001 | P1001 | 107 | 64 | 0.60 |
| ⋮ | ⋮ | ⋮ | ⋮ | ⋮ | ⋮ |

| FAILURE GENERATION CI | App002 | |
|---|---|---|
| INVESTIGATION TARGET | TYPE | SCORE |
| Web001 | INFLUENCE | 0.72 |
| DB001 | CAUSE | 0.39 |
| Web002 | CAUSE | 0.73 |
| App001 | BI-DIRECTIONAL | 0.53 |
| ⋮ | ⋮ | ⋮ |

| INVESTIGATION CI | App002 | | |
|---|---|---|---|
| START POINT CI | END POINT CI | INFLUENCE TYPE | SCORE |
| App002 | Web001 | DIRECTIONAL | 0.72 |
| ⋮ | ⋮ | ⋮ | ⋮ |

| INVESTIGATION CI | App002 | | |
|---|---|---|---|
| START POINT CI | END POINT CI | INFLUENCE TYPE | SCORE |
| Web002 | App002 | DIRECTIONAL | 0.73 |
| ⋮ | ⋮ | ⋮ | ⋮ |

| INVESTIGATION CI | App002 | | |
|---|---|---|---|
| START POINT CI | END POINT CI | INFLUENCE TYPE | SCORE |
| App002 | App001 | NON-DIRECTIONAL | 0.66 |
| ⋮ | ⋮ | ⋮ | ⋮ |

| CI1 | CI2 | PATTERN ID | CO-OCCURRENCE ID | CO-OCCURRENCE PROBABILITY | NUMBER OF TYPES | ACCUMULATED SCORE | CO-OCCURRENCE SCORE (RELATIVE SCORE) |
|---|---|---|---|---|---|---|---|
| App001 | App002 | C0123 | D005 | 0.99 | 2 | 1.84 | 0.23 |
| App001 | App002 | C1204 | D008 | 0.85 | 1 | 0.87 | 0.15 |
| App001 | Web002 | C0031 | D101 | 0.87 | ... | ... | ... |
| ... | ... | ... | ... | ... | ... | ... | ... |

FIG. 53

| C1 | C2 | PATTERN ID | CO-OCCURRENCE ID | GENERATION FREQUENCY | CO-OCCURRENCE PROBABILITY | ACCUMULATED SCORE | CO-OCCURRENCE SCORE (RELATIVE SCORE) |
|---|---|---|---|---|---|---|---|
| App001 | App002 | C0123 | D005 | 102 | 0.99 | 177.5 | 0.94 |
| App001 | App002 | C1204 | D008 | 90 | 0.85 | 67.86 | 0.43 |
| App001 | Web002 | C0031 | D101 | 78 | 0.87 | ... | ... |
| ... | ... | ... | ... | ... | ... | ... | ... |

FIG. 57

| C11 | C12 | PATTERN ID | CO-OCCURRENCE ID | GENERATION FREQUENCY | CO-OCCURRENCE PROBABILITY | NUMBER OF TYPES | TOTAL NUMBER OF GENERATIONS | DEVIATION VALUE OF NUMBER OF TYPES | DEVIATION VALUE OF NUMBER OF GENERATIONS | DEVIATION VALUE OF PROBABILITY | SUM OF DEVIATION VALUES | CO-OCCURRENCE SCORE (RELATIVE SCORE) |
|---|---|---|---|---|---|---|---|---|---|---|---|---|
| App001 | App002 | C0123 | D005 | 102 | 0.99 | 2 | 192 | 36.7 | 71.9 | 68.8 | 178.4 | 0.92 |
| App001 | App002 | C1204 | D008 | 90 | 0.85 | 1 | 78 | 28.3 | 27.5 | 56.3 | 112.1 | 0.05 |
| App001 | Web002 | C0031 | D101 | 78 | 0.87 | ... | ... | ... | ... | ... | ... | ... |
| ... | ... | ... | ... | ... | ... | ... | ... | ... | ... | ... | ... | ... |

# COMPUTER-IMPLEMENTED METHOD, SYSTEM, AND STORAGE MEDIUM

CROSS-REFERENCE TO RELATED APPLICATION

This application is based upon and claims the benefit of priority of the prior Japanese Patent Application No. 2015-245044, filed on Dec. 16, 2015, the entire contents of which are incorporated herein by reference.

FIELD

The embodiments discussed herein relate to a computer-implemented method, a system, and a storage medium.

BACKGROUND

Recently, a large number of servers are configured in information and communication technology systems (referred to simply as "system" below), and many types of processes are executed while the servers are cooperating with each other. When a failure is generated in a system, the cause is isolated and a primary treatment (such as disconnection and the like) is carried out by an operator. For example, when a failure is generated in a system, the operator first identifies the server that represents the generation location of the abnormality. The operator then first analyzes the operating conditions of the identified server and investigates the cause of the abnormality.

When processing a plurality of cooperating servers, the server in which the abnormality was detected and the server that has the cause of the abnormality may be different. If it is possible to judge that the server in which the abnormality was detected is not the cause, the operator investigates the servers having relevancy with the server in which the abnormality was detected to identify the cause of the abnormality. Because one server has relevancy with a large-number of servers in a large-scale system, the number of servers that have relevancy with the server in which the abnormality was detected is huge and the investigation of the cause of the abnormality desires much time.

Moreover, due to the spread of outsourcing of system operation management, the number of cases in which the system is executed without knowing the strict behavior of the configuration items of the system is increasing. As a result, the black-box effect has become more and more apparent as a harmful effect in operation management. That is, there is very little information on processing executed by apparatuses in the system and a longer amount of time is desired to isolate the cause when a failure is generated.

Accordingly, various techniques related to increasing the speed of failure measures and suppressing the generation of failures have been considered. For example, a failure location estimation system has been considered in which the range of the cause of an abnormality in a network is narrowed down to assist problem investigation in the system. Moreover, an incident management system has been considered in which, when a plurality of failure messages are output due to one system failure, the related failure messages can be collected and handled. Further, an information processor apparatus has been considered that is capable of improving the filtering accuracy of failure messages. A detection device has even been considered in which useful information is detected when suppressing the occurrences of failures.

Japanese Laid-Open Patent Publication No. 2011-138405, Japanese Laid-Open Patent Publication No. 2012-94049, Japanese Laid-Open Patent Publication No. 2014-106851, and Japanese Laid-Open Patent Publication No. 2014-199579 are known as examples of the prior art.

SUMMARY

According to an aspect of the invention, a compute-implemented method includes: acquiring, from a system to be monitored, a plurality of messages output by a plurality of configuration items in the system, each of the plurality of messages including an output time; referring to the plurality of messages and setting a plurality of configuration item pairs which combine two configuration items among the plurality of configuration items, as target configuration item pairs; first determining, for each of the plurality of configuration item pairs, a strength of relevancy between the target configuration item pairs based on a first co-occurrence probability which indicates a probability that a message is output from one configuration item of the target configuration item pair within a prescribed time period before or after the output time of a message output from the other configuration item of the target configuration item pair; and second determining, by a processor, a priority ranking for investigating one or more the configuration items among the plurality of configuration items other than a certain configuration item based on the strength of relevancy of each of the plurality of configuration item pairs, as a response to an input of an investigation ranking determination instruction which designates the certain configuration item among the plurality of configuration items as an investigation start position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an example of a message DB;

FIG. 12 illustrates an example of an inter-CI co-occurrence score storage unit;

FIG. 19 illustrates an example of a prior message starting point-type co-occurrence probability table;

FIG. 24 illustrates an example of a message co-occurrence frequency table;

FIG. 28 illustrates an example of a group co-occurrence probability table;

FIG. 42 illustrates an example of an investigation target candidate list.

FIG. 44 illustrates an example of an entry list used in the influence adjacent CI calculation processing;

FIG. 46 illustrates an example of an entry list used in the influenced adjacent CI calculation processing;

FIG. 48 illustrates an example of an entry list used in the bi-directional influence adjacent CI calculation processing;

FIG. 50 illustrates an example of a CI pair generation table according to a third embodiment;

FIG. 53 illustrates an example of a CI pair generation table according to a fourth embodiment;

FIG. 57 illustrates an example of a CI pair generation table according to the fifth embodiment;

DESCRIPTION OF EMBODIMENTS

When narrowing down the range of the causes of an abnormality in a network, system configuration items (CI) that are the cause of the abnormality may fall outside of the range of the investigation if the range is narrowed too much. As a result, configuration items that are even slightly relevant to the configuration items that generated the abnormality are included in the range of the investigation. Consequently, a large number of configuration items subjected to the investigation may be present even if the investigation targets are narrowed down by relevancy. In this case, a large amount of time may be desired until the cause of the failure is found when investigating all of the configuration items.

Accordingly, the cause of the failure may be effectively identified if the investigation is carried out in order from the configuration elements having a higher likelihood of having the cause of the failure. However, it is difficult to quickly identify causes in the prior art without suitably evaluating the likelihood of having the cause of the failure among a plurality of configuration items within the range that is the cause of the abnormality.

In one aspect, an object of the present embodiment is to present a priority ranking for investigating configuration items.

Hereinbelow, the present embodiment will be explained with reference to the drawings. The embodiments may be carried out by combining a plurality of embodiments without contradicting each other.

First Embodiment

The following is an explanation of a first embodiment.

Figure 1:
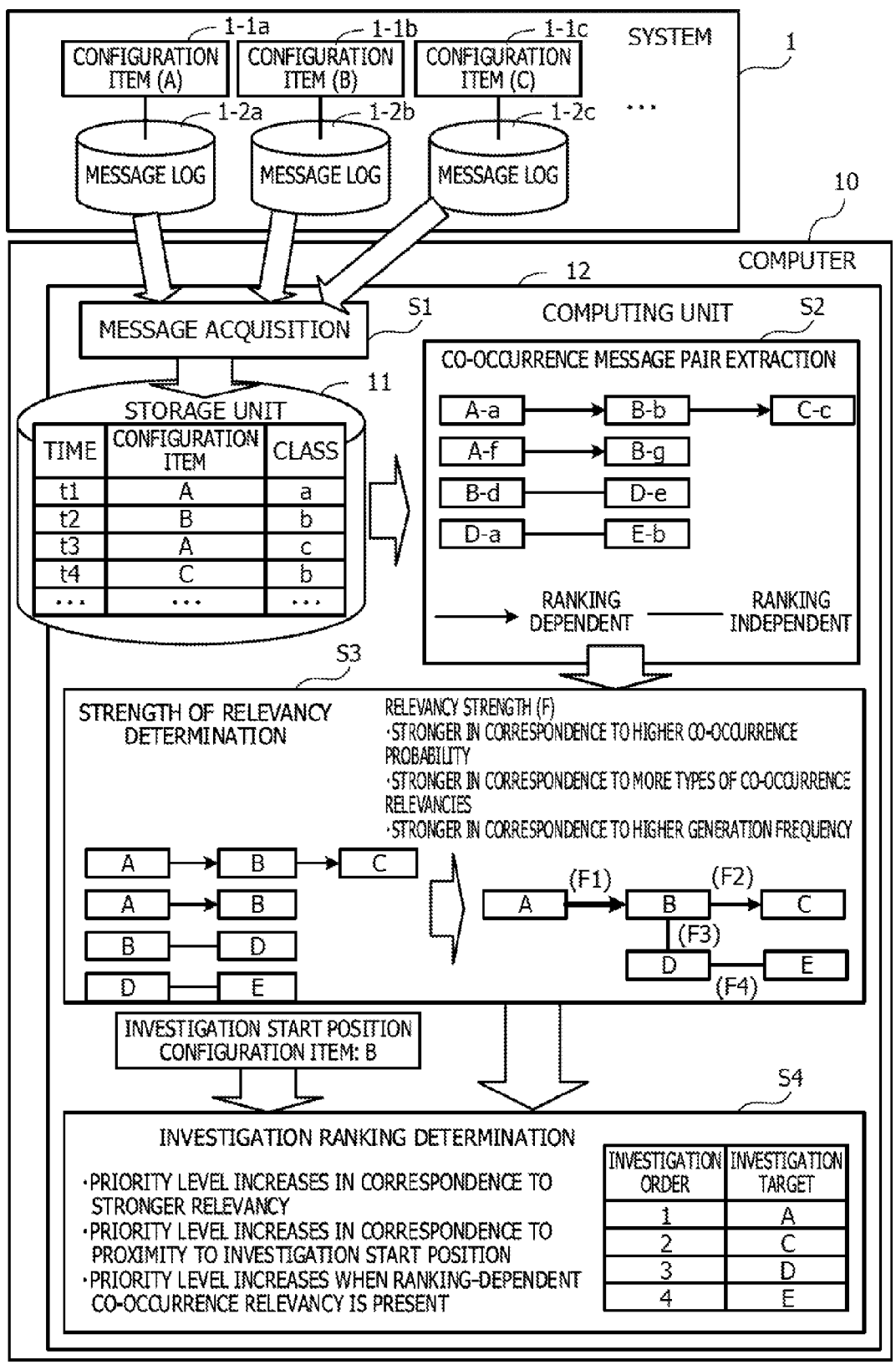
FIG. 1 illustrates an example of a functional configuration of a device according to a first embodiment.

FIG. 1 illustrates an example of a functional configuration of a device according to a first embodiment. A computer 10 monitors a system 1. The monitored system 1 has a plurality of configuration items 1-1a, 1-1b, 1-1c, . . . . The plurality of configuration items 1-1a, 1-1b, 1-1c, . . . are abbreviated as configuration items 1-1a, 1-1b, 1-1c in the following explanation. Other configuration items omitted from the description are subjected to the same processing described below as the configuration items 1-1a, 1-1b, 1-1c. The configuration items 1-1a, 1-1b, 1-1c each output a message when predetermined phenomena occur. Time information indicating the output time is applied to the output messages. The configuration items 1-1a, 1-1b, 1-1c accumulate the messages having time information assigned thereto as message logs 1-2a, 1-2b, 1-2c. The configuration items 1-1a, 1-1b, 1-1c are apparatuses within the system 1 or software resources operating on the computers that configure the system 1. The configuration items 1-1a, 1-1b, 1-1c output messages when a predetermined phenomenon occurs such as when an error occurs or when a user is authorized.

The computer 10 has a storage unit 11 and a computing unit 12. The storage unit 11 stores the messages output by the plurality of configuration items 1-1a, 1-1b, 1-1c.

The computing unit 12 periodically acquires the messages output by the plurality of configuration items 1-1a, 1-1b, 1-1c in the system 1 from the message logs 1-2a, 1-2b, 1-2c (step S1). The computing unit 12 stores the acquired messages in the storage unit 11.

Thereafter, the computing unit 12 periodically refers to the messages in the storage unit 11 and sets, as target configuration item pairs, a plurality of configuration item pairs formed by combining two configuration items among the plurality of configuration items, and determines the strength of the relevancy between the target configuration item pairs. The determination of the strength of relevancy is calculated, for example, based on a co-occurrence probability which indicates the probability that a message is output from one configuration item within a certain time period before or after an output time of a message output from the other configuration item among the target configuration item pair.

The determination of the strength of relevancy is carried out according to the following procedure, for example.

First, the computing unit 12 creates a plurality of message groups configured by messages that share the configuration item that output the messages and the class of message. Next, the computing unit 12 creates a plurality of pairs of message groups having different output origins from the plurality of message groups. The computing unit 12 calculates, for each created pair of message groups, a co-occurrence probability which indicates the probability that a message belonging to one of the message groups among the pair is output within a certain time period before or after the output time of a message belonging to the other message group of the same pair. The computing unit 12 then extracts pairs of message groups having co-occurrence probabilities equal to or higher than a threshold, as co-occurrence message pairs (step S2).

Next, the computing unit 12 determines the strength of relevancy between the target configuration item pairs based on the co-occurrence probability of the co-occurrence message pair that is a set of message groups each having configuration items that configure the target configuration item pair as the output origin (step S3). For example, the computing unit 12 evaluates the strength of relevancy of the target configuration item pair that is the output origin of the co-occurrence message pair as greater in correspondence to a higher co-occurrence probability of the co-occurrence message pair.

Thereafter, when an investigation ranking determination instruction which specifies the configuration item of the investigation start position is received, the computing unit 12 determines a priority ranking (investigation ranking) for investigating configuration items other than the configuration item of the investigation start position (step S4).

For example, the computing unit 12 determines, as an investigation target configuration item, a configuration item that can be reached by tracing the relevancy of a configuration item pair having a relevancy strength equal to or greater than a predetermined value from the configuration item of the investigation start position. Next, the computing unit 12 calculates a priority level for investigation for each of the investigation target configuration items, based on the strength of relevancy for the relevancy traced from the configuration item of the investigation start position to the investigation target configuration item. For example, when the strength of relevancy is a value in a range from 0 to 1, the computing unit 12 multiplies the strength of relevancy for each relevancy traced from the configuration item of the investigation start position to the investigation target configuration item and sets the priority level of the applicable investigation target configuration item. Consequently, the investigation priority level for the investigation target configuration item increases in correspondence to a higher strength of relevancy, and the investigation priority level for the investigation target configuration item increases in correspondence to a closer relationship with the configuration item of the investigation start position. The computing unit 12 then determines the investigation ranking in accordance with the investigation priority level for each of the investigation target configuration items.

According to the computer 10, when, for example, an investigation ranking determination instruction is received that designates the configuration item in which the failure occurred, the investigation ranking of the configuration items is determined when investigating the cause or the influence range of the failure. As a result, the operator is able to preferentially investigate the configuration items having a higher likelihood of being the cause of the failure from among a large number of configuration items, and is able to efficiently carry out the investigation. That is, the influencing range of the failure is quickly identified and the failure can be dealt with quickly by preferentially investigating the configuration items having a higher likelihood of being influenced by the failure.

The output ranking of the messages is not considered when extracting the co-occurrence message pair in the above explanation. Therefore, the extraction of a co-occurrence relationship is realized which takes into account the possibility that time information assigned to the messages by the configuration items 1-1a, 1-1b, 1-1c, . . . is incorrect and the possibility that the output order of the messages based on the time information applied to the messages is different from the actual output order of the messages.

There may be a plurality of co-occurrence message pairs that are sets of message groups for which a configuration item that configures the target configuration item pair is the output origin. In this case, the computing unit 12, for example, determines the strength of relevancy between target configuration item pairs based on the highest co-occurrence probability of each of the co-occurrence message pairs. As a result, relevancies between target configuration item pairs that are the output origins of the co-occurrence message pairs having a high co-occurrence probability are not overlooked when tracing the relevancy of the configuration item pair having a strength of relevancy equal to or greater than a predetermined value from the configuration item of the investigation start position. Consequently, the omission of configuration items having a high degree of importance as investigation targets can be suppressed.

Moreover, the computing unit 12 may increase the strength of relevancy in correspondence to a larger number of types of co-occurrence relationships (number of co-occurrence message pairs) in which the configuration item pairs are the output origin when determining the strength of relevance. For example, the computing unit 12 may determine the strength of relevancy between the target configuration item pair based on the total value of co-occurrence probabilities of each of the co-occurrence message pairs when there are a plurality of co-occurrence message pairs that are sets of message groups each having configuration items that configure the target configuration item pair as the output origin. The strength of relevancy increases in correspondence to a larger number of types of co-occurrence relationships by totaling the co-occurrence probabilities of the plurality of co-occurrence message pairs. As a result, the accuracy of the strength of relevancy is improved.

Moreover, the computing unit 12 may determine the strength of relevancy by using the frequency of the generation of co-occurrences between messages (co-occurrence generation frequency). The co-occurrence generation frequency of the configuration item pairs signifies the frequency in which a message belonging to one message group is output within a time period before or after the output time of a message belonging to the other message group among a co-occurrences message pair in which the configuration items that configure the target configuration item pair thereof are the output origins. For example, the computing unit 12 determines the strength of relevancy between the target configuration item pair based on the co-occurrence generation frequency and the co-occurrence probability of the co-occurrence message pair that is a set of message groups each having configuration items that configure the target configuration item pair as the output origin. At this time, the computing unit 12 increases the strength of relevancy in correspondence to a higher co-occurrence generation frequency. As a result, the accuracy of the strength of relevancy is improved.

Furthermore, the computing unit 12 may determine the strength of relevancy by combining the co-occurrence probability, the number of types of co-occurrence relationships, and the co-occurrence generation frequency. As a result, the accuracy of the strength of relevancy can be improved due to the increase in the number of indexes for evaluating the strength of relevancy.

The computing unit 12 may extract a ranking-dependent co-occurrence message pair and a ranking-independent co-occurrence message pair when extracting the co-occurrence message pairs. A ranking-dependent co-occurrence message pair is a set of two message groups in which the co-occurrence probability of a message belonging to one of the message groups being output within a certain time period after the output of a message belonging to the other message group, is equal to or greater than a threshold. A ranking-independent co-occurrence message pair is a set of two message groups in which the co-occurrence probability of a message belonging to one of the message groups being output within a certain time period before or after the output of a message belonging to the other message group, is equal to or greater than a threshold. At this time, the computing unit 12, for example, calculates a directional strength of relevancy based on the ranking-dependent co-occurrence message pair and a non-directional strength of relevancy based on the ranking-independent co-occurrence message pair for each of the plurality of configuration item pairs. The computing unit 12 then, for example, applies a higher weight to the directional strength of relevancy than the non-directional strength of relevancy and calculates a priority level for investigation. The computing unit 12 sets a weight of "1.0" for the directional strength of relevancy and a weight of "0.8" for the non-directional strength of relevancy, for example. By using the weighting, the priority level is increased for message pairs having a ranking-dependent co-occurrence relationship. As a result, the order of investigation can be suitably determined.

As described above, the strength of relevancy between any two configuration items is calculated regardless of whether communication is present between the configuration items by analyzing the co-occurrence relationship of messages output as a result of the operations of the configuration item in the first embodiment. For example, the strength of relevancy increases in correspondence to a higher co-occurrence probability, increases in correspondence to a larger number of types of co-occurrence relationships, and increases in correspondence to a higher co-occurrence generation frequency.

For example, when a message of a class "b" is issued by a configuration item 1-1$b$ referred to as "B" with a high probability after a message of a class "a" is issued from a configuration item 1-1$a$ referred to as "A" in the system 1, there is a relevancy between the configuration item 1-1$a$ and the configuration item 1-1$b$. In the example in FIG. 1, a message of a class "g" is further issued by the configuration item 1-1$b$ with a high probability after a message of the class "f" is issued by the configuration item 1-1$a$ between the configuration item 1-1$a$ and the configuration item 1-1$b$. In this way, there are a large number of types of co-occurrence relationships between the configuration item 1-1$a$ and the configuration item 1-1$b$. As a result, the strength of relevancy between the configuration item 1-1$a$ and the configuration item 1-1$b$ is judged to be stronger.

A suitable investigation ranking is determined by calculating the priority level of the investigation target configuration item based on this type of strength of relevancy and determining the investigation ranking based on the priority level. By determining a suitable investigation ranking, the investigation can be carried out efficiently due to the operator proceeding with the investigation of a failure and the like in order according to the investigation ranking. Consequently for example, the cause of the failure can be quickly identified.

When the computer 10 has an automatic investigation function for investigating causes of failures, the automatic investigation may be carried out in accordance with the investigation ranking. For example, the computer 10 may execute a diagnostic program for configuration items to be investigated on the system 1 in the order following the determined investigation ranking. As a result, the cause of the failure can be identified quickly and the load on the system 1 can be reduced by not running the diagnostic program on configuration items having a low possibility of being the cause of the failure.

Moreover, a relationship that is not understood from the analysis of communication packets between configuration items is detected according to the first embodiment. For example, there is a possibility that two configuration items accessing a shared resource may have a high relevancy even without communication between the two configuration items. When calculating the strength of relevancy from communication packets between configuration items, the relevancy between two configuration items that access a shared resource but do not communicate with each other is not detected. In contrast, because the strength of relevancy is determined from the co-occurrence relationship of messages output by the configuration items 1-1a, 1-1b, 1-1c, . . . in the first embodiment, the strength of relevancy can be calculated correctly if there is a direct relevancy even between configuration items that do not communicate with each other.

The computing unit 12 depicted in FIG. 1 is run, for example, by a processor of the computer 10. Further, the storage unit 11, for example, is realized by a memory or a storage device of the computer 10.

Second Embodiment

The following is an explanation of a second embodiment. The second embodiment is a more detailed embodiment of the functions of the computer 10 depicted in the first embodiment.

Figure 2:
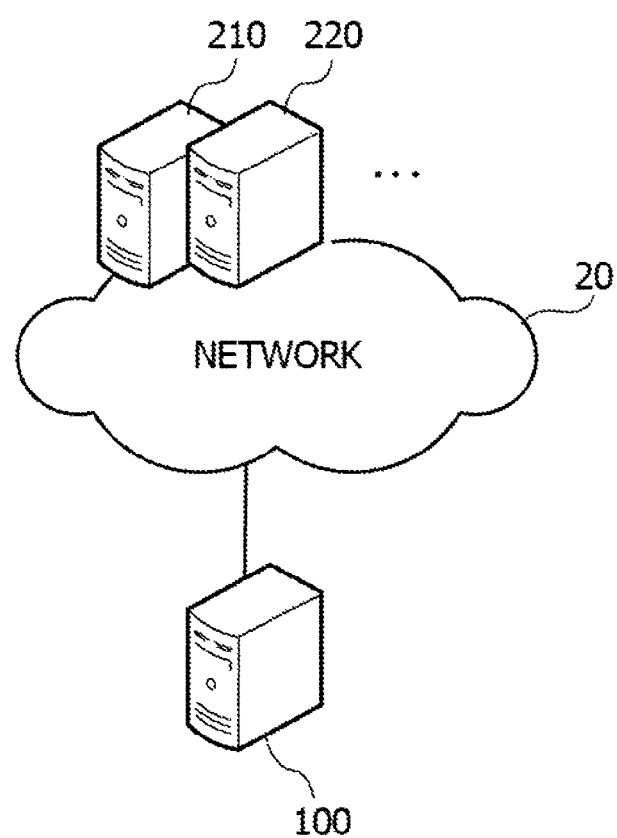
FIG. 2 illustrates an example of a system configuration according to a second embodiment.

FIG. 2 illustrates an example of a system configuration according to the second embodiment. A plurality of managed machines 210, 220, . . . are coupled to a management server 100 over a network 20 in the second embodiment. Various types of server software for realizing functions such as a web server, an application server, a database (DB) server and the like are loaded into the managed machines 210, 220, . . . . The managed machines 210, 220, . . . function as various types of servers such as web servers, application servers, and DB servers. The plurality of managed machines 210, 220, . . . are abbreviated as managed machines 210, 220 in the following explanation. The processing of the managed machines omitted from the description is the same as the processing of the managed machines 210, 220.

For example, one or a plurality of virtual machines (VM) are activated by a hypervisor in the managed machines 210, 220. The virtual machines in the managed machines 210, 220 function as various types of servers. Therefore, one managed machine may have a plurality of server functions. The VMs for executing the server functions in the managed machines 210, 220 are simply referred to as "servers".

The management server 100 monitors the actions of the servers in the managed machines 210, 220 and detects the generation of abnormalities. Moreover, the management server 100 collects histories of messages generated by the servers from the servers in the managed machines 210, 220. The management server 100 then learns the relevancies between the servers based on the collected histories of the messages. The management server 100 learns the strength of the relevancies, and when an abnormality is detected in any of the servers, outputs a list of the other servers to be investigated and applies a priority ranking for the investigation.

Figure 3:
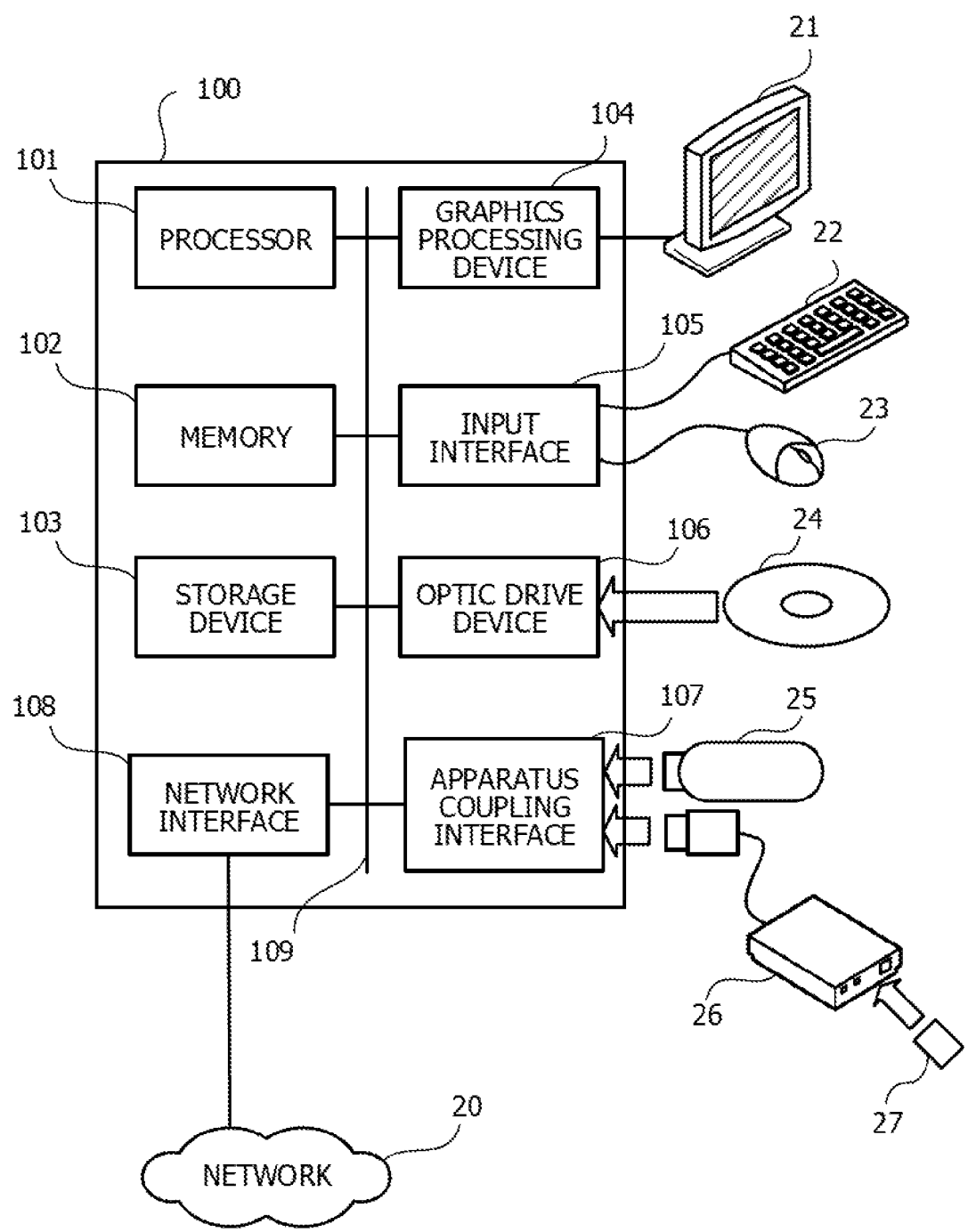
FIG. 3 illustrates an example of a hardware configuration for a management server.

FIG. 3 illustrates an example of a hardware configuration for a management server. The entire device of the management server 100 is controlled by a processor 101. The processor 101 is coupled to a memory 102 and a plurality of peripheral devices via a bus 109. The processor 101 may be a multiprocessor. The processor 101 is, for example, a central processing unit (CPU), a micro processing unit (MPU), or a digital signal processor (DSP). At least a portion of the functions realized by the processor 101 executing programs may be realized by an electronic circuit such as an application specific integrated circuit (ASIC) or a programmable logic device (PLD).

The memory 102 is used as a main storage device in the management server 100. Programs of an operating system (OS) executed by the processor 101, and at least a portion of application programs are temporarily stored in the memory 102. Various types of data used for processing by the processor 101 are stored in the memory 102. For example, a volatile semiconductor storage device such as a random access memory (RAM) is used as the memory 102.

A storage device 103, a graphic processing device 104, an input interface 105, an optic drive device 106, an apparatus coupling interface 107, and a network interface 108 represent examples of peripheral apparatuses coupled to the bus 109.

The storage device 103 electronically or magnetically writes and reads data to and from a storage medium housed therein. The storage device 103 is used as an auxiliary storage device of the management server 100. OS programs, application programs, and various types of data are stored in the storage device 103. A hard disk drive (HDD) or a solid state drive (SSD), for example, may be used as the storage device 103.

The graphic processing unit 104 is coupled to a monitor 21. The graphic processing unit 104 displays images on the screen of the monitor 21 according to commands from the processor 101. A display device using a cathode ray tube (CRT) and a liquid crystal display device are examples of the monitor 21.

The input interface 105 is coupled to a keyboard 22 and a mouse 23. The input interface 105 transmits signals sent from the keyboard 22 or the mouse 23 to the processor 101. The mouse 23 is an example of a pointing device and other pointing devices may be used. Other examples of pointing devices include a touch panel, a tablet, a touch pad, a track ball and the like.

The optical drive device 106 uses a laser beam and the like to read data recorded on an optical disk 24. The optical disk 24 is a portable recording medium with recorded data that can be read using optical reflection. A digital versatile disc (DVD), a DVD-RAM, a compact disc read only memory (CD-ROM), and a CD-R (recordable)/RW (rewritable) are examples of the optical disk 24.

The apparatus coupling interface 107 is a communication interface for coupling peripheral apparatuses to the management server 100. For example, a memory device 25 or a memory reader/writer 26 is coupled to the apparatus coupling interface. The memory device 25 is a recording medium having loaded therein a function for communicating with the apparatus coupling interface 107. The memory reader/writer 26 is a device for writing data onto a memory card 27 or reading data from the memory card 27. The memory card 27 is a card-like recording medium.

The network interface 108 is coupled to the network 20. The network interface 108 sends and receives data to and from another computer or a communication apparatus via the network 20.

Processing functions according to the second embodiment are implemented according to the hardware configuration explained above. The managed machines 210, 220 may also be realized with the same hardware as the management server 100. The devices depicted in the first embodiment may also be realized with the same hardware as that of the management server 100 depicted in FIG. 3.

The management server 100 realizes the processing functions of the second embodiment by executing programs stored, for example, in a computer-readable recording medium. The programs that describe the processing contents to be executed by the management server 100 may be previously recorded on various recording mediums. For example, programs executed by the management server 100 may be stored in the storage device 103. The processor 101 loads at least a portion of the programs in the storage device 103 into the memory 102 and executes the programs. The programs executed by the management server 100 may also be recorded on a portable recording medium such as the optical disk 24, the memory device 25, or the memory card 27. Programs stored in the portable recording medium may be executable, for example, after being installed in the memory 103 based on control by the processor 101. The processor 101 may also read and execute the programs directly from the portable recording medium.

The second embodiment is carried out by the system and the hardware of the abovementioned configurations. For example, when a failure is generated in the managed machines 210, 220, the management server 100 presents a range to be investigated by the operator and an order of priority of the elements in the range to the operator.

Figure 4:
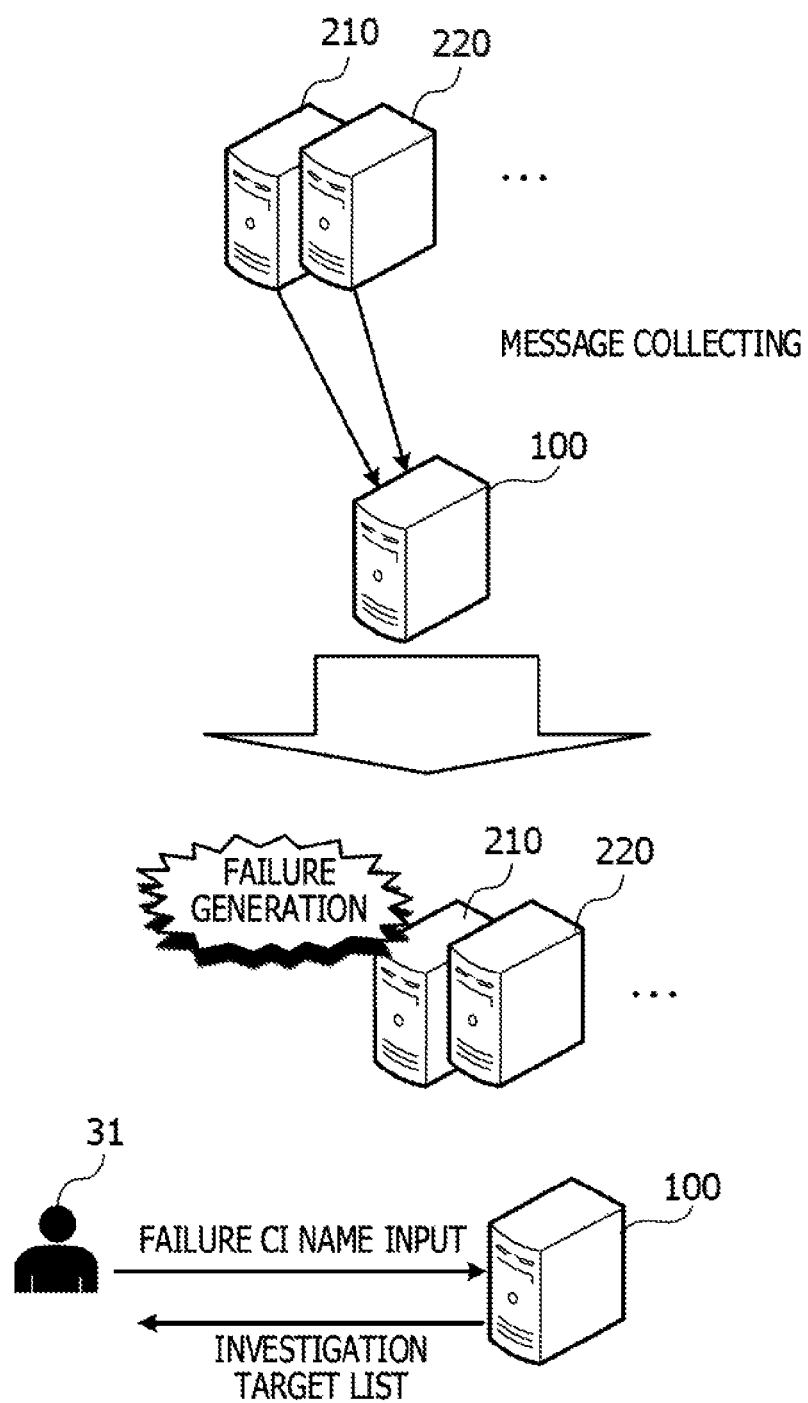
FIG. 4 illustrates an example of a usage of the management server.

FIG. 4 illustrates an example of a usage of the management server. For example, the management server 100 manages the configuration of the entire system with a configuration management database (CMDB). The configuration of the system is managed in units of CIs in the CMDB. The management server 100 collects messages generated in each CI from the managed machines 210, 220. The management server 100 then analyzes the strength of relevancy between the CIs based on the co-occurrence relationship of the messages between the CIs. The analysis is carried out periodically based on, for example, messages from normal operation periods. The analysis may also be carried out when a failure is generated.

When a failure is generated in any of the CIs, an operator 31, for example, inputs the CI name of the CI where the failure occurred in the management server 100. The management server 100 then traces the relevant CIs from the input CI name and outputs an investigation target list indicating the CIs to be investigated. The CIs included in the investigation target list, for example, are ranked according to the strength of relevancy with the CI in which the failure was generated.

As a result, the candidates to be investigated are quickly narrowed down and a priority ranking for the investigation is presented when investigating the time the failure was generated, the range of the influence of the failure, and the cause. Consequently, the investigation work can be performed quickly and the time desired to recover from the occurrence of the failure can be shortened.

Figure 5:
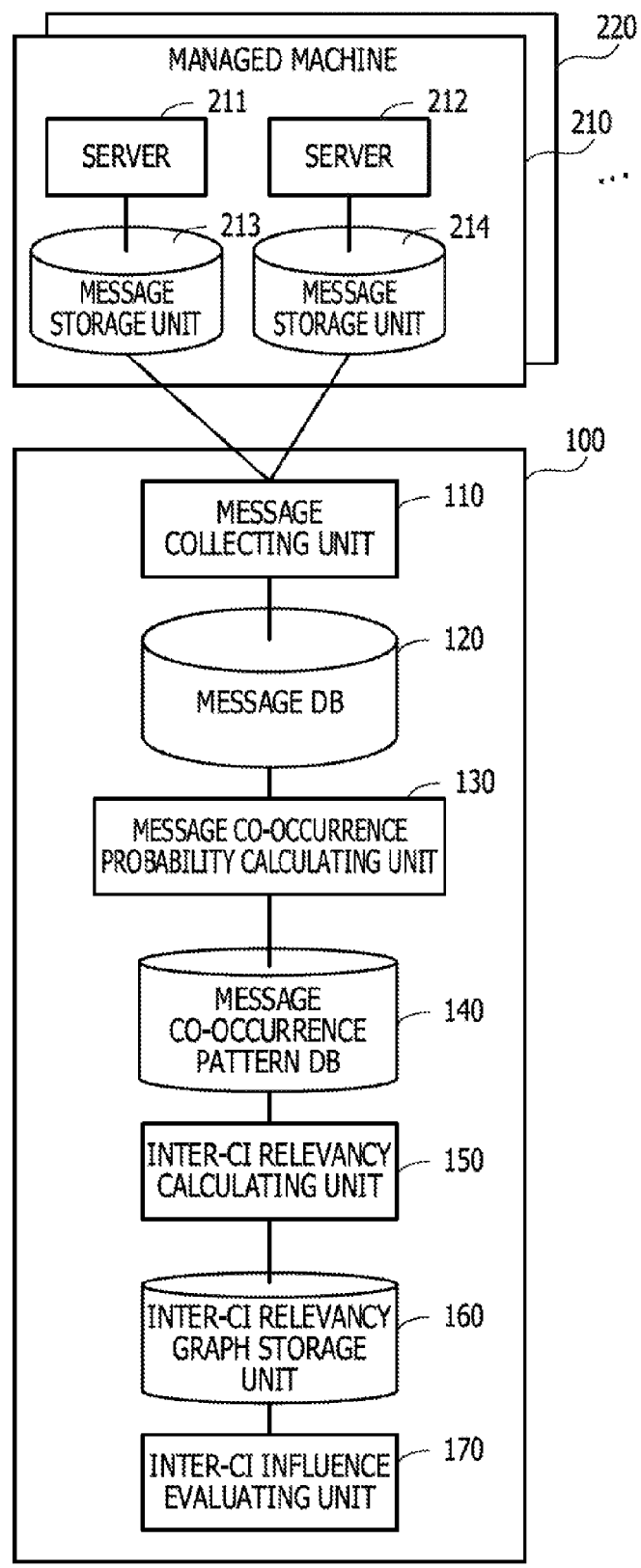
FIG. 5 is a block diagram illustrating the functions of a managed machine and a management server.

FIG. 5 is a block diagram illustrating the functions of a managed machine and a management server. A plurality of servers 211, 212, for example, are included in the managed machine 210. The servers 211, 212 are realized by VM for example. The servers 211, 212 store messages generated during the course of processing in message storage units 213, 214 as a history. The other managed machines 220, . . . have the same functions as the managed machine 210. The plurality of managed machines 210, 220, . . . are abbreviated as managed machines 210, 220 in the following explanation as mentioned above.

The management server 100 has a message collecting unit 110, a message DB 120, a message co-occurrence probability calculating unit 130, a message co-occurrence pattern DB 140, an inter-CI relevancy calculating unit 150, an inter-CI relevancy graph storage unit 160, and an inter-CI influence evaluating unit 170.

The message collecting unit 110 collects messages from the managed machines 210, 220. The message collecting unit 110 stores the collected messages in the message DB 120.

The message DB 120 stores the messages of the CIs of the servers 211, 212. For example, messages from different CIs are stored in chronological order based on the generation time of the particular message in the message DB 120. A portion of the storage region of the storage device 103, for example, is used as the message DB 120.

The message co-occurrence probability calculating unit 130 calculates the co-occurrence probability between messages having predetermined attributes based on the messages in the message DB 120. The attributes of the messages are specified as the output origin CI of the message and the message class. That is, a plurality of messages of the same class and output from the same output origin CI are messages of the same attributes. The message co-occurrence probability calculating unit 130 then calculates the co-occurrence probability of a message having a certain attribute and a message having another attribute and judges messages applicable to two attributes in which the co-occurrence probability is equal to or above a threshold as co-occurrence messages. For example, the message co-occurrence probability calculating unit 130 separates a ranking-dependent co-occurrence message that considers the ranking in which the messages were generated, from a ranking-independent co-occurrence message which does not consider the ranking in which the messages were generated. The message co-occurrence probability calculating unit 130 then stores a linkage pattern of linked co-occurring messages as a co-occurrence pattern in the message co-occurrence pattern DB 140.

The message co-occurrence pattern DB 140 stores the co-occurrence patterns of the messages. A portion of the storage region of the memory 102 or the storage device 103 is used, for example, as the message co-occurrence pattern DB 140.

The inter-CI relevancy calculating unit 150 calculates the relevancy between CIs based on the message co-occurrence patterns. The inter-CI relevancy calculating unit 150 judges, for example, that relevancy is demonstrated among output origin CIs of messages with attributes that configure the message co-occurrence pattern. The inter-CI relevancy calculating unit 150 calculates relevancy based on the probability of a co-occurrence relationship, the number of types of co-occurrence relationships, and the generation frequency of the co-occurrence relationships for the relationships among relevant CIs. The inter-CI relevancy calculating unit 150 creates inter-CI relevancy graph information which depicts inter-CI relevancy graphs based on the calculated relevancies. The inter-CI relevancy graphs are graphs which depict the relevancy between CIs with objects that represent CIs and a line coupling the relevant objects. The inter-CI relevancy calculating unit 150 then stores the information depicting the inter-CI relevancy graphs in the inter-CI relevancy graph storage unit 160.

The inter-CI relevancy graph storage unit 160 stores information depicting the inter-CI relevancy graphs. A portion of the storage region of the storage device 103, for example, is used as the inter-CI relevancy graph storage unit 160.

The inter-CI influence evaluating unit 170 creates an investigation target CI list which depicts a list of CIs to be investigated for treating the generated failure when the CI name of the CI where the failure occurred is input. The inter-CI influence evaluating unit 170 calculates a priority level for investigation of the CIs to be investigated. The inter-CI influence evaluating unit 170 then creates the investigation target CI list in which the CIs to be investigated are arranged in order of the higher priority level. The inter-CI influence evaluating unit 170 displays the created investigation target CI list on the monitor 21, for example.

The line coupling the elements depicted in FIG. 5 depicts a portion of a communication path and communication paths other than the communication path depicted in FIG. 5 may be set. The functions of the elements depicted in FIG. 5 are implemented, for example, by program modules corresponding to each of the elements being executed by a computer.

The elements depicted in FIG. 5 will be described below.

FIG. 6 is an example of a message DB. A message management table 121 is provided in the message DB 120. The message management table 121 is provided with the fields of "Time", "Output origin CI", "Message class", and "Message contents". The generation time of each message is set in the "Time" field. The name of the CI that output the message is set in the "Output origin CI" field. The class of the output message is set in the "Message class" field. The contents of the output message is set in the "Message contents" field. The combination of the output origin CI and the message class depicted in the message management table 121 indicates the message attributes corresponding to the message. A set of the values of the output origin CI and the message class for each attribute serves as a message ID which depicts the messages belonging to that attribute.

The message co-occurrence probability is derived by the message co-occurrence probability calculating unit 130 based on the information of the messages stored in the message DB 120 in this way. The message co-occurrence pattern is then created based on the message co-occurrence probability.

Figure 7:
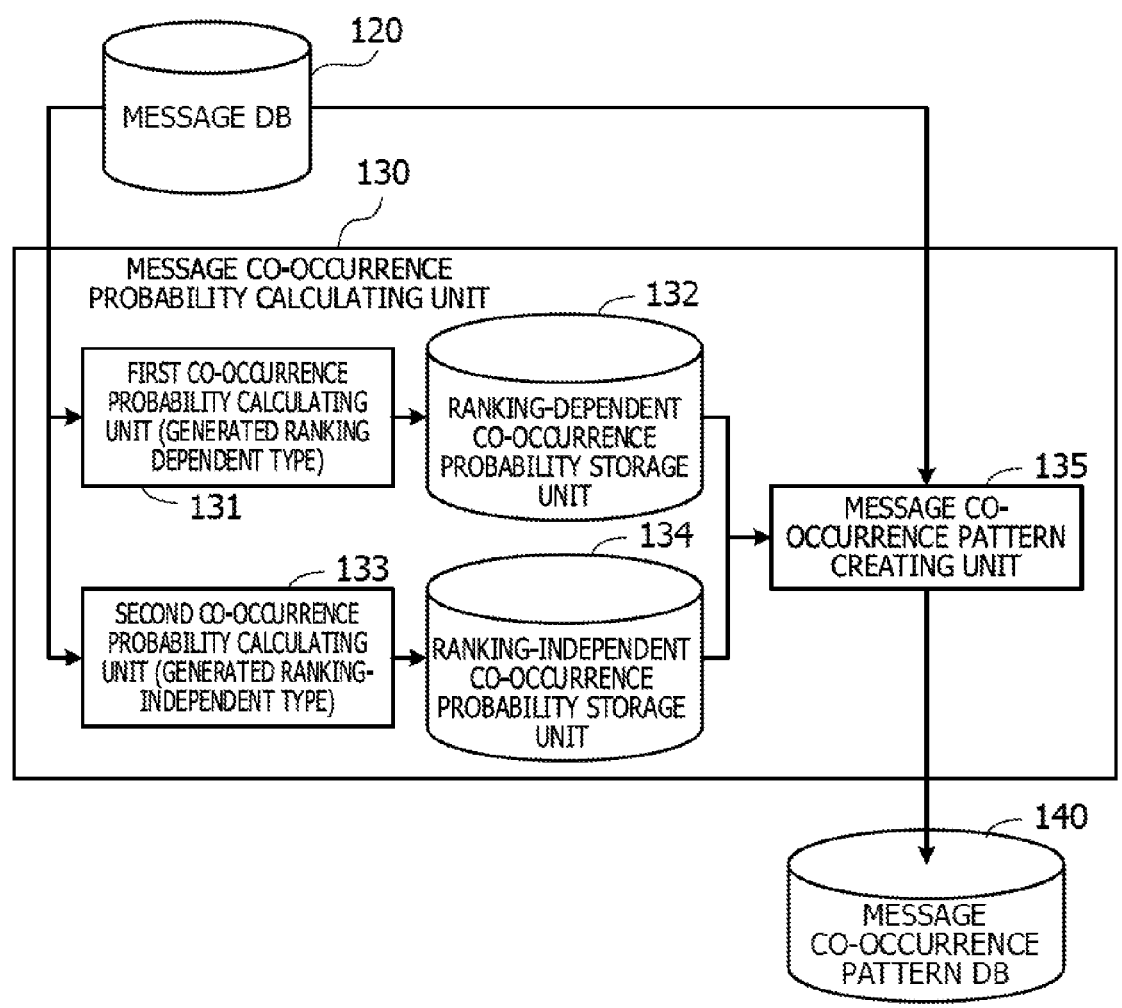
FIG. 7 is a block diagram illustrating functions of a message co-occurrence probability calculating unit.

FIG. 7 is a block diagram illustrating functions of the message co-occurrence probability calculating unit. The message co-occurrence probability calculating unit 130 has a first co-occurrence probability calculating unit 131, a ranking-dependent co-occurrence probability storage unit 132, a second co-occurrence probability calculating unit 133, a ranking-independent co-occurrence probability storage unit 134, and a message co-occurrence pattern creating unit 135.

The first co-occurrence probability calculating unit 131 calculates the message co-occurrence probabilities of generated ranking-dependent type messages (ranking-dependent co-occurrence probability). For example, the first co-occurrence probability calculating unit 131 designates a message having a specific message ID as a prior message, and a message having another message ID as a subsequent message. The first co-occurrence probability calculating unit 131 then calculates, as the ranking-dependent co-occurrence probability, the probability that the subsequent message was output within a predetermined time period after the prior message was output. The first co-occurrence probability calculating unit 131 calculates the ranking-dependent co-occurrence probabilities when all of the messages of the message IDs are prior messages. The first co-occurrence probability calculating unit 131 then stores the calculated ranking-dependent co-occurrence probabilities in the ranking-dependent co-occurrence probability storage unit 132.

The ranking-dependent co-occurrence probability storage unit 132 stores the ranking-dependent co-occurrence probabilities among the messages of the generated ranking-dependent types. A portion of a storage region in the memory 102, for example, is used as the ranking-dependent co-occurrence probability storage unit 132.

The second co-occurrence probability calculating unit 133 calculates the message co-occurrence probabilities of generated ranking-independent type messages (ranking-independent co-occurrence probability). For example, the second co-occurrence probability calculating unit 133 calculates, as the ranking-independent co-occurrence probability, the probability that a message of one message ID was output within a predetermined time period after a message of the other message ID is output for each pair of two message IDs. The second co-occurrence probability calculating unit 133 calculates the ranking-independent co-occurrence probabilities for pairs of all of the message IDs. The second co-occurrence probability calculating unit 133 then stores the calculated ranking-independent co-occurrence probabilities in the ranking-independent co-occurrence probability storage unit 134.

The ranking-independent co-occurrence probability storage unit 134 stores the ranking-independent co-occurrence probabilities among the messages of the generated ranking-independent types. A portion of a storage region in the memory 102, for example, is used as the ranking-independent co-occurrence probability storage unit 134.

The message co-occurrence pattern creating unit 135 creates a message co-occurrence pattern which indicates a combination of two or more messages having a high possibility of being generated in a linked manner based on the ranking-dependent co-occurrence probability and the ranking-independent co-occurrence probability for each pair of message IDs. The message co-occurrence pattern creating unit 135 stores the created message co-occurrence patterns in the message co-occurrence pattern DB 140.

Next, examples of the ranking-dependent co-occurrence probability storage unit 132 and the ranking-independent co-occurrence probability storage unit 134 will be explained with reference to FIGS. 8 and 9.

Figure 8:
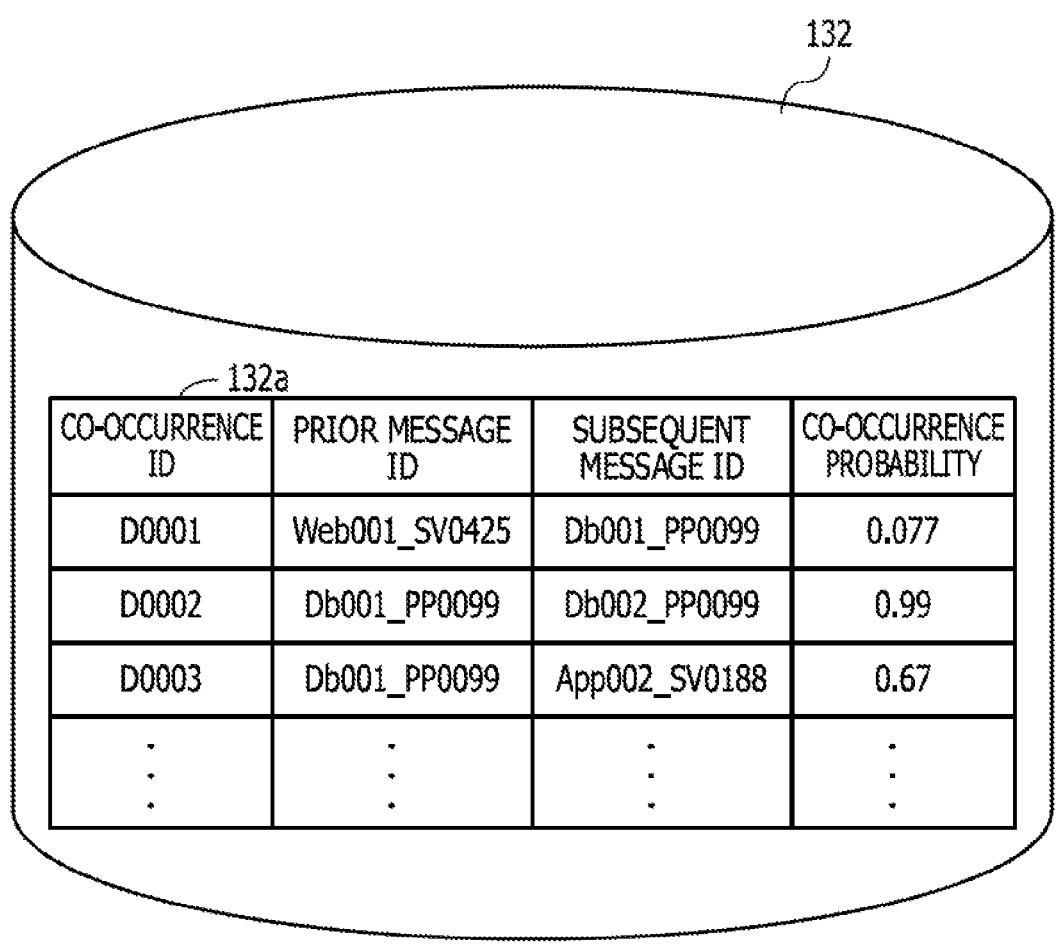
FIG. 8 illustrates an example of a ranking-dependent co-occurrence probability storage unit.

FIG. 8 illustrates an example of a ranking-dependent co-occurrence probability storage unit. The ranking-dependent co-occurrence probability storage unit 132 has, for example, a ranking-dependent co-occurrence probability table 132*a*. The ranking-dependent co-occurrence probability table 132*a* is provided with fields of "Co-occurrence ID", "Prior message ID", "Subsequent message ID", and "Co-occurrence probability".

An identifier (co-occurrence ID) which indicates a pair of two co-occurring messages is set in the "Co-occurrence ID" field. A message ID (prior message ID) of the previously output message is set in the "Prior message ID" field. A message ID (subsequent message ID) of the previously output message is set in the "Subsequent message ID" field. The probability (co-occurrence probability) that the message applicable to the subsequent message ID is output within a predetermined time period after the message applicable to the prior message ID is output, is set in the "Co-occurrence probability" field.

Figure 9:
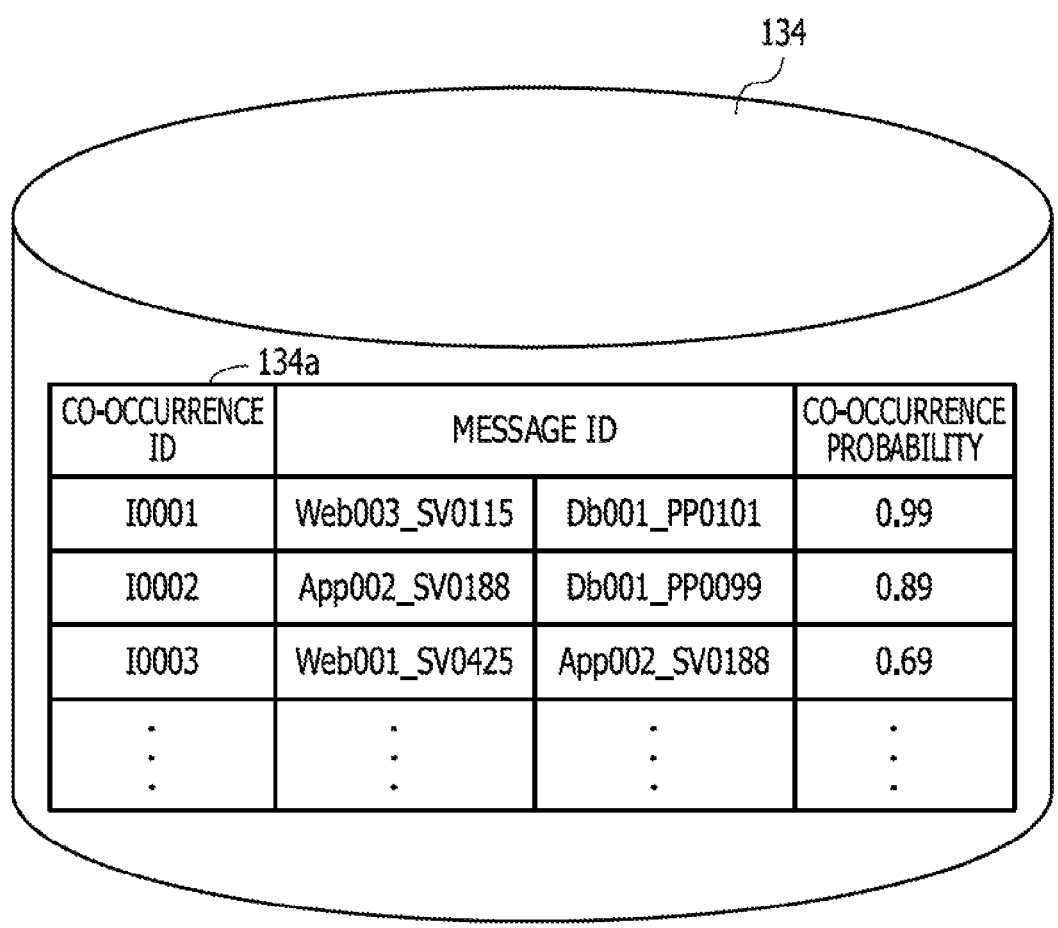
FIG. 9 illustrates an example of a ranking-independent co-occurrence probability storage unit.

FIG. 9 illustrates an example of a ranking-independent co-occurrence probability storage unit. The ranking-independent co-occurrence probability storage unit 134 has, for example, a ranking-independent co-occurrence probability table 134*a*. The ranking-independent co-occurrence probability table 134*a* is provided with the fields of "Co-occurrence ID", "Message ID" and "Co-occurrence probability".

An identifier (co-occurrence ID) which indicates a pair of two co-occurring messages is set in the "Co-occurrence ID" field. Two message IDs to be subjected to co-occurrence probability calculation are set in the "Message ID" field. The probability (co-occurrence probability) that, within a predetermined time period after the message applicable to the one of the message IDs among the two message IDs is output, the message applicable to the other message ID is output, is set in the "Co-occurrence probability" field.

The following is an explanation of the message co-occurrence pattern DB 140.

Figure 10:
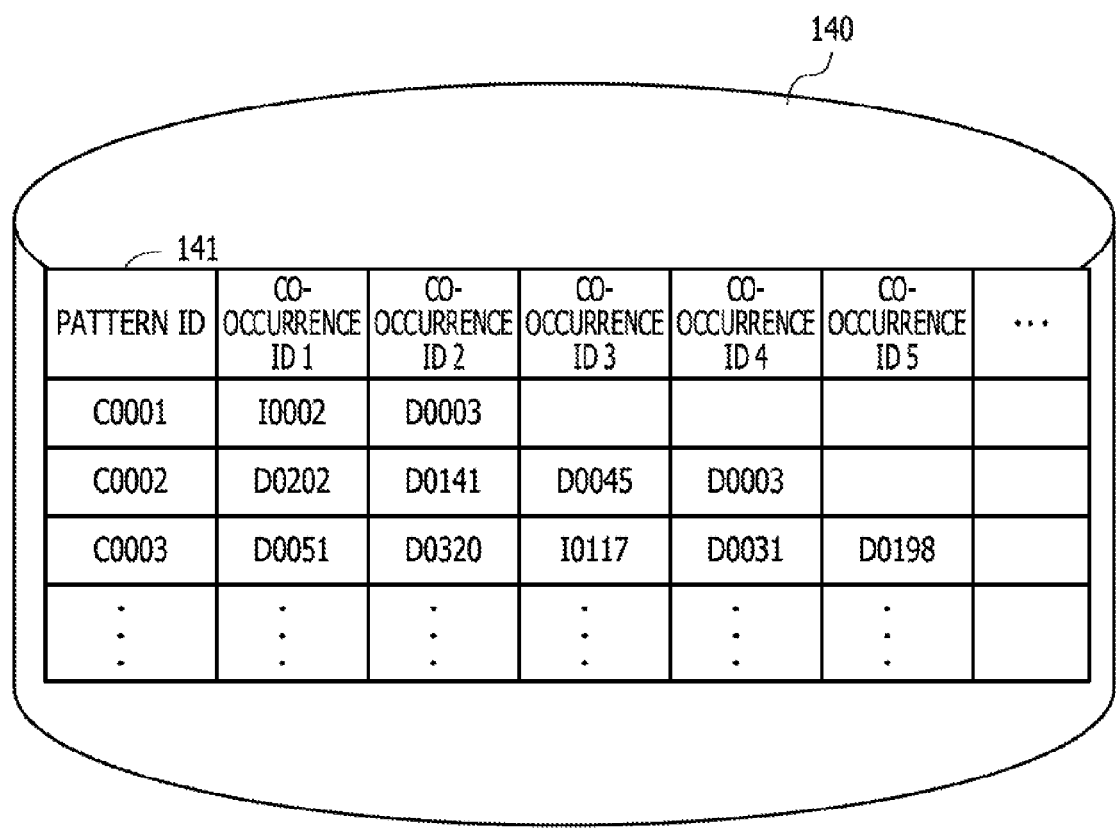
FIG. 10 is an example of a message co-occurrence pattern DB.

FIG. 10 is an example of a message co-occurrence pattern DB. The message co-occurrence pattern DB 140 has, for example, a co-occurrence pattern table 141. The co-occurrence pattern table 141 is provided with a "Pattern ID" field and a plurality of "Co-occurrence ID" fields.

An identifier (pattern ID) of a co-occurrence pattern is set in the "pattern ID" field. Co-occurrence IDs corresponding to the relationship between the messages included in the co-occurrence pattern are set in the plurality of "Co-occurrence ID" fields.

The following is an explanation of the inter-CI relevancy calculating unit 150.

Figure 11:
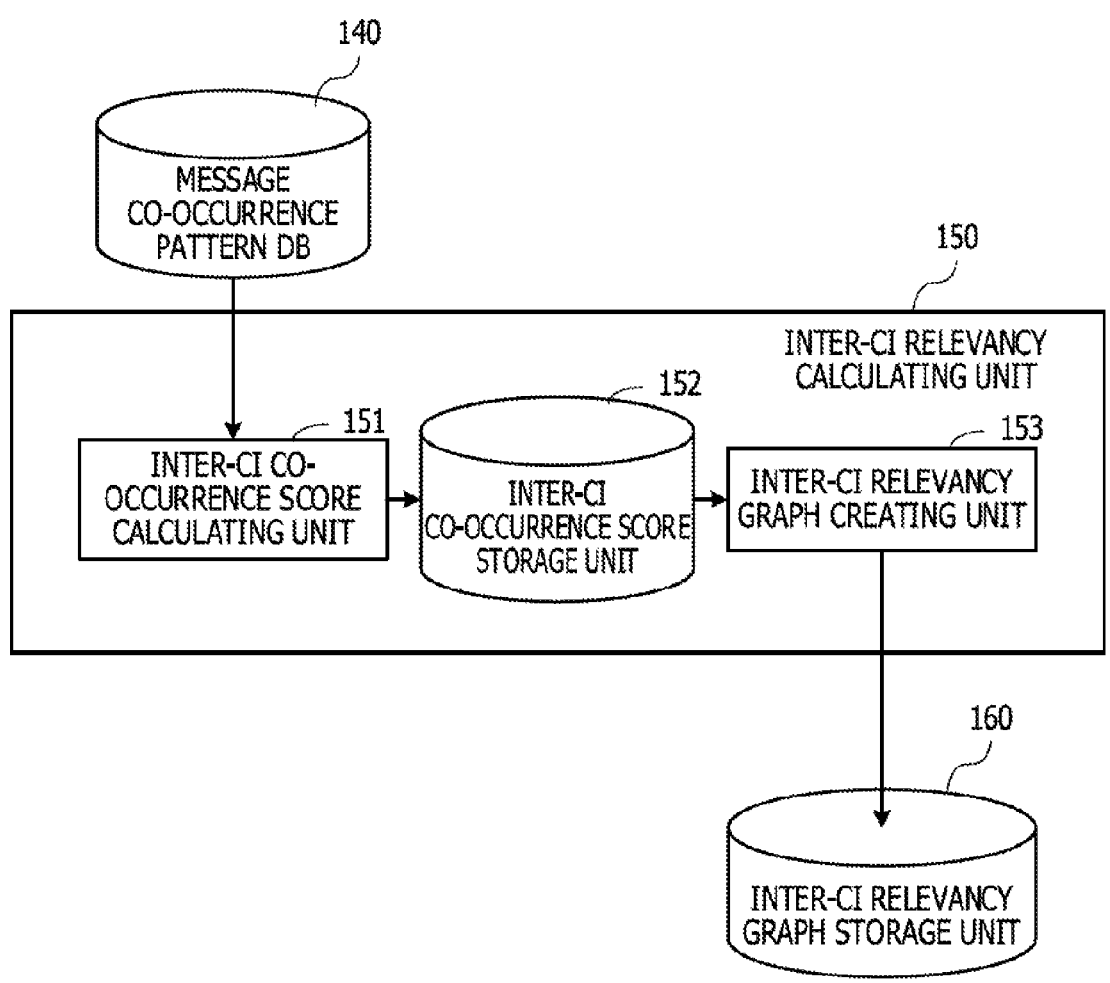
FIG. 11 is a block diagram illustrating functions of an inter-CI relevancy calculating unit.

FIG. 11 is a block diagram illustrating functions of an inter-CI relevancy calculating unit. The inter-CI relevancy calculating unit 150 has an inter-CI co-occurrence score calculating unit 151, an inter-CI co-occurrence score storage unit 152, and an inter-CI relevancy graph creating unit 153.

The inter-CI co-occurrence score calculating unit 151 refers to the message co-occurrence pattern DB 140 and calculates a co-occurrence score indicating the degree of the co-occurrence relationship between messages output by each CI among two CIs. The inter-CI co-occurrence score calculating unit 151 stores the calculated co-occurrence scores in association with the set of corresponding CIs in the inter-CI co-occurrence score storage unit 152.

The inter-CI co-occurrence score storage unit 152 stores the co-occurrence scores calculated for each set of two CIs. For example, a portion of a storage region in the memory 102 is used as the inter-CI co-occurrence score storage unit 152.

The inter-CI relevancy graph creating unit 153 creates a graph (inter-CI relevancy graph) depicting relevant CIs based on the co-occurrence scores among CIs. For example, the inter-CI relevancy graph creating unit 153 designates CIs having a co-occurrence score equal to or above a threshold as relevant CIs. The inter-CI relevancy graph creating unit 153 then stores the information representing the inter-CI relevancy graphs in the inter-CI relevancy graph storage unit 160.

The following is an explanation of the inter-CI co-occurrence score storage unit 152.

FIG. 12 illustrates an example of an inter-CI co-occurrence score storage unit. The inter-CI co-occurrence score storage unit 152 has, for example, an inter-CI co-occurrence score table 152*a*. The inter-CI co-occurrence score table 152*a* is a table in a matrix format in which CI names of CIs that are starting points are arranged in the vertical direction (row direction) and CI names of CIs that are end points are arranged in the horizontal direction (column direction). The co-occurrence scores of the messages respectively output from the CIs corresponding to the CI names of the starting points and the CIs corresponding to the CI names of the end points, are set in the locations where the rows of the CI names of the starting points intersect the columns of the CI names of the end points in the inter-CI co-occurrence score table 152*a*.

The co-occurrence scores include a co-occurrence score that considers directionality (directional) and a co-occurrence score that does not consider directionality (non-directional). The directional co-occurrence score indicates the degree to which a message having a strong co-occurrence with a message output from the CI corresponding to the starting point CI name, is output from a CI corresponding to the end point CI name within a predetermined time period after the message output from the CI corresponding to the starting point CI name. The non-directional co-occurrence score indicates the degree to which a message having a strong co-occurrence with a message output from either of the CI corresponding to the starting point CI name or the CI corresponding to the end point CI name, is output from a CI corresponding to another CI name within a predetermined time period after the message output from the CI corresponding to the starting point CI name or end point CI name.

The presence of a relevancy between the CIs is judged based on the co-occurrence score between CIs in this way. For example, if the threshold is set at "0.6", a judgment is made that directional relevancy is present between CIs in which the directional co-occurrence score is "0.6" or greater. In the example of FIG. 12, directional co-occurrence scores between CIs that demonstrate directional relevancy are underlined with a single line. Moreover, a judgment is made that non-directional relevancy is present between CIs that do not demonstrate directional relevancy and in which the non-directional co-occurrence score is "0.6" or greater. In the example of FIG. 12, non-directional co-occurrence scores between CIs that demonstrate non-directional relevancy are underlined with a double line.

A star "*" is added to the right of the numerical value in FIG. 12 for a non-directional co-occurrence score between CIs that also demonstrate directional relevancy and have a non-directional co-occurrence score of "0.6" or greater. For example, between "Web001" and "App002", directional relevancy is demonstrated when the "App002" is the starting point and the "Web001" is the end point. As a result, the non-directional co-occurrence score between the "Web001" and the "App002" is not subjected to the judgment of the non-directional relevancy.

The following is an explanation of the inter-CI relevancy graph storage unit 160.

Figure 13:
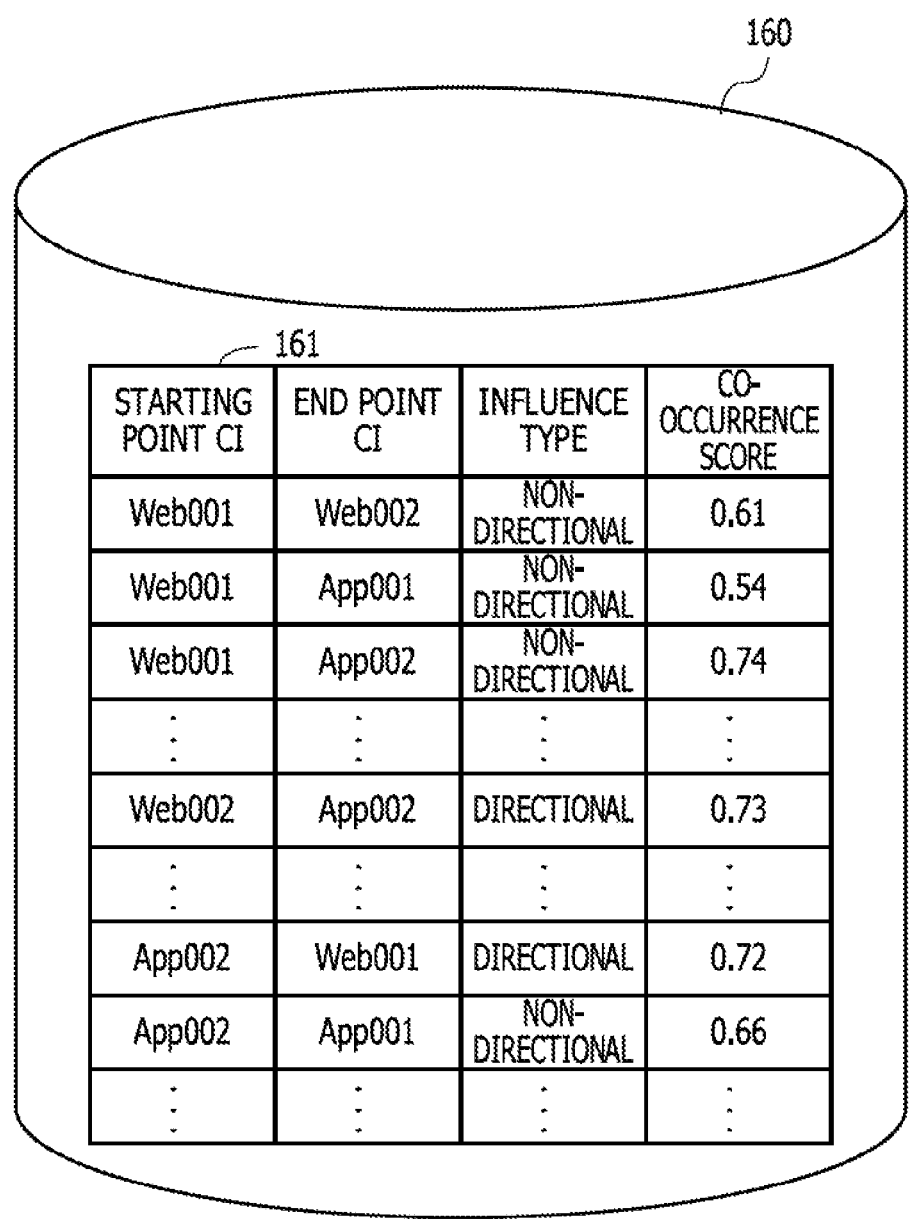
FIG. 13 illustrates an example of an inter-CI relevancy graph storage unit.

FIG. 13 illustrates an example of an inter-CI relevancy graph storage unit. The inter-CI relevancy graph storage unit 160 has, for example, an inter-CI relevancy table 161. The inter-CI relevancy table 161 is provided with the fields of "Starting point CI", "End point CI", "Influence type", and "Co-occurrence score".

The CI name of the CI that is the starting point is set in the "Starting point CI" field. The CI name of the CI that is the end point is set in the "End point CI" field. The type of influence relationship (influence type) is set in the "Influence type" field. If there is a directional relevancy between the starting point CI and the end point CI, the influence type is designated as "Directional". If there is a non-directional relevancy between the starting point CI and the end point CI, the influence type is designated as "Non-directional". The co-occurrence score between the starting point CI and the end point CI is set in the "Co-occurrence score" field. For example, when the influence type is "directional", the directional co-occurrence score is set in the "Co-occurrence score" field. For example, when the influence type is "non-directional", the non-directional co-occurrence score is set in the "Co-occurrence score" field.

By previously making this type of inter-CI relevancy table 161, a list of CIs to be investigated can be made by the inter-CI influence evaluating unit 170 when a failure is generated in any of the CIs.

Figure 14:
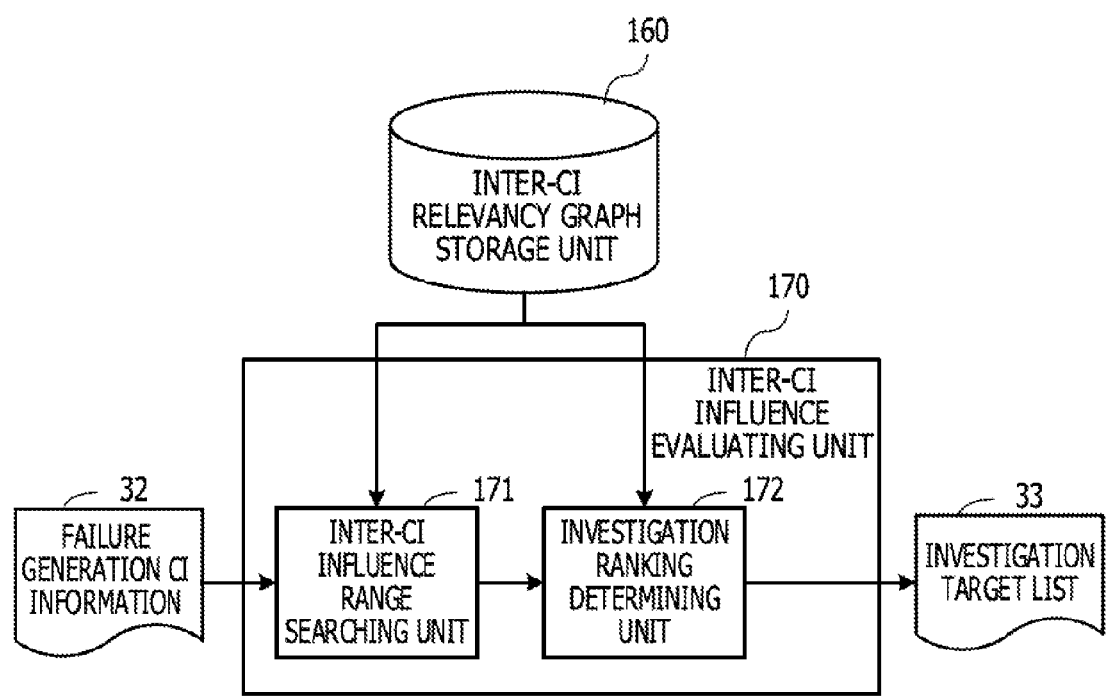
FIG. 14 is a block diagram illustrating functions of an inter-CI influence determining unit.

FIG. 14 is a block diagram illustrating functions of an inter-CI influence determining unit. The inter-CI influence evaluating unit 170 has an inter-CI influence range searching unit 171 and an investigation ranking determining unit 172.

The inter-CI influence range searching unit 171 refers to the inter-CI relevancy graph storage unit 160 and searches the range (influence range) of the CIs that are likely to be related to the failure when failure generation CI information 32 that includes the name of the CI where the failure was generated is input.

The investigation ranking determining unit 172 determines the priority ranking of the investigation (investigation ranking) for the CIs within the influence range. For example, the investigation ranking determining unit 172 determines the investigation ranking based on a score derived for each CI during the search process of the range of CIs. The investigation ranking determining unit 172 then designates the CIs inside the influence range as investigation targets and assigns the investigation ranking to the CIs to be investigated and outputs the information as an investigation target list 33.

Analysis processing of the relevancy between CIs is carried out as pre-processing in the system configured as described above, and the processing for calculating the influence between CIs when a failure is generated is carried out by the management server 100. The following is an explanation of processing executed by the management server 100.

<Inter-CI Relevancy Analysis>

The inter-CI relevancy analysis is carried out periodically at predetermined periods for example.

Figure 15:
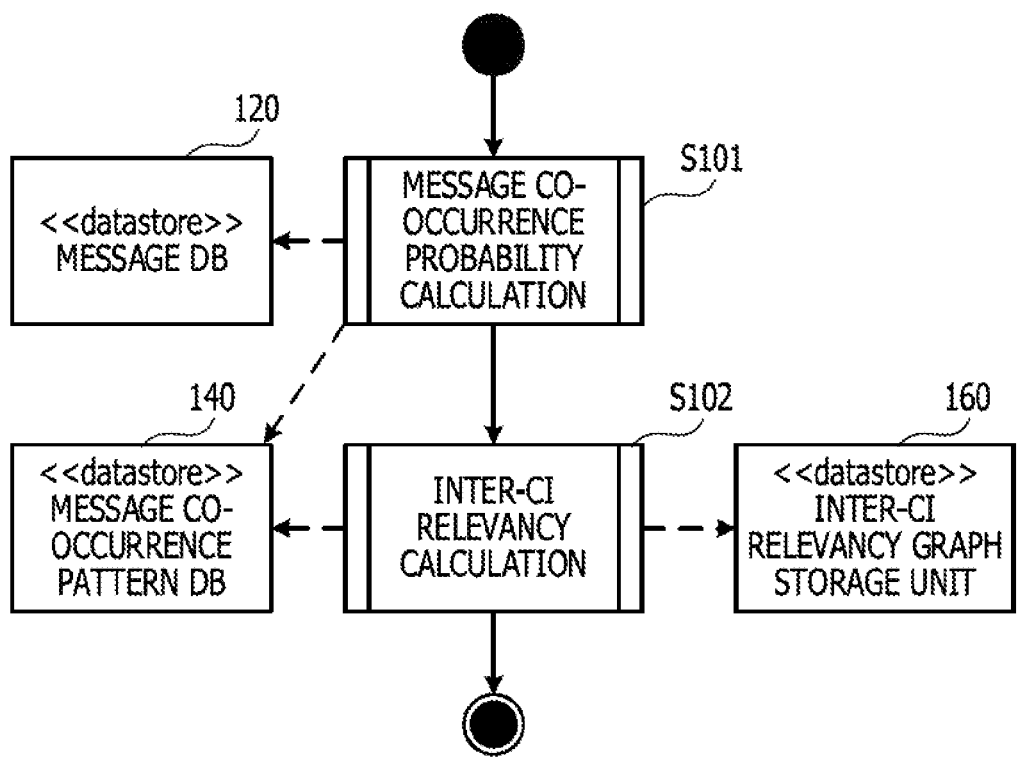
FIG. 15 is an activity diagram illustrating an example of procedures for inter-CI relevancy analysis processing.

FIG. 15 is an activity diagram illustrating an example of procedures for inter-CI relevancy analysis processing. The processing illustrated in FIG. 15 will be explained with step numbers.

[Step S101]

The message co-occurrence probability calculating unit 130 performs processing for calculating the message co-occurrence probabilities when the timing for performing the inter-CI relevancy analysis is reached. For example, the message co-occurrence probability calculating unit 130 first refers to the message DB 120 and calculates the message co-occurrence probabilities. Next, the message co-occurrence probability calculating unit 130 creates the message co-occurrence pattern based on the created message co-occurrence probabilities. The message co-occurrence probability calculating unit 130 then stores the created message co-occurrence pattern in the message co-occurrence pattern DB 140. Details of the message co-occurrence probability calculation processing are explained below (see FIG. 17).

[Step S102]

When the message co-occurrence pattern is created, the inter-CI relevancy calculating unit 150 performs processing to calculate the relevancies between the CIs. For example, the inter-CI relevancy calculating unit 150 refers to the message co-occurrence pattern DB 140 and judges the relevancies between CIs based on the combinations of co-occurring messages, and creates the inter-CI relevancy graph which indicates the relevancies between CIs. The inter-CI relevancy calculating unit 150 then stores the information indicating the inter-CI relevancy graphs in the inter-CI relevancy graph storage unit 160. Details of the inter-CI relevancy calculation processing are explained below (see FIG. 33).

The processing of each step illustrated in FIG. 15 will be explained below.

<<Message Co-Occurrence Probability Calculation>>

Bayes estimation and Markov chains are known as methods for deriving co-occurrence relationships between previous and subsequent events. The above methods are preferably not used for judging the co-occurrence relationships between messages output as logs from different CIs. Messages output from a large number of CIs differ from packet capturing, in which the packet transmission time is understood accurately in units of microseconds, and thus are not limited to the correct time being recorded in the messages. As a result, when comparing the generation times of messages from different CIs, there is a possibility within a certain percentage that the generation times may be swapped. When deriving co-occurrence relationships between messages with Bayes estimation or Markov chains in this type of environment, the swapping of the generation times may have an impact and the co-occurrence relationships of events that are actually generated in the system may not be derived correctly.

Accordingly, in order to derive the co-occurrence relationships of events in which the generated ranking may be swapped, co-occurrence relationships that do not take into account the generated ranking and that are derived from events that are generated temporally close to each other, are extracted along with co-occurrence relationships that take into account the generated ranking.

Figure 16:
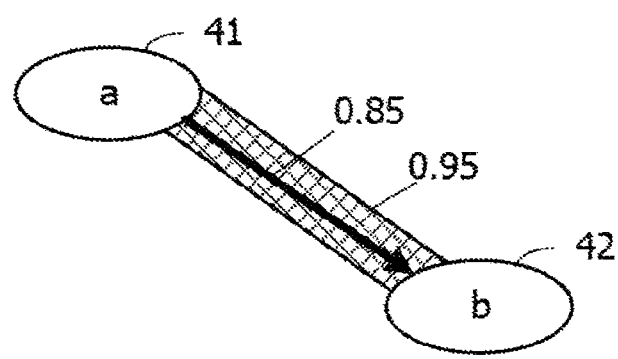
FIG. 16 illustrates an image of a co-occurrence relationship.

FIG. 16 illustrates an image of a co-occurrence relationship. For example, according to a time (time stamp) assigned to a message recorded in the message DB 120, a subsequent message 42 is output after a prior message 41 is output. At this time, the co-occurrence probability that takes into account the generated ranking is calculated as "0.85". If the co-occurrence probability is equal to or greater than a predetermined threshold, a directional co-occurrence relationship is confirmed between the prior message 41 and the subsequent message 42. The directional co-occurrence relationship is indicated in FIG. 16 by the arrow between the messages.

If the time stamps of the prior message 41 and the subsequent message 42 are both correct, the prior message 41 and the subsequent message 42 are displayed only by the directional co-occurrence relationship. However, a time stamp assigned when an individual CI outputs the message as a log may be incorrect, and the subsequent message 42 may actually have an earlier output time than the prior message 41. Accordingly, the non-directional co-occurrence probability is calculated as "0.95". The directional co-occurrence relationship is indicated in FIG. 16 by the meshed region between the messages.

The non-directional co-occurrence probability is a value larger than the directional co-occurrence probability. As a result, there is a possibility that the non-directional co-occurrence probability may be equal to or greater than the threshold even though the directional co-occurrence probability is less than the threshold. When the non-directional co-occurrence probability is equal to or greater than the threshold, a judgment is made that there is a non-directional co-occurrence relationship between the prior message 41 and the subsequent message 42, thereby reducing the possibility that a judgment will be made that there is no relevancy regardless of the relevancy between the two messages.

Figure 17:
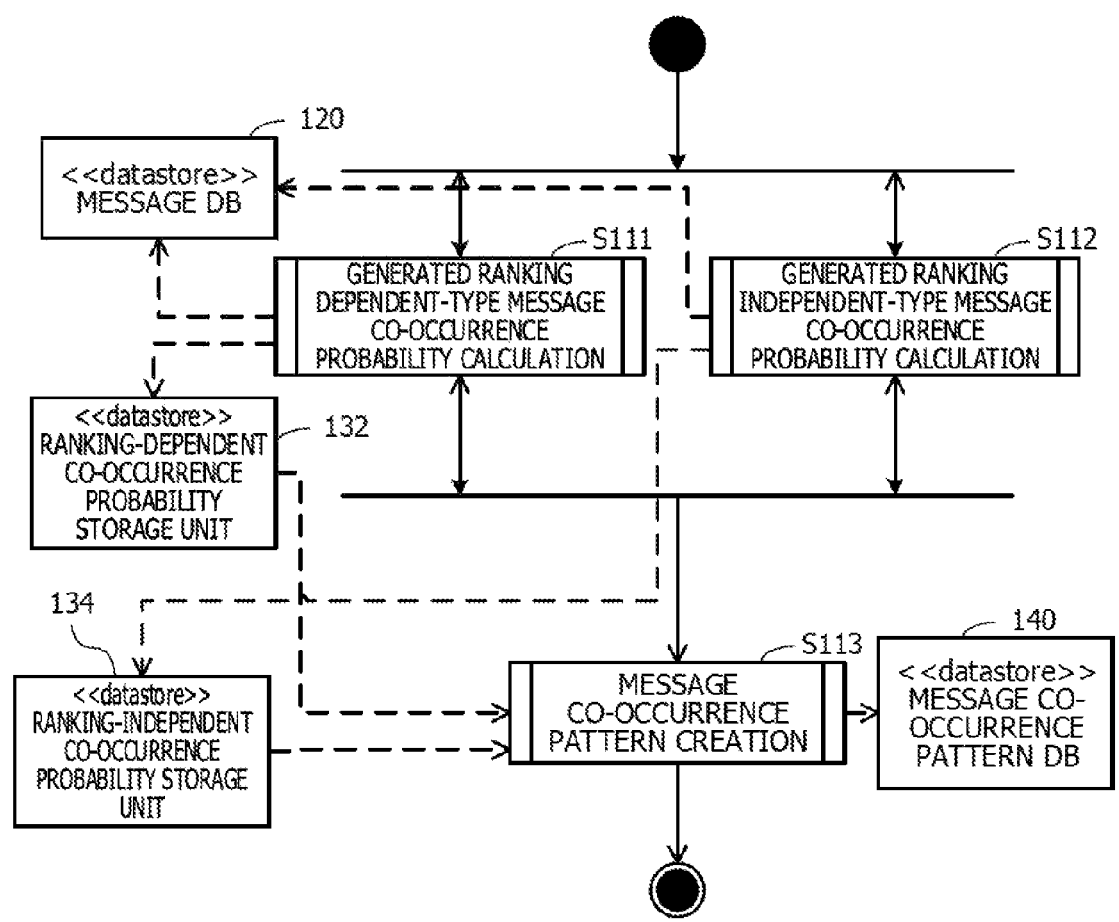
FIG. 17 is an activity diagram illustrating an example of message co-occurrence probability calculation processing.

FIG. 17 is an activity diagram illustrating an example of message co-occurrence probability calculation processing. The processing illustrated in FIG. 17 will be explained with step numbers.

[Step S111]

The first co-occurrence probability calculating unit 131 refers to the message DB 120 and executes processing for calculating the co-occurrence probability of generated ranking-dependent type messages. The first co-occurrence probability calculating unit 131 stores the calculated ranking-dependent type message co-occurrence probabilities in the ranking-dependent co-occurrence probability storage unit 132. Details of the generated ranking-dependent type message co-occurrence probability calculation processing are explained below (see FIG. 18).

[Step S112]

The second co-occurrence probability calculating unit 133 carries out processing parallel to step S111 and refers to the message DB 120 and executes processing for calculating the co-occurrence probability of generated ranking-independent type messages. The second co-occurrence probability calculating unit 133 stores the calculated ranking-independent type message co-occurrence probabilities in the ranking-independent co-occurrence probability storage unit 134. Details of the generated ranking-independent type message co-occurrence probability calculation processing are explained below (see FIG. 23).

[Step S113]

The message co-occurrence pattern creating unit 135 refers to the ranking-dependent co-occurrence probability storage unit 132 and the ranking-independent co-occurrence probability storage unit 134 and executes processing to create the message co-occurrence patterns. The message co-occurrence pattern creating unit 135 stores the created message co-occurrence patterns in the message co-occurrence pattern DB 140. Details of the message co-occurrence pattern creation processing are explained below (see FIG. 27).

Next, processing for calculating the co-occurrence probability of generated ranking-dependent type messages will be explained.

Figure 18:
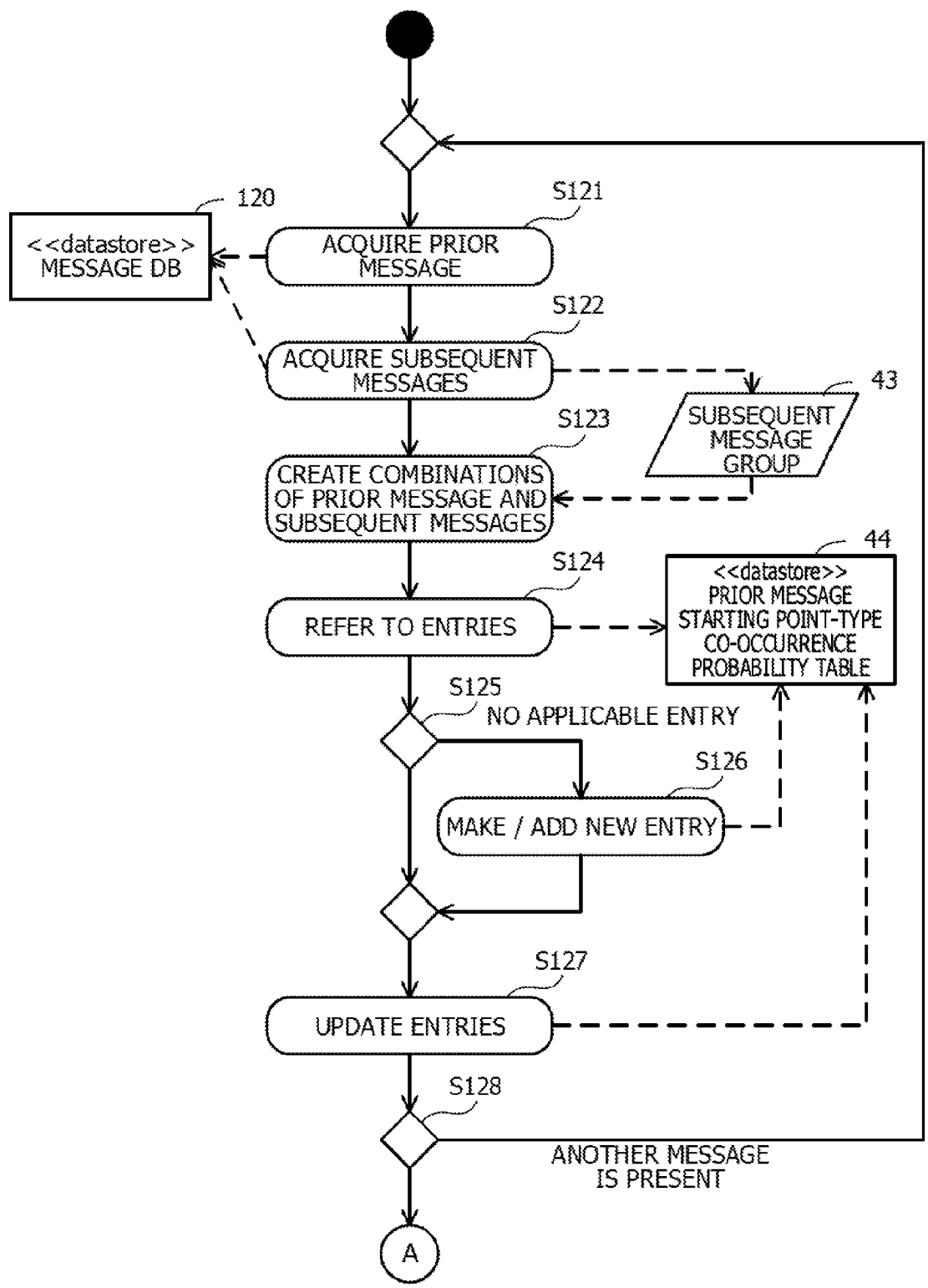
FIG. 18 is an activity diagram illustrating an example of generated ranking-dependent type message co-occurrence probability calculation processing.
Figure 20:
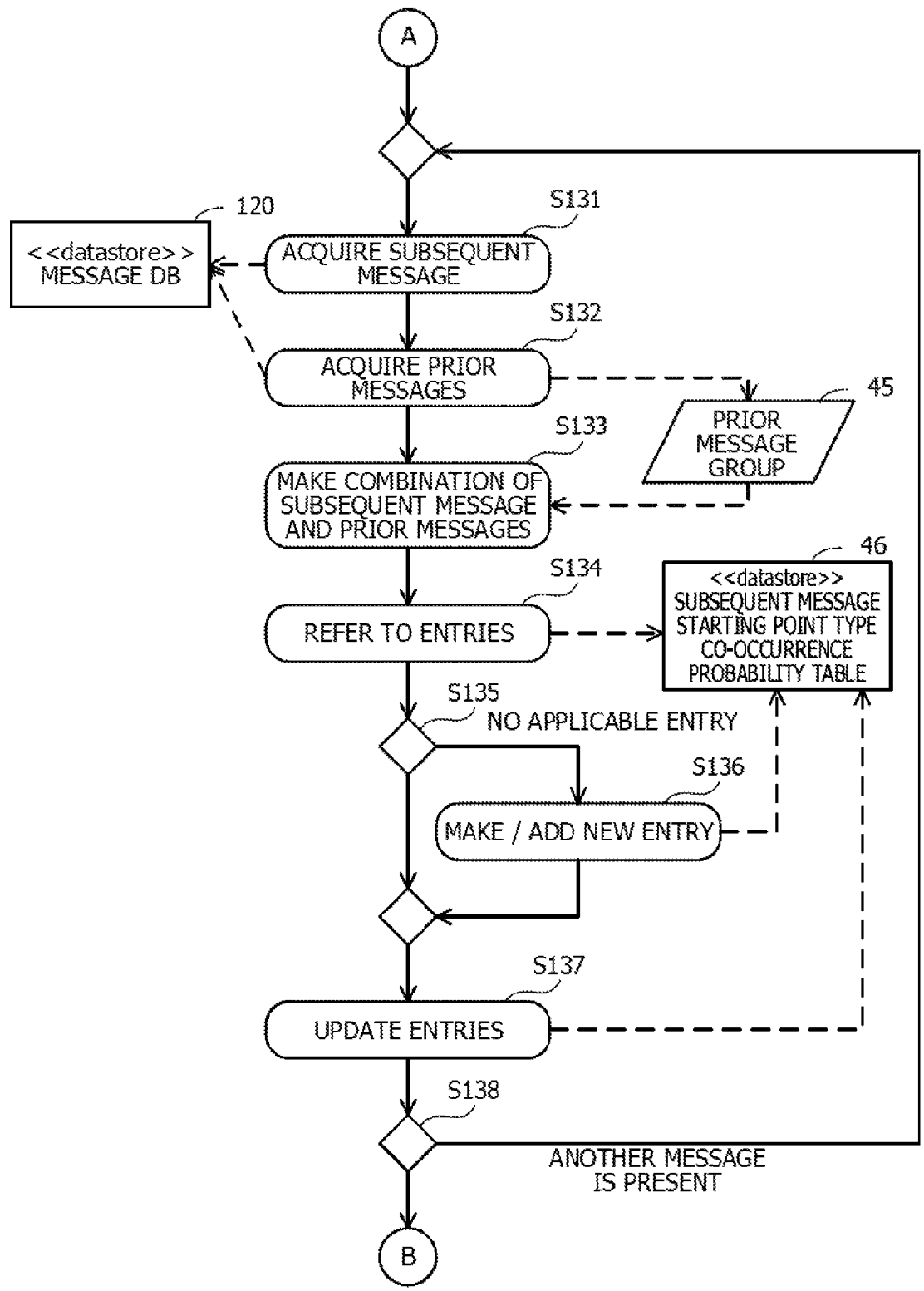
FIG. 20 is an activity diagram illustrating an example of generated ranking-dependent type message co-occurrence probability calculation processing.
Figure 22:
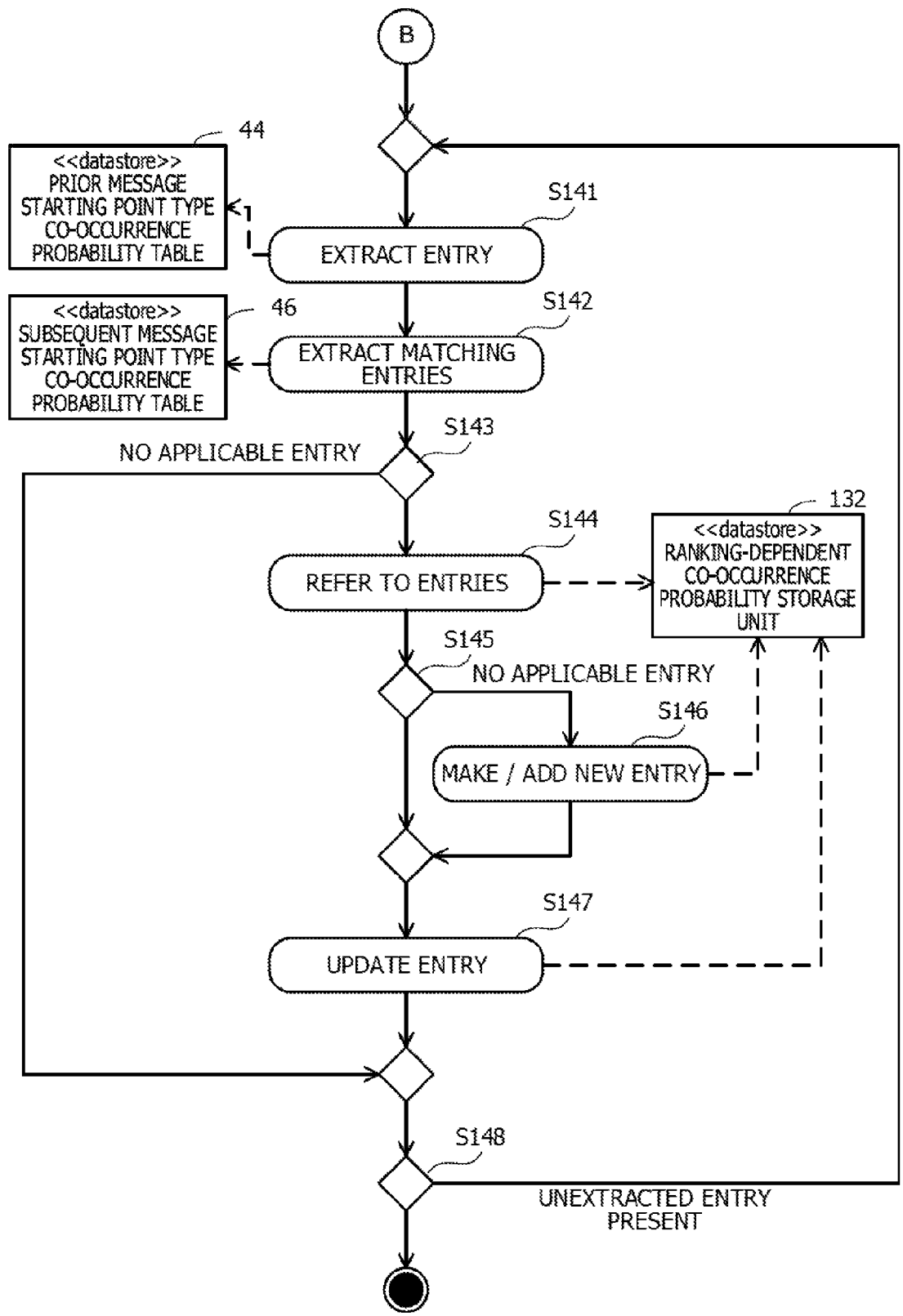
FIG. 22 is an activity diagram illustrating an example of generated ranking-dependent type message co-occurrence probability calculation processing.

FIGS. 18, 20 and 22 are activity diagrams illustrating examples of generated ranking-dependent type message co-occurrence probability calculation processing. First, the processing depicted in FIG. 18 will be explained with step numbers.

[Step S121]

The first co-occurrence probability calculating unit 131 refers to the messages stored in the message DB 120. The first co-occurrence probability calculating unit 131 then acquires one message that has not been acquired from the message DB 120 as a prior message.

[Step S122]

The first co-occurrence probability calculating unit 131 refers to the time that the message stored in the message DB 120 was generated, and acquires, as a subsequent message group 43, all of the messages generated within a predetermined co-occurrence period after the generation of the message acquired as the prior message. The co-occurrence period may be five minutes for example.

[Step S123]

The first co-occurrence probability calculating unit 131 creates combinations of each of the subsequent messages included in the subsequent message group 43 with the prior message.

[Step S124]

The first co-occurrence probability calculating unit 131 refers to the entries corresponding to the combinations of the prior message and the subsequent messages made in step S123 in a prior message starting point-type co-occurrence probability table 44.

FIG. 19 illustrates an example of a prior message starting point-type co-occurrence probability table. The appearance frequency of the prior message, the appearance frequency of the subsequent message within the co-occurrence period, and the prior message starting point-type co-occurrence probabilities are set in the prior message starting point-type co-occurrence probability table 44 in association with the sets of the prior message and the subsequent message. The prior message appearance frequency represents the frequency that the prior message in the message DB 120 appears. The appearance frequency of the subsequent message within the co-occurrence period represents the frequency that the subsequent message appears within the co-occurrence period from the appearance of the prior message. The prior message starting point-type co-occurrence probability is a value derived by dividing the subsequent message appearance frequency within the co-occurrence period by the prior message appearance frequency. The prior message starting point-type co-occurrence probability table 44 is stored, for example, temporarily in the ranking-dependent co-occurrence probability storage unit 132.

The explanation now returns to FIG. 18.

[Step S125]

The processing of the first co-occurrence probability calculating unit 131 advances to step S126 when an entry corresponding to the combinations of the prior message and the subsequent messages made in step S123 is not registered in the prior message starting point-type co-occurrence probability table 44. If the applicable entry is already present, the processing of the first co-occurrence probability calculating unit 131 advances to step S127.

[Step S126]

When there is no applicable entry, the first co-occurrence probability calculating unit 131 registers the combination of the prior message and the subsequent message of the entry that could not be referred to in step S124 as a new entry in the prior message starting point-type co-occurrence probability table 44.

[Step S127]

The first co-occurrence probability calculating unit 131 calculates the prior message appearance frequency, the appearance frequency of the subsequent messages within the co-occurrence period, and the prior message starting point-type co-occurrence probability for each combination of the prior message and the subsequent message created in step S123. The first co-occurrence probability calculating unit 131 then updates the entries in the prior message starting point-type co-occurrence probability table 44 with the results of the calculations.

[Step S128]

The first co-occurrence probability calculating unit 131 judges whether there is an unacquired message from step S121 in the message DB 120. The processing of the first co-occurrence probability calculating unit 131 then advances to step S121 if there is an unacquired message and carried out the processing on the unacquired message. If there are no unacquired messages, the processing of the first co-occurrence probability calculating unit 131 advances to step S131 (see FIG. 20).

The processing illustrated in FIG. 20 will be explained with step numbers.

[Step S131]

The first co-occurrence probability calculating unit 131 refers to the messages stored in the message DB 120. The first co-occurrence probability calculating unit 131 then acquires one message that has not been acquired from the message DB 120 as a subsequent message.

[Step S132]

The first co-occurrence probability calculating unit 131 refers to the time that the message stored in the message DB 120 was generated, and acquires, as a prior message group 45, all of the messages generated within a predetermined co-occurrence period before the generation of the message acquired as the subsequent message.

[Step S133]

The first co-occurrence probability calculating unit 131 creates a combination of all of the prior messages included in the prior message group 45 with the subsequent message.

[Step S134]

The first co-occurrence probability calculating unit 131 refers to the entries corresponding to the combinations of the prior messages and the subsequent message made in step S133 in a subsequent message starting point-type co-occurrence probability table 46.

Figure 21:
FIG. 21 illustrates an example of a subsequent message starting point-type co-occurrence probability table.

FIG. 21 illustrates an example of a subsequent message starting point-type co-occurrence probability table. The appearance frequency of the prior message within the co-occurrence period, the appearance frequency of the subsequent message, and the subsequent message starting point-type co-occurrence probabilities are set in the subsequent message starting point-type co-occurrence probability table 46 in association with the sets of the prior messages and the subsequent message. The prior message appearance frequency within the co-occurrence period is the frequency that the prior message appears within the co-occurrence period before the appearance of the subsequent message. The subsequent message appearance frequency represents the frequency that the subsequent message in the message DB 120 has appeared. The subsequent message starting point-type co-occurrence probability is a value derived by dividing the prior message appearance frequency within the co-occurrence period by the subsequent message appearance frequency. The subsequent message starting point-type co-occurrence probability table 46 is stored, for example, temporarily in the ranking-dependent co-occurrence probability storage unit 132.

The explanation now returns to FIG. 20.

[Step S135]

The first co-occurrence probability calculating unit 131 proceeds to step S136 of the processing when an entry corresponding to the combinations of the prior messages and the subsequent message made in step S133 is not registered in the subsequent message starting point-type co-occurrence probability table 46. If the applicable entry is already present, the processing of the first co-occurrence probability calculating unit 131 advances to step S137.

[Step S136]

When there is no applicable entry, the first co-occurrence probability calculating unit 131 registers the combination of the prior messages and the subsequent message of the entry that could not be referred to in step S134 as a new entry in the subsequent message starting point-type co-occurrence probability table 46.

[Step S137]

The first co-occurrence probability calculating unit 131 calculates the prior message appearance frequency, the appearance frequency of the subsequent messages within the co-occurrence period, and the prior message starting point-type co-occurrence probability for each combination of the prior message and the subsequent message created in step S133. The first co-occurrence probability calculating unit 131 then updates the entries in the subsequent message starting point-type co-occurrence probability table 46 with the results of the calculations.

[Step S138]

The first co-occurrence probability calculating unit 131 judges whether there is an unacquired message from step S131 in the message DB 120. The processing of the first co-occurrence probability calculating unit 131 then advances to step S131 if there is an unacquired message and carries out the processing on the unacquired message. If there are no unacquired messages, the processing of the first co-occurrence probability calculating unit 131 advances to step S141 (see FIG. 22).

The processing illustrated in FIG. 22 will be explained with step numbers.

[Step S141]

The first co-occurrence probability calculating unit 131 extracts one unextracted entry from the prior message starting point-type co-occurrence probability table 44.

[Step S142]

The first co-occurrence probability calculating unit 131 extracts the set of entries that matches the set of the prior message and the subsequent message acquired in step S141, from the subsequent message starting point-type co-occurrence probability table 46.

[Step S143]

The processing of the first co-occurrence probability calculating unit 131 advances to step S148 if there is no entry comprising the prior message and the subsequent message acquired in Step S141 in the subsequent message starting point-type co-occurrence probability table 46. If an applicable entry is already present, the processing of the first co-occurrence probability calculating unit 131 advances to step S144.

[Step S144]

The first co-occurrence probability calculating unit 131 refers to the entry of the set of the subsequent message and the prior message that is the same as the entries extracted in steps S141 and S142, in the ranking-dependent co-occurrence probability storage unit 132.

[Step S145]

The processing of the first co-occurrence probability calculating unit 131 advances to step S146 if there is no entry to be referred to in step S144 in the ranking-dependent co-occurrence probability storage unit 132. If an applicable entry is present, the processing of the first co-occurrence probability calculating unit 131 advances to step S147.

[Step S146]

The first co-occurrence probability calculating unit 131 adds the combination of the prior messages and the subsequent message of the entry that could not be referred to in step S144 as a new entry in the ranking-dependent co-occurrence probability storage unit 132.

[Step S147]

The first co-occurrence probability calculating unit 131 updates the entry in the ranking-dependent co-occurrence probability storage unit 132 referred to in step S144 based on the entries extracted in steps S141 and S142. For example, the first co-occurrence probability calculating unit 131 acquires the prior message starting point co-occurrence probability from the entry extracted in step S141. Moreover, the first co-occurrence probability calculating unit 131 acquires the subsequent message starting point co-occurrence probability from the entry extracted in step S142. The first co-occurrence probability calculating unit 131 then calculates the harmonic average of the acquired prior message starting point co-occurrence probability and the subsequent message starting point co-occurrence probability and sets the result as the co-occurrence probability of the entry referred to in step S144. For example, the co-occurrence probability is calculated according to the following equation.

$$\text{Co-occurrence probability} = (2 \times (\text{prior message starting point co-occurrence probability}) \times (\text{subsequent message starting point co-occurrence probability})) / ((\text{prior message starting point co-occurrence probability}) + (\text{subsequent message starting point co-occurrence probability}))$$

The first co-occurrence probability calculating unit 131 sets the calculated co-occurrence probability as the co-occurrence probability of the entry referred to in step S144 in the ranking-dependent co-occurrence probability storage unit 132.

[Step S148]
The first co-occurrence probability calculating unit 131 judges if an unextracted entry is present in the prior message starting point-type co-occurrence probability table 44. If there is an unextracted entry, the processing of the first co-occurrence probability calculating unit 131 advances to step S141 and carries out the above processing on the unextracted entry. If there is no unextracted entry, the first co-occurrence probability calculating unit 131 ends the generated ranking-dependent type message co-occurrence probability calculation processing.

According to the above processing, the co-occurrence probability among generated ranking-dependent type messages is calculated for each combination of prior message and subsequent message.

The generated ranking-dependent type message co-occurrence probability calculation may be carried out in parallel to the generated ranking-independent type message co-occurrence probability calculation. Next, processing for calculating the co-occurrence probability of generated ranking-independent type messages will be explained.

Figure 23:
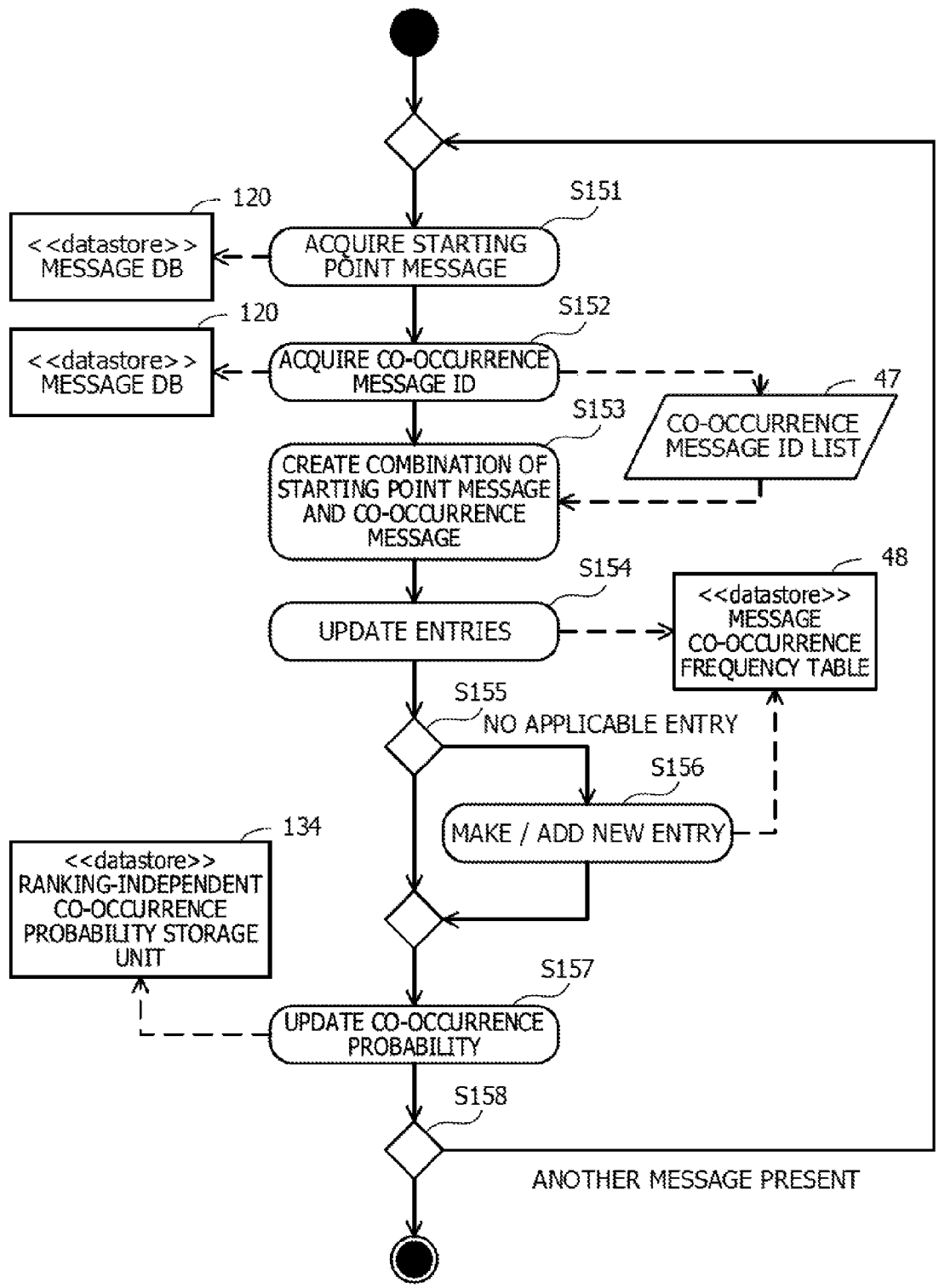
FIG. 23 is an activity diagram illustrating an example of generated ranking-independent type message co-occurrence probability calculation processing.

FIG. 23 is an activity diagram illustrating examples of generated ranking-independent type message co-occurrence probability calculation processing. The processing illustrated in FIG. 23 will be explained with step numbers.

[Step S151]
The second co-occurrence probability calculating unit 133 extracts one unprocessed message from the message DB 120 and designates the message as a starting point message.

[Step S152]
The second co-occurrence probability calculating unit 133 acquires, from the message DB 120, the message ID of a message generated within the co-occurrence period before or after the generation time of the starting point message, and designates the message ID as a co-occurrence message ID. The second co-occurrence probability calculating unit 133 then creates a co-occurrence message ID list 47 of the acquired message IDs and stores the co-occurrence message ID list 47 in the memory 102.

[Step S153]
The second co-occurrence probability calculating unit 133 creates a combination of the co-occurrence message with the prior message. For example, the second co-occurrence probability calculating unit 133 designates the message ID of the starting point message of the created combination as "message ID1" and designates the message ID of the co-occurrence message as "message ID2". If there are a plurality of co-occurrence message IDs, a plurality of combinations is created.

[Step S154]
The second co-occurrence probability calculating unit 133 accesses a message co-occurrence frequency table 48 and updates entries corresponding to the created combinations. The message co-occurrence frequency table 48 is a data table for managing the co-occurrence frequency of the combinations.

FIG. 24 illustrates an example of a message co-occurrence frequency table. The message ID1 generation frequency and the co-occurrence frequency are set in the message co-occurrence frequency table 48 in association with the sets of the message ID of the message ID1 and the message ID of the message ID2. The message ID1 generation frequency is a co-occurrence frequency, which is an appearance frequency within the message DB 120 of the message corresponding to the message ID1, and the co-occurrence frequency of the message corresponding to the message ID1 and the message corresponding to the message ID2. For example, the frequency in which the message corresponding to the message ID2 is generated within the co-occurrence period before and after the generation time of the message corresponding to the message ID1, is the co-occurrence frequency.

The message co-occurrence frequency table 48 is temporarily stored, for example, in the ranking-independent co-occurrence probability storage unit 134. The second co-occurrence probability calculating unit 133 tallies the message ID1 generation frequency and the co-occurrence frequency for each combination made in step S153, and sets the results in the entry corresponding to the combination in the ranking-independent co-occurrence probability storage unit 134.

The explanation now returns to FIG. 23.
[Step S155]
The processing of the second co-occurrence probability calculating unit 133 advances to step S156 if there is no entry corresponding to the combinations created in step S153 in the message co-occurrence frequency table 48. If there is an applicable entry in the message co-occurrence frequency table 48, the processing of the second co-occurrence probability calculating unit 133 advances to step S157.

[Step S156]
The second co-occurrence probability calculating unit 133 adds the entries corresponding to the combinations created in step S153 in the message co-occurrence frequency table 48. Moreover, the second co-occurrence probability calculating unit 133 tallies the message ID1 generation frequency and the co-occurrence frequency of the combination corresponding to the added entry, and sets the results in the applicable entry.

[Step S157]
The second co-occurrence probability calculating unit 133 updates the co-occurrence probability of the generated ranking-independent type message in the entry corresponding to the combinations created in step S153 in the ranking-independent co-occurrence probability storage unit 134.

Figure 25:
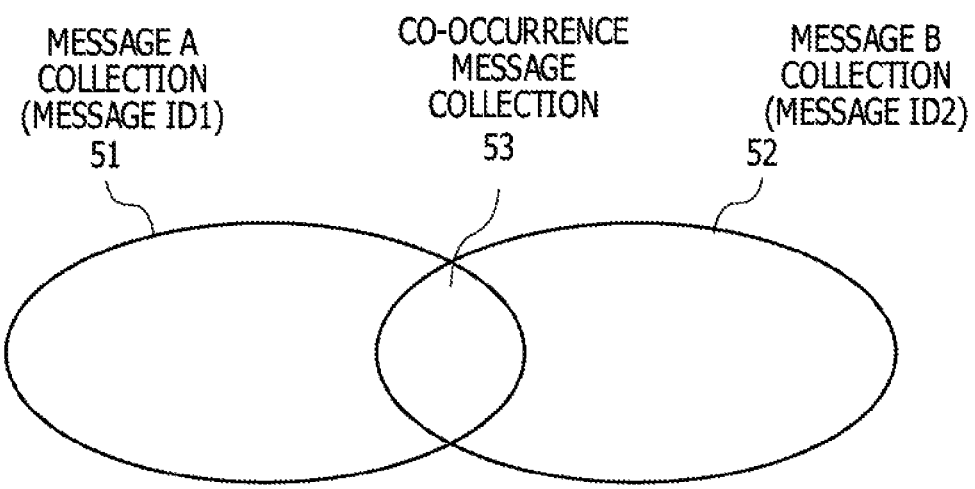
FIG. 25 illustrates an example of a co-occurrence probability calculation for a generated ranking-independent type message.

FIG. 25 illustrates an example of a co-occurrence probability calculation for a generated ranking-independent type message. FIG. 25 depicts a collection (message A collection 51) of messages having the message ID of the message ID1 and a collection (message B collection 52) of messages having the message ID of the message ID2. A co-occurrence message collection 53 is a collection of co-occurrence messages between messages A and messages B. At this time, the number of messages belonging to the co-occurrence message collection 53 among the message A collection 51 is the same as the number of messages belonging to the co-occurrence message collection 53 among the message B collection 52.

The generated ranking-independent type message co-occurrence probability is calculated, for example, with the following equation.

$$\text{Co-occurrence probability} = (2 \times (\text{number of co-occurrence messages}))/((\text{number of messages } A) + (\text{number of messages } B))$$

The explanation now returns to FIG. 23.

[Step S158]

After updating the co-occurrence probabilities, the second co-occurrence probability calculating unit 133 judges whether or not there is a message that has not yet been selected as a starting point message in the message DB 120. If there is a message present that has not been selected as a starting point message, the processing of the second co-occurrence probability calculating unit 133 advances to step S151 and carries out the processing on the unselected message as a starting point message. If the processing on all the messages has been completed, the second co-occurrence probability calculating unit 133 ends the generated ranking-independent type message co-occurrence probability calculation processing.

In this way, the co-occurrence probabilities of the generated ranking-independent type messages are calculated.

<<Message Co-Occurrence Pattern Creation>>

When the calculations of the message co-occurrence probabilities are finished, a message co-occurrence pattern is created by the message co-occurrence pattern creating unit 135.

According to one method for creating a message co-occurrence pattern, if pairs (a,b), (b,c) of message IDs having a co-occurrence probability higher than a threshold are present, the pairs can be grouped by the message ID "b" that is common to the two pairs. A message pattern (a,b,c) is made with the above grouping. The message co-occurrence pattern is made by recursively repeating the above groupings.

However, two types of co-occurrence probabilities, the generated ranking-dependent type co-occurrence probability and the generated ranking-independent type co-occurrence probability, are considered in the second embodiment. In this case, the generated ranking-independent type co-occurrence probability between two messages when focusing on two messages normally is equal to or greater than the generated ranking-dependent type co-occurrence probability. As a result, pairs of the generated ranking-independent type co-occurrence probability are preferentially grouped as patterns when making patterns that treat two types of co-occurrence probabilities equally.

Knowing the direction of relevancy would be evaluated highly when taking the isolation of the influence range or the failure cause into account. As a result, by treating two types of co-occurrence probabilities equally, the value of reference information for isolating is reduced when calculating many relevancies that do not take direction into account.

Accordingly, the message co-occurrence pattern creating unit 135 carries out the message co-occurrence pattern calculation based on the generated ranking-dependent type co-occurrence probability first. Thereafter, the message co-occurrence pattern creating unit 135 uses only the generated ranking-independent type co-occurrence probabilities including messages that do not appear in the generated ranking-dependent type pattern among the generated ranking-independent type co-occurrence probabilities, to lengthen the message co-occurrence pattern.

Figure 26:
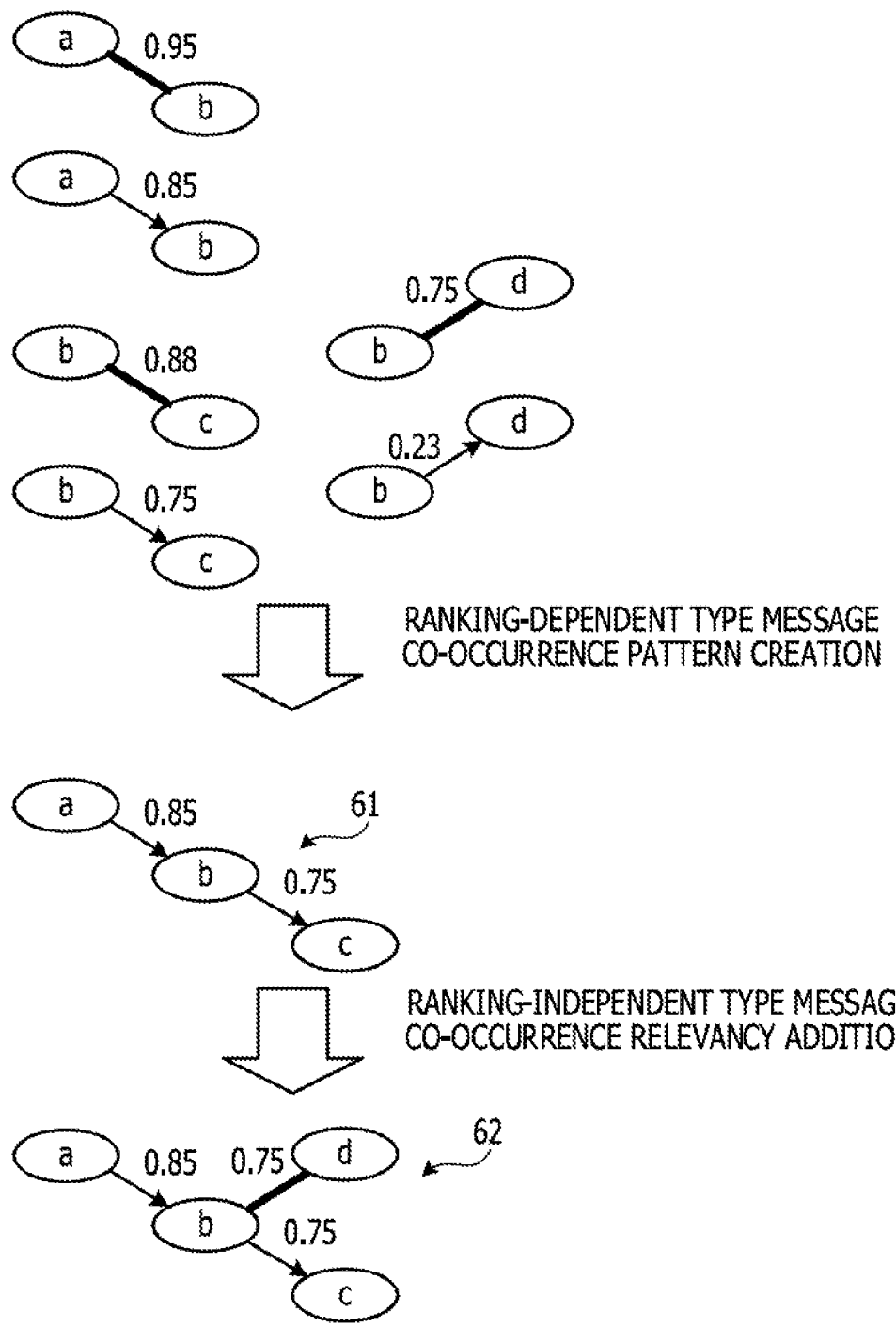
FIG. 26 illustrates an example of creating a message co-occurrence pattern.

FIG. 26 illustrates an example of creating a message co-occurrence pattern. Messages are depicted as oval-shaped figures in the example in FIG. 26. The generated ranking-dependent type co-occurrence probabilities are depicted beside the arrows coupling the messages in the example in FIG. 26. The generated ranking-independent type co-occurrence probabilities are depicted beside the thick lines coupling the messages in the example in FIG. 26.

When a co-occurrence probability is equal to or greater than the threshold of "0.6" in the example in FIG. 26, a co-occurrence relationship is judged to be present. Both the generated ranking-dependent type and the generated ranking-independent type co-occurrence probabilities are equal to or greater than the threshold for the message of the message ID "a" and the message of the message ID "b". Both the generated ranking-dependent type and the generated ranking-independent type co-occurrence probabilities are equal to or greater than the threshold for the message of the message ID "b" and the message of the message ID "c". Only the generated ranking-independent type co-occurrence probability is equal to or greater than the threshold for the message of the message ID "b" and the message of the message ID "d".

At this time, the ranking-dependent type message co-occurrence pattern is created first. Consequently, a message co-occurrence pattern 61 is created in which the message of the message ID "b" is generated subsequent to the message of the message ID "a" and next the message of the message ID "c" is generated. At this time, the ranking-dependent type co-occurrence probability of the message of the message ID "d" does not exceed the threshold along with any other message. As a result, the message of the message ID "d" is not included in the message co-occurrence pattern 61.

Next, the message co-occurrence pattern 61 is expanded based on the ranking-independent type co-occurrence probability. As a result, a message co-occurrence pattern 62 is created in which the message of the message ID "d" is added to the message co-occurrence pattern 61.

The following is an explanation of the message co-occurrence pattern creation processing.

Figure 27:
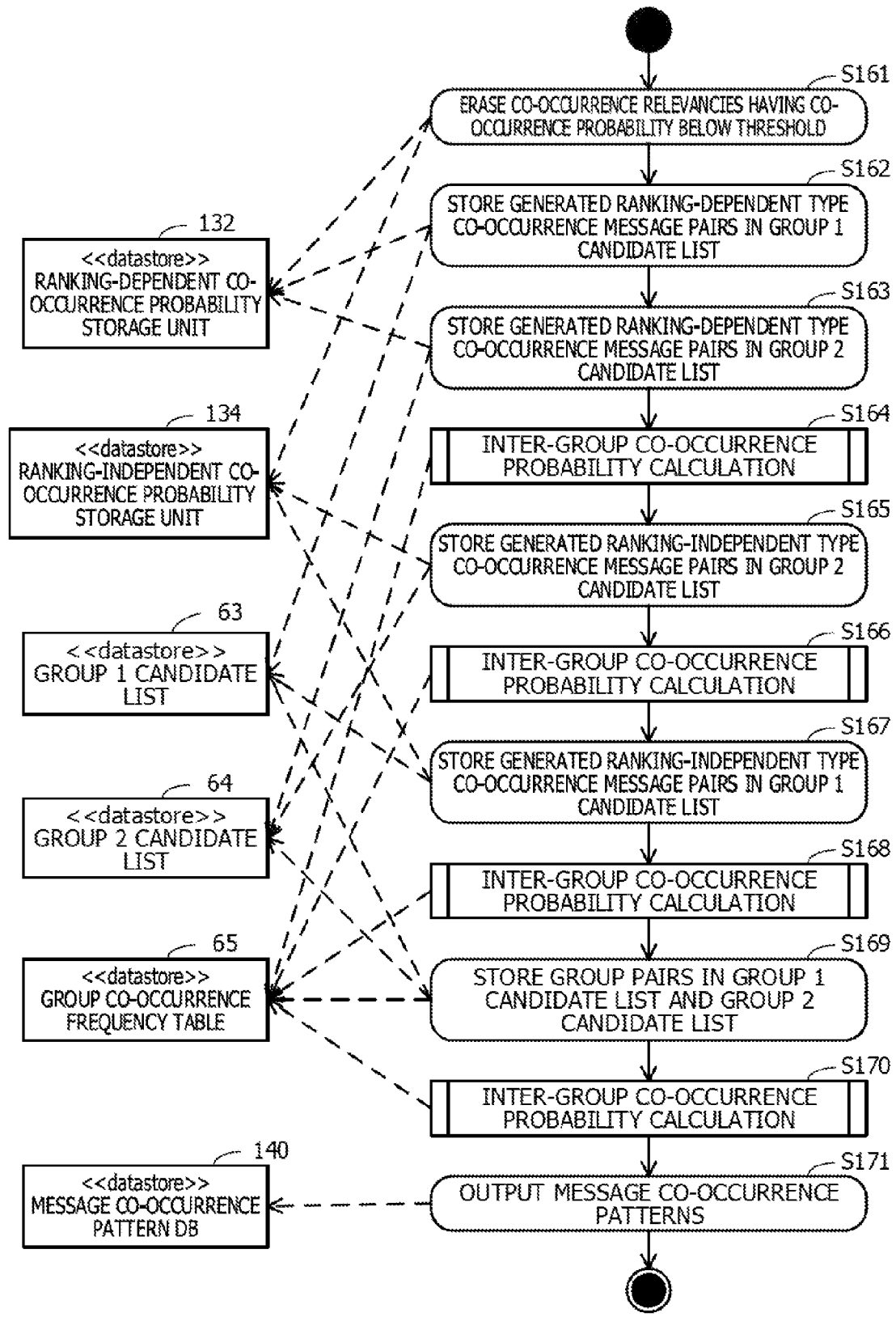
FIG. 27 is an activity diagram illustrating an example of procedures for message co-occurrence pattern creation processing.

FIG. 27 is an activity diagram illustrating an example of procedures for message co-occurrence pattern creation processing. The processing illustrated in FIG. 27 will be explained with step numbers.

[Step S161]

The message co-occurrence pattern creating unit 135 erases co-occurrence probabilities in which the co-occurrence relationship is less than the threshold from the ranking-dependent co-occurrence probability storage unit 132 and the ranking-independent co-occurrence probability storage unit 134. For example, the message co-occurrence pattern creating unit 135 refers to the "co-occurrence probability" field in the ranking-dependent co-occurrence probability table 132a in the ranking-dependent co-occurrence probability storage unit 132 and searches for entries in which the co-occurrence probability is less than the threshold. The message co-occurrence pattern creating unit 135 then erases the applicable entries from the ranking-dependent co-occurrence probability table 132*a*. Similarly, the message co-occurrence pattern creating unit 135 refers to the "co-occurrence probability" field in the ranking-independent co-occurrence probability table 134*a* in the ranking-independent co-occurrence probability storage unit 134 and searches for entries in which the co-occurrence probability is less than the threshold. The message co-occurrence pattern creating unit 135 then erases the applicable entries from the ranking-independent co-occurrence probability table 134*a*.

[Step S162]

The message co-occurrence pattern creating unit 135 acquires all of the pairs of messages having a generated ranking-dependent co-occurrence relationship (co-occurrence message pairs) from the ranking-dependent co-occurrence probability storage unit 132, and stores the acquired pairs in a group 1 candidate list 63 as group 1 candidates. The group 1 candidate list 63 is held, for example, in the memory 102.

[Step S163]

The message co-occurrence pattern creating unit 135 acquires all of the co-occurrence message pairs having a generated ranking-dependent co-occurrence relationship from the ranking-dependent co-occurrence probability storage unit 132, and stores the acquired pairs in a group 2 candidate list 64 as group 2 candidates. The group 2 candidate list 64 is held, for example, in the memory 102.

[Step S164]

The message co-occurrence pattern creating unit 135 carries out co-occurrence probability calculation processing between the groups, with the groups being the group 1 and the group 2, on the co-occurrence message pairs in the group 1 candidate list 63 and the group 2 candidate list 64. As a result, the co-occurrence probabilities are calculated between the two groups having generated ranking-dependent co-occurrence relationships. The message co-occurrence pattern creating unit 135 stores the calculated co-occurrence probabilities in a group co-occurrence frequency table 65. Details of the inter-group co-occurrence probability calculation processing are explained below (see FIG. 29).

FIG. 28 illustrates an example of a group co-occurrence probability table. Fields of a "Group pair ID", "Group 1", "Group 2", "Group 1 generation frequency", "Co-occurrence frequency" and "Co-occurrence probability" are provided in the group co-occurrence frequency table 65.

An identifier (group pair ID) of the combination of two groups is set in the "Group pair ID" field. The co-occurrence message pair set as the group 1 or the group pair ID is set in the "Group 1" field. The co-occurrence message pair set as the group 2 or the group pair ID is set in the "Group 2" field. The frequency in which the co-occurrence relationship depicting the group 1 is generated is set in the "Group 1 generation frequency" field. The frequency in which the co-occurrence relationships between the group 1 and the group 2 is generated is set in the "Co-occurrence frequency" field. The generation probability (co-occurrence probability) of a co-occurrence relationship between the group 1 and the group 2 is set in the "Co-occurrence probability" field.

The explanation now returns to FIG. 27.

[Step S165]

The message co-occurrence pattern creating unit 135 erases (initialization) all of the entries in the group 2 candidate list 64. The message co-occurrence pattern creating unit 135 then acquires all of the pairs (co-occurrence message pairs) of messages having a generated ranking-independent co-occurrence relationship from the ranking-independent co-occurrence probability storage unit 134, and stores the acquired pairs in the group 2 candidate list 64 as group 2 candidates.

[Step S166]

The message co-occurrence pattern creating unit 135 carries out the inter-group co-occurrence probability calculation processing between the respective groups registered in the group 1 candidate list 63 and the group 2 candidate list 64. As a result, the co-occurrence probabilities are calculated between the co-occurrence message pairs having a generated ranking-dependent co-occurrence relationship and the co-occurrence message pairs having a generated ranking-independent co-occurrence relationship. The message co-occurrence pattern creating unit 135 stores the calculated co-occurrence probabilities in a group co-occurrence frequency table 65.

[Step S167]

The message co-occurrence pattern creating unit 135 erases (initialization) all of the entries in the group 1 candidate list 63. The message co-occurrence pattern creating unit 135 then acquires all of the pairs (co-occurrence message pairs) of messages having a generated ranking-independent co-occurrence relationship from the ranking-independent co-occurrence probability storage unit 134, and stores the acquired pairs in the group 1 candidate list 63 as group 1 candidates.

[Step S168]

The message co-occurrence pattern creating unit 135 carries out the inter-group co-occurrence probability calculation processing between the respective groups registered in the group 1 candidate list 63 and the group 2 candidate list 64. As a result, the co-occurrence probabilities are calculated between two groups having generated ranking-independent co-occurrence relationships. The message co-occurrence pattern creating unit 135 stores the calculated co-occurrence probabilities in a group co-occurrence frequency table 65.

[Step S169]

The message co-occurrence pattern creating unit 135 erases (initialization) all of the entries in the group 1 candidate list 63 and all of the entries in the group 2 candidate list 64. Next, the message co-occurrence pattern creating unit 135 extracts combinations (group pairs) of groups in which the co-occurrence probability in the group co-occurrence frequency table 65 is equal to or greater than the threshold. The message co-occurrence pattern creating unit 135 then stores all of the groups included in the extracted combinations in the group 1 candidate list 63 and the group 2 candidate list 64 as group 1 candidates and group 2 candidates.

[Step S170]

The message co-occurrence pattern creating unit 135 carries out the inter-group co-occurrence probability calculation processing between the respective groups of the group 1 candidate list 63 and the group 2 candidate list 64. As a result, the co-occurrence probability between two groups is calculated. The message co-occurrence pattern creating unit 135 stores the calculated co-occurrence probabilities in a group co-occurrence frequency table 65.

[Step S171]

The message co-occurrence pattern creating unit 135 expands the entries in the group co-occurrence frequency table 65 to co-occurrence relationships between messages and outputs the results to the message co-occurrence pattern DB 140 as the message co-occurrence patterns. At this time, the message co-occurrence pattern creating unit 135 may output the message co-occurrence patterns only for the messages in which the co-occurrence probability is equal to or greater than the threshold in the group co-occurrence frequency table 65.

In the group co-occurrence frequency table 65 illustrated in FIG. 28, the entry with the ID "P2001" is set with IDs "P0001" and "P1001" of other entries in the group co-occurrence frequency table 65 as group 1 and group 2. Accordingly, the group 1 is expanded to "I0002" and "D0003" and the group 2 is expanded to "D0003" and "D0141" for the ID "P2001" entry. Because the "D0003" is duplicated, the ID "P2001" entry is expanded to "I0002", "D0003" and "D0141". That is, a message co-occurrence pattern comprising the sets of "I0002", "D0003" and "D0141" is output. The output message co-occurrence pattern is assigned a pattern ID and stored in the message co-occurrence pattern DB 140.

Next, the inter-group co-occurrence probability calculation processing will be explained.

Figure 29:
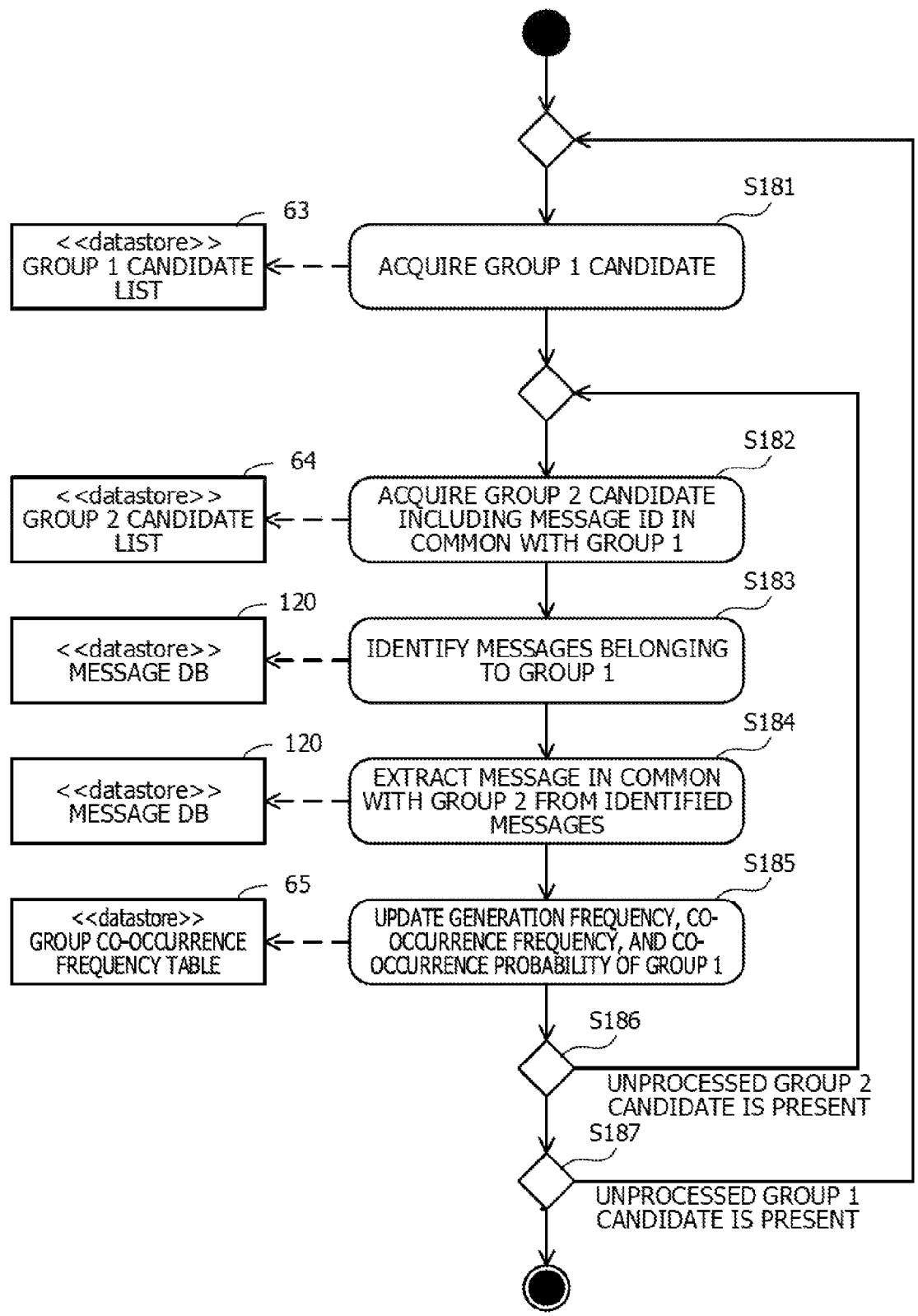
FIG. 29 is an activity diagram illustrating an example of procedures for inter-group co-occurrence probability calculation processing.

FIG. 29 is an activity diagram illustrating an example of procedures for inter-group co-occurrence probability calculation processing. The processing illustrated in FIG. 29 will be explained with step numbers.

[Step S181]

The message co-occurrence pattern creating unit 135 acquires, as the group 1, one group 1 candidate that has not been processed in the group 1 candidate list 63.

[Step S182]

The message co-occurrence pattern creating unit 135 acquires, from the group 2 candidate list 64 as the group 2, one group 2 candidate having a message ID in common with group 1 in an element.

[Step S183]

The message co-occurrence pattern creating unit 135 identifies messages belonging to the group 1 in the message DB 120. For example, the message co-occurrence pattern creating unit 135 identifies messages having the same message IDs as the message IDs included in the group 1.

[Step S184]

The message co-occurrence pattern creating unit 135 extracts messages common to group 2 among the messages identified in step S183 in the message DB 120. The number of extracted messages becomes the co-occurrence frequency of the group 1 and the group 2.

Figure 30:
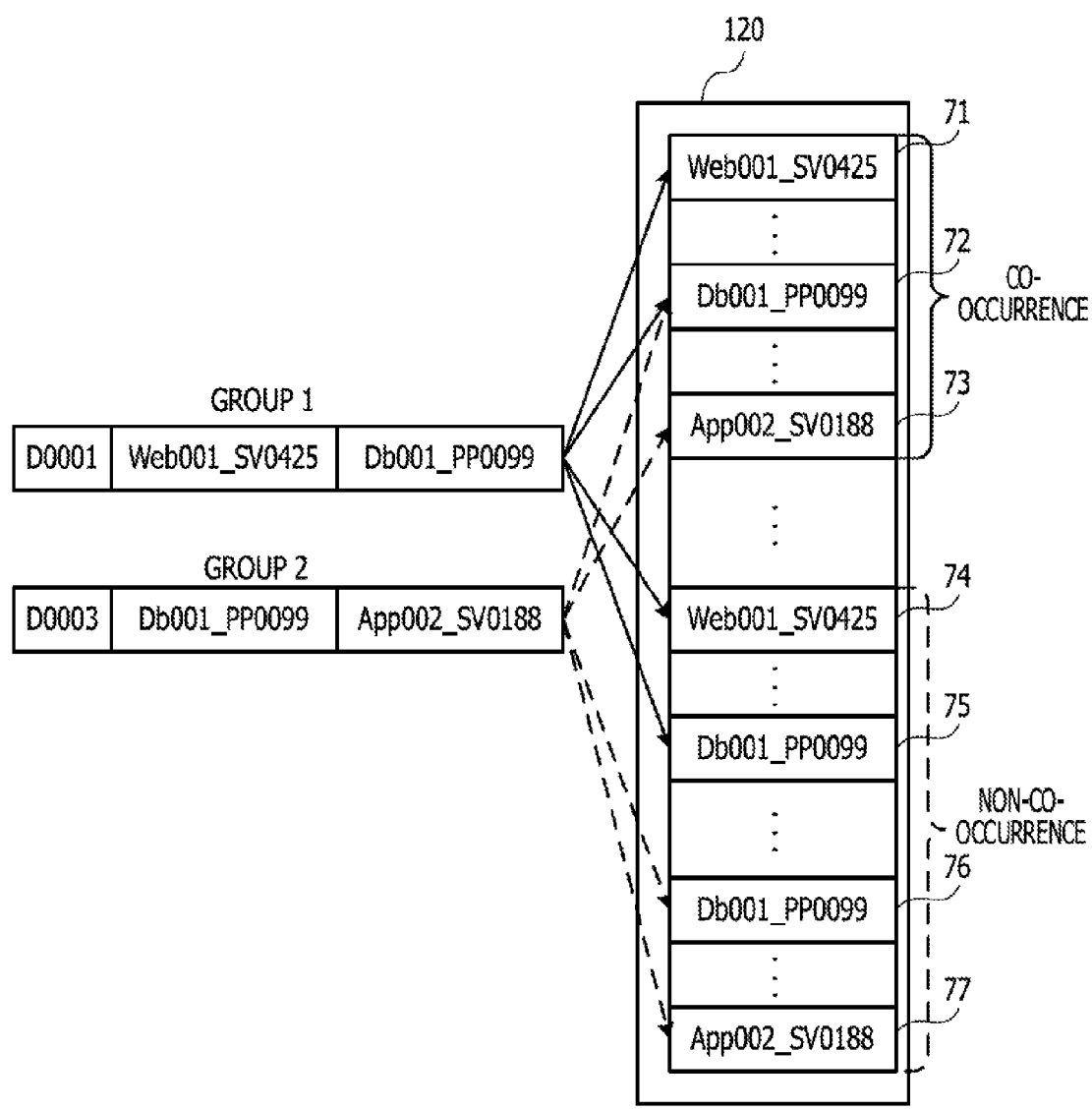
FIG. 30 illustrates an example of a co-occurrence relationship between groups.

FIG. 30 illustrates an example of a co-occurrence relationship between groups. Messages 71, 72, 74 and 75 in the message DB 120 belong to the group 1 in the example in FIG. 30. The message 72 is generated within the co-occurrence period after the message 71 is generated, and the two messages have a co-occurrence relationship. Similarly, the message 75 is generated within the co-occurrence period after the message 74 is generated, and the two messages have a co-occurrence relationship.

Moreover, messages 72, 73, 76 and 77 in the message DB 120 belong to the group 2. The message 73 is generated within the co-occurrence period after the message 73 is generated, and the two messages have a co-occurrence relationship. Similarly, the message 77 is generated within the co-occurrence period after the message 75 is generated, and the two messages have a co-occurrence relationship.

At this time, the message 72 belongs to both the group 1 and the group 2. Therefore, one co-occurrence relationship is counted due to the messages 71 to 73. On the other hand, the messages 74 and 75 in group 1 and the messages 76 and 77 in group 2 do not have common messages and do not have co-occurrence relationships.

The extraction of co-occurrence relationships between groups in this way is carried out in the steps S183 and S184. The explanation now returns to FIG. 29.

[Step S185]

The message co-occurrence pattern creating unit 135 updates the values of the generation frequencies, the co-occurrence frequencies, and the co-occurrence probabilities of the group 1 for each entry corresponding to the current group 1 and the group 2 in the group co-occurrence frequency table 65. The co-occurrence probability is a value, for example, derived by dividing the co-occurrence frequency by the generation frequency of the group 1. Similar to the example depicted in FIG. 25, the co-occurrence probability may be a value derived by dividing two times the co-occurrence frequency by the sum of the generation frequency of the group 1 and the generation frequency of the group 2.

[Step S186]

The message co-occurrence pattern creating unit 135 judges whether there are any unprocessed group 2 candidates in the group 2 candidate list 64. If an unprocessed group 2 candidate is present, the processing of the message co-occurrence pattern creating unit 135 advances to step S182. If no unprocessed group 2 candidates are present, the processing of the message co-occurrence pattern creating unit 135 advances to step S187.

[Step S187]

The message co-occurrence pattern creating unit 135 judges whether there are any unprocessed group 1 candidates in the group 1 candidate list 63. If an unprocessed group 1 candidate is present, the processing of the message co-occurrence pattern creating unit 135 advances to step S181. If no unprocessed group 1 candidate is present, the message co-occurrence pattern creating unit 135 ends the inter-group co-occurrence probability calculation processing.

As described above, the message co-occurrence pattern is created and stored in the message co-occurrence pattern DB 140.

<<Inter-CI Relevancy Calculation>>

When the creation of the message co-occurrence pattern is completed, the inter-CI relevancy calculation processing is carried out by the inter-CI relevancy calculating unit 150.

For example, presuming there are relevancies among the output origins of the respective messages in the co-occurrence message pattern (a, b, c) and making a co-occurrence CI pattern in the same shape as the message pattern may be considered as a method for calculating relevancy between CIs.

Figure 31:
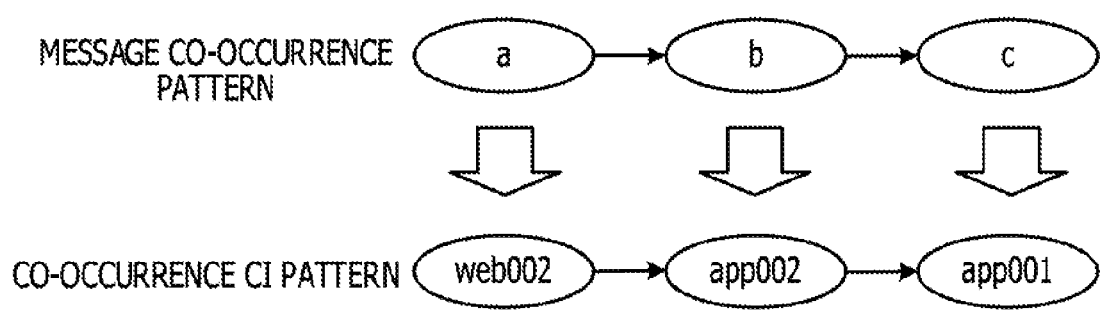
FIG. 31 illustrates an example of creating a co-occurrence IC pattern.

FIG. 31 illustrates an example of creating a co-occurrence CI pattern. The message co-occurrence pattern is represented by message IDs (a,b,c) of messages having co-occurrence relationships. As illustrated in FIG. 6, the name of the output origin CI and the message class are included in the message ID. Accordingly, a co-occurrence CI pattern can be created by extracting the output origin from each message ID included in the message co-occurrence pattern.

However, while the presence or absence of relevancies between CIs can be understood when focusing on separate co-occurrence CI patterns, the strength of relevancy thereof is not understood by merely making the co-occurrence CI pattern in this way. As a result, although the investigation range is understood, the apparatus to be preferentially investigated during a failure is not understood thus hindering the quick isolation of the failure. Accordingly, the inter-CI relevancy calculating unit 150 focuses on a random CI, summarizes the co-occurrence CI patterns including the applicable CI, and calculates a strength of relevancy between the CIs from the summarized co-occurrence relationships.

Figure 32:
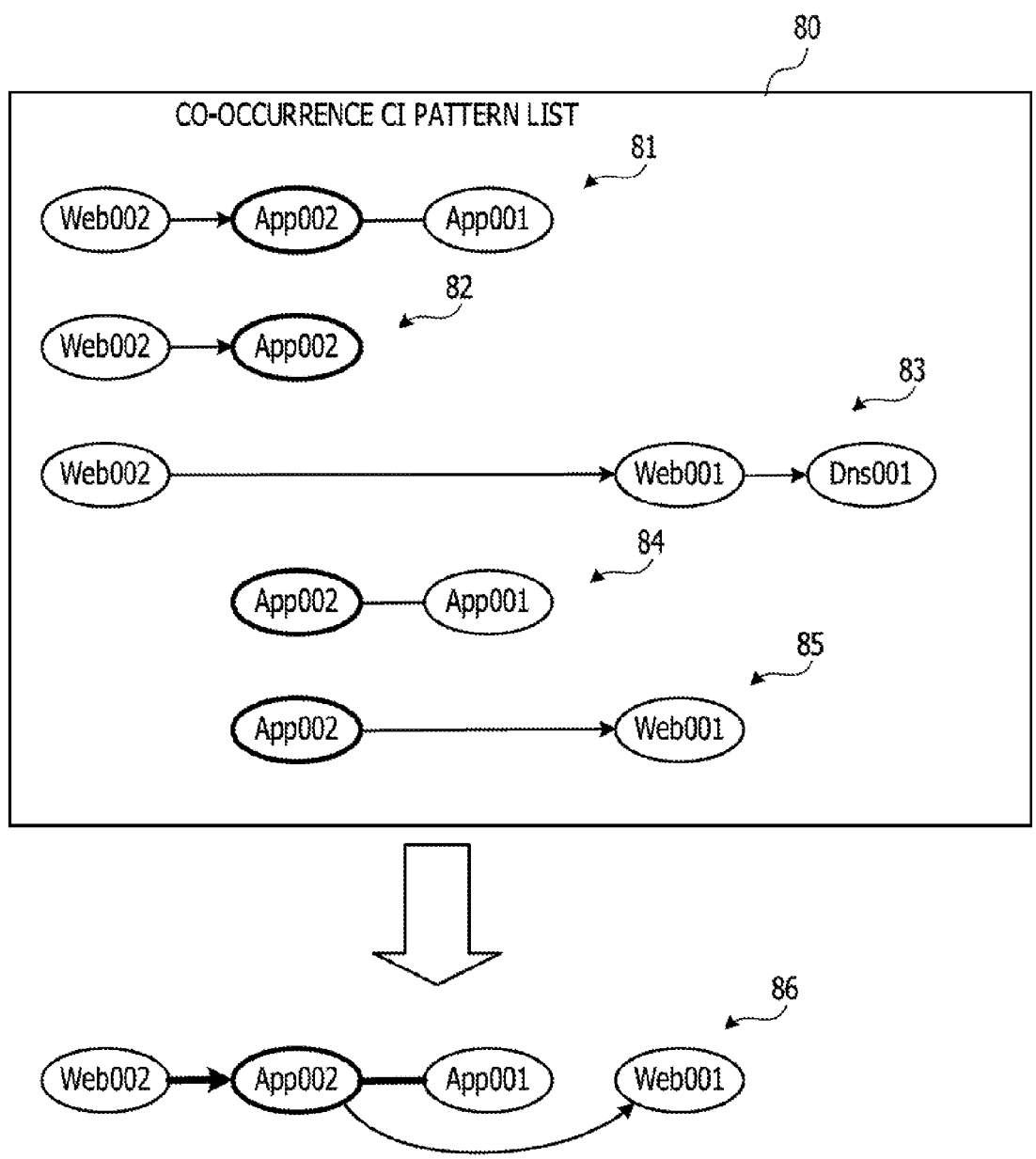
FIG. 32 illustrates an example of calculating the strength of relevancy between CIs.

FIG. 32 illustrates an example of calculating the strength of relevancy between CIs. For example, co-occurrence CI patterns 81 to 85 as illustrated in FIG. 31 are created from each of the message co-occurrence patterns registered in the message co-occurrence pattern DB 140, whereby a co-occurrence CI pattern list 80 is made. For example, an inter-CI relevancy graph 86 indicating the relevancies centered on the CI "App002" is made by focusing on the CI "App002".

In the example in FIG. 32, the CI "Web002" has relevancy with the CI "App002" on the upstream side in two co-occurrence CI patterns 81 and 82. Accordingly, the CI "App002" and the CI "Web002" are coupled by a strong directional relevancy in the inter-CI relevancy graph 86. In the example in FIG. 32, a strong relevancy is indicated by a thick arrow line.

Similarly, the CI "App002" demonstrates non-directional relevancy with the CI "App002" in two co-occurrence CI patterns 81 and 84. Accordingly, the CI "App002" and the CI "App001" are coupled by a strong non-directional relevancy in the inter-CI relevancy graph 86. In the example in FIG. 32, a strong relevancy is indicated by a thick solid line.

The CI "Web001" demonstrates relevancy with the CI "App002" on the downstream side in one co-occurrence CI pattern 85. Accordingly, the CI "App002" and the CI "Web001" are coupled by a weak directional relevancy in the inter-CI relevancy graph 86. In the example in FIG. 32, a weak relevancy is indicated by a thin arrow line.

In this way, the priority ranking for investigation when isolating the cause of the failure and the influence range is made clear by indicating the strength of relevancy between CIs with the inter-CI relevancy graph 86. That is, the priority ranking for investigation of the CI "Web002" is increased in the cause investigation if the failure is generated in the CI "App002". Moreover, the priority ranking for investigation is increased for the influence range search for the CI "App002".

FIG. 32 illustrates an example of the inter-CI relevancy strength calculation and other various calculation methods may be considered. For example, the co-occurrence probability, the number of types of co-occurrence relationships, or the generation frequency of the co-occurrence relationships may be used as calculation criteria for calculating the strength of relevancy between two CIs. Any one of the above calculation criteria may be used or two or more of the above calculation criteria may be combined for calculating the relevancy strength between CIs. Only the co-occurrence probability is used in the second embodiment which depicts an example of calculating the relevancy strength between CIs. Examples of calculating the relevancy strength between CIs by combining a plurality of calculation criteria are explained below in the third to fifth embodiments.

When calculating the relevancy strength between CIs using only the co-occurrence probability, for example, the highest co-occurrence probability among the respective co-occurrence probabilities of the message pairs representing the co-occurrence relationships generated between two CIs, serves as the strength of relevancy between the two applicable CIs. The following is an explanation of the inter-CI relevancy calculation processing.

Figure 33:
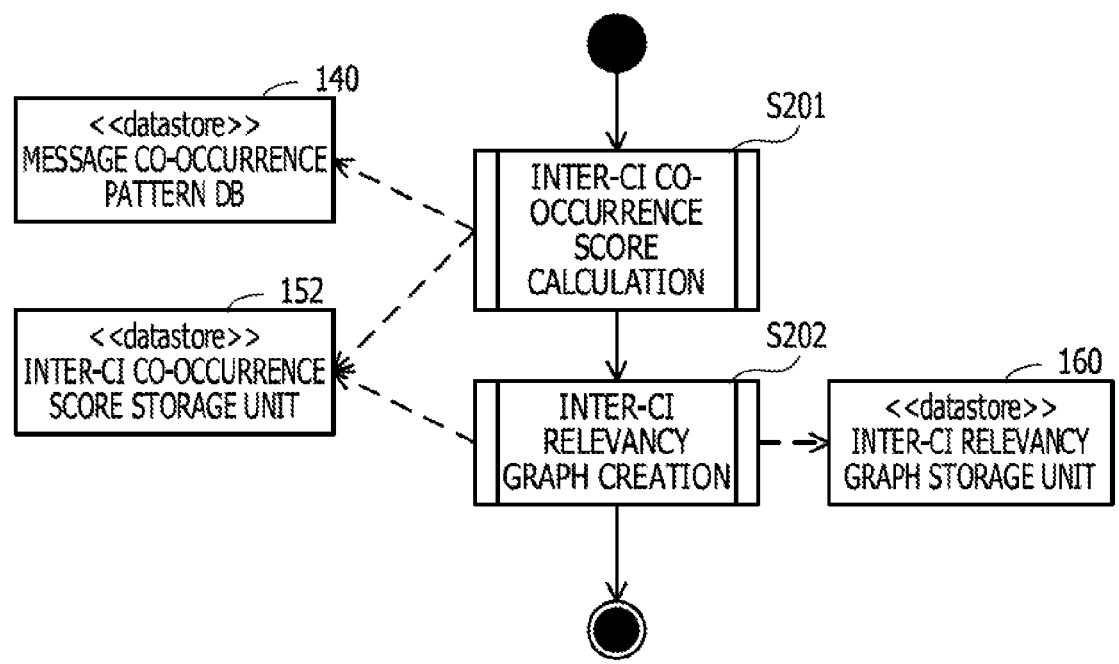
FIG. 33 is an activity diagram illustrating an example of procedures for inter-CI relevancy calculation processing.

FIG. 33 is an activity diagram illustrating an example of procedures for inter-CI relevancy calculation processing. The processing illustrated in FIG. 33 will be explained with step numbers.

[Step S201]
The inter-CI co-occurrence score calculating unit 151 refers to the message co-occurrence pattern DB 140 and calculates the inter-CI co-occurrence scores. The inter-CI co-occurrence score calculating unit 151 sets the calculated inter-CI co-occurrence scores in the inter-CI co-occurrence score storage unit 152. Details of the inter-CI occurrence score calculation processing are explained below (see FIG. 34).

[Step S202]
The inter-CI relevancy graph creating unit 153 refers to the inter-CI co-occurrence score storage unit 152 and creates the inter-CI relevancy graph. The inter-CI relevancy graph creating unit 153 then stores the information representing the inter-CI relevancy graph in the inter-CI relevancy graph storage unit 160. Details of the inter-CI relevancy graph creation processing are explained below (see FIG. 36).

The following is an explanation of the inter-CI co-occurrence score calculation processing.

Figure 34:
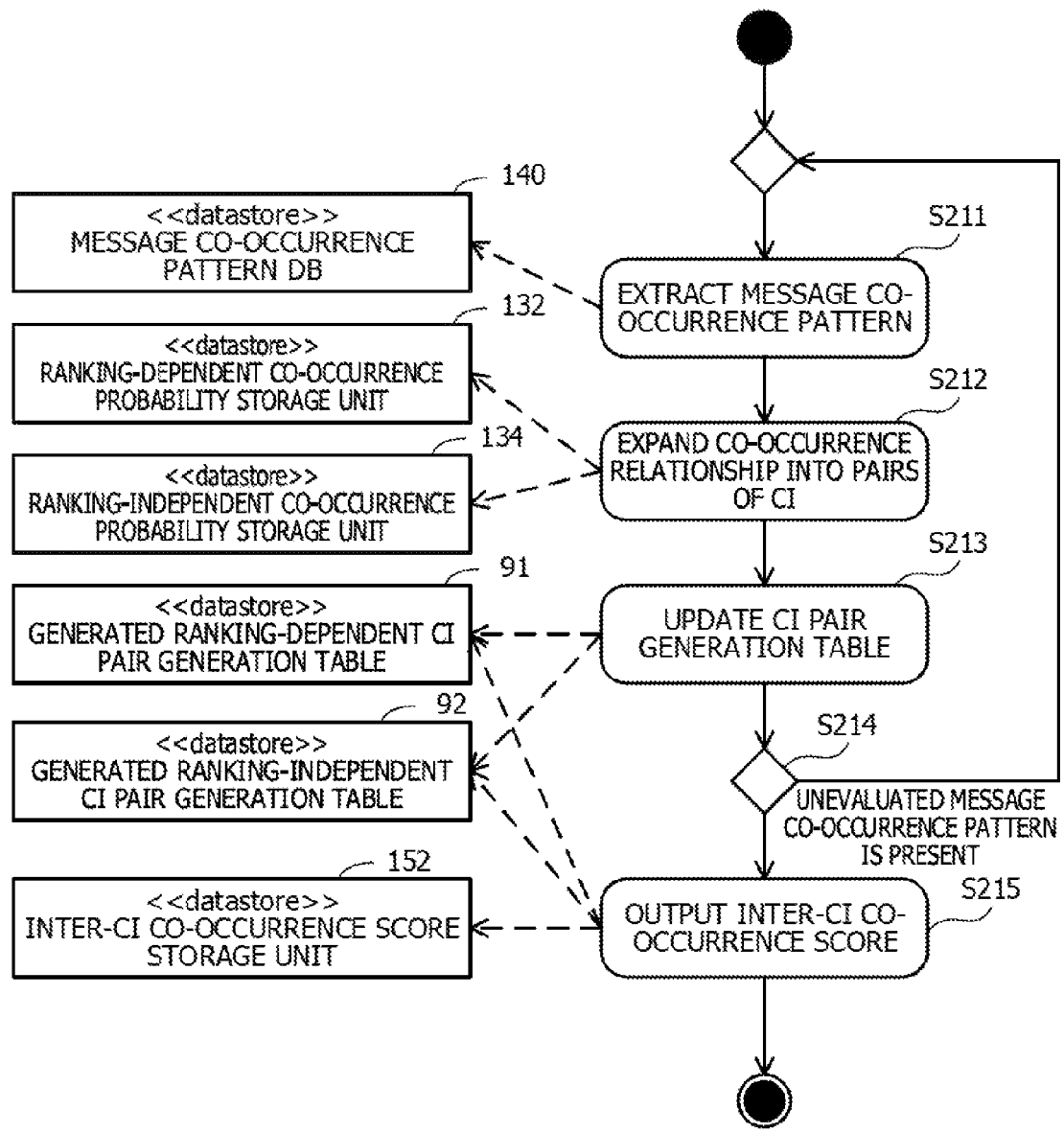
FIG. 34 is an activity diagram illustrating an example of procedures for inter-CI co-occurrence score calculation processing.

FIG. 34 is an activity diagram illustrating an example of procedures for inter-CI co-occurrence score calculation processing. The processing illustrated in FIG. 34 will be explained with step numbers.

[Step S211]
The inter-CI co-occurrence score calculating unit 151 extracts one message co-occurrence pattern from the message co-occurrence pattern DB 140.

[Step S212]
The inter-CI co-occurrence score calculating unit 151 expands the co-occurrence relationship of the extracted message co-occurrence pattern to pairs of CIs. For example, IDs assigned to the combinations of co-occurring messages are set in the message co-occurrence pattern as illustrated in FIG. 10. The inter-CI co-occurrence score calculating unit 151 retrieves entries corresponding to the IDs included in the message co-occurrence pattern from the ranking-dependent co-occurrence probability storage unit 132 or the ranking-independent co-occurrence probability storage unit 134. The inter-CI co-occurrence score calculating unit 151 then expands the co-occurrence IDs included in the message co-occurrence pattern to a set of IDs included in the corresponding entry. The inter-CI co-occurrence score calculating unit 151 extracts the names of the CIs from each of the message IDs that have been grouped as sets and designates CI pairs. The inter-CI co-occurrence score calculating unit 151 assigns a co-occurrence ID of the set of co-occurring messages to the expanded and acquired CI pair.

[Step S213]
The inter-CI co-occurrence score calculating unit 151 updates a CI pair generation table. The CI pair generation table is a data table in which, for each pair of two CIs, the generation probability of the message co-occurrence pattern to which the pair belongs is set. The CI pair generation table includes two types, a generated ranking-dependent type CI pair generation table 91 and a generated ranking-independent type CI pair generation table 92.

Figure 35:
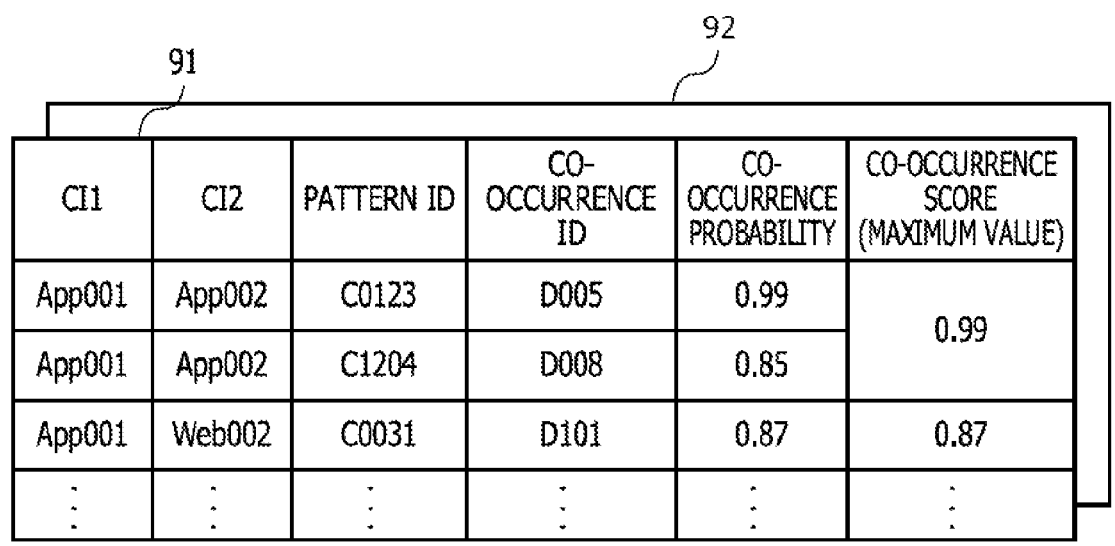
FIG. 35 illustrates an example of a CI pair generation table.

FIG. 35 illustrates an example of a CI pair generation table. The generated ranking-dependent type CI pair generation table 91 is provided with the fields of "CI1", "CI2", "Pattern ID", "Co-occurrence ID", "Co-occurrence probability" and "Co-occurrence score". The names of the CIs that configure the CI pair of the output origin of the message pair when the message co-occurrence pattern is expanded to the message pair are set in the "CI1" field and the "CI2" field. The pattern ID of the message co-occurrence pattern that is the creation origin of the CI pair is set in the "Pattern ID" field. The co-occurrence ID of the message pair for which the corresponding CI pair is the output origin among the message pairs indicated by the co-occurrence IDs in the corresponding message co-occurrence pattern, is set in the "Co-occurrence ID" field. The co-occurrence probability of the message pair indicated by the corresponding co-occurrence ID is set in the "Co-occurrence probability" field. The maximum value of the co-occurrence probability among the message pairs common to the CI pair is set as the co-occurrence score of the applicable CI pair in the "Co-occurrence score" field.

For example, the message pair (co-occurrence IDs "D005", "D008") for which the CI "App001" and the CI "App002" are the output origins may be included respectively in two message co-occurrence patterns. The co-occurrence probability of the message pair of co-occurrence ID "D005" is "0.99" and the co-occurrence probability of the message pair of co-occurrence ID "D008" is "0.85". The maximum value of the two co-occurrence probabilities is "0.99" and thus the co-occurrence score for the pair of the CI "App001" and the CI "App002" is "0.99".

The same information as the generated ranking-dependent type CI pair generation table 91 is also stored in the generated ranking-independent type CI pair generation table 92.

When updating the CI pair generation tables, the inter-CI co-occurrence score calculating unit 151 updates the generated ranking-dependent type CI pair generation table 91 if the CI pair is extracted from an ranking-dependent co-occurrence relationship. Moreover, the inter-CI co-occurrence score calculating unit 151 updates the generated ranking-independent type CI pair generation table 92 if the CI pair is extracted from an ranking-independent co-occurrence relationship. What type of co-occurrence relationship the CI pair is to be extracted from is judged based on the co-occurrence ID assigned to the CI pair. For example, in the examples in FIGS. 8 and 9, the co-occurrence ID assigned to the set of the ranking-dependent co-occurrence message starts with the letter "D", and the co-occurrence ID assigned to the set of the ranking-independent co-occurrence message starts with the letter "I".

When updating the CI pair generation tables, the inter-CI co-occurrence score calculating unit 151 adds the information of the CI pair to the generated ranking-dependent type CI pair generation table 91 or the generated ranking-independent type CI pair generation table 92 and updates the co-occurrence score corresponding to the applicable CI pair.

The explanation now returns to FIG. 34.

[Step S214]

The inter-CI co-occurrence score calculating unit 151 judges whether there is an unevaluated message co-occurrence pattern. If there is an unevaluated message co-occurrence pattern, the processing of the inter-CI co-occurrence score calculating unit 151 advances to step S211. If there is no unevaluated message co-occurrence pattern, the processing of the inter-CI co-occurrence score calculating unit 151 advances to step S215.

[Step S215]

The inter-CI co-occurrence score calculating unit 151 outputs the inter-CI co-occurrence scores to the inter-CI co-occurrence score storage unit 152. For example, the inter-CI co-occurrence score calculating unit 151 extracts the co-occurrence scores for each CI pair from the respective generated ranking-dependent type CI pair generation table 91 and the generated ranking-independent type CI pair generation table 92. The inter-CI co-occurrence score calculating unit 151 then sets the extracted co-occurrence scores in the positions corresponding to the CI pairs in an inter-CI co-occurrence score table in the inter-CI co-occurrence score storage unit 152.

In this way, the inter-CI co-occurrence score is calculated. The inter-CI relevancy graph is created by the inter-CI relevancy graph creating unit 153 based on the calculated inter-CI co-occurrence scores.

Figure 36:
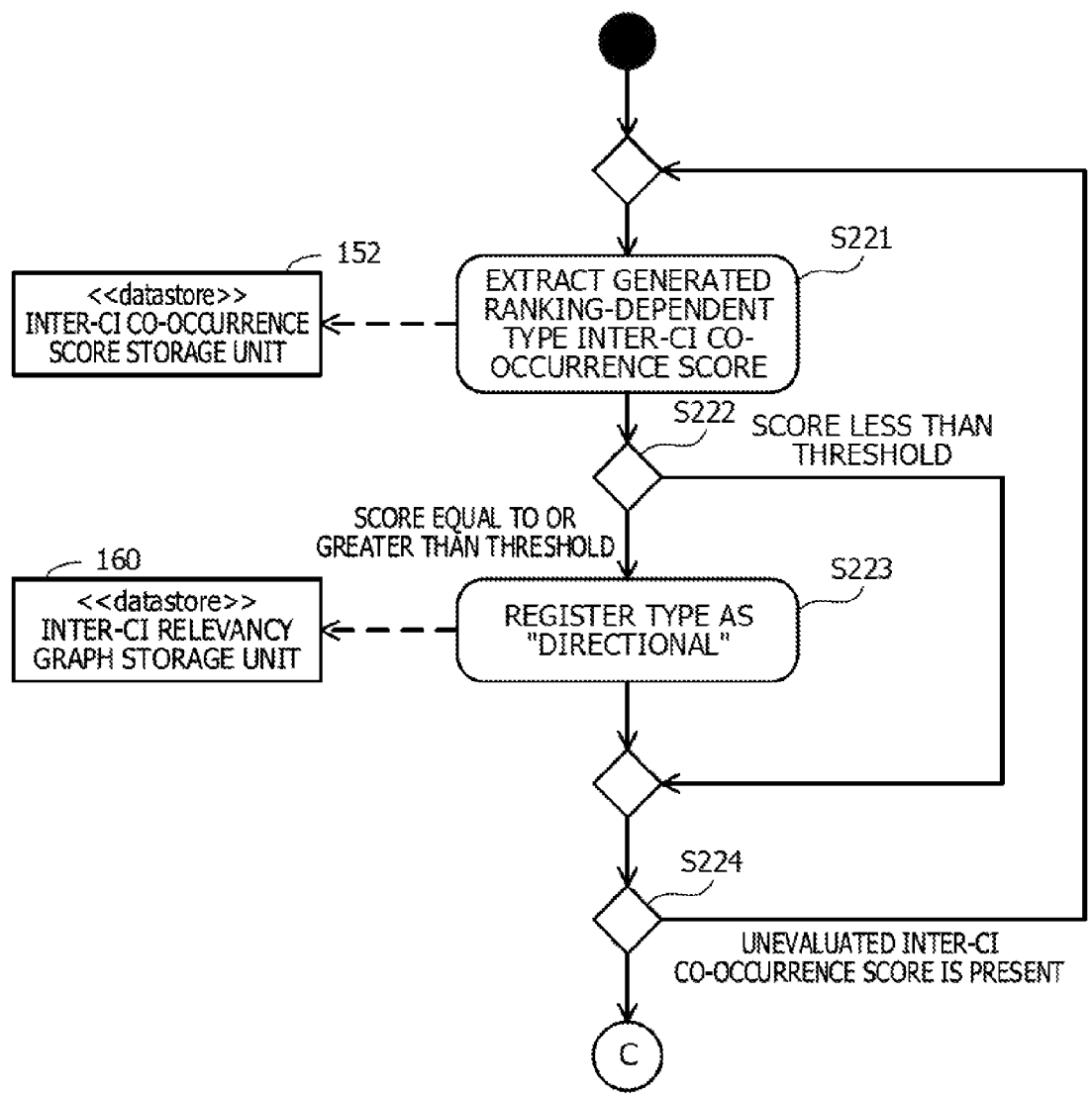
FIGS. 36 and 37 are activity diagrams illustrating an example of procedures for inter-CI relevancy graph creation processing.
Figure 37:
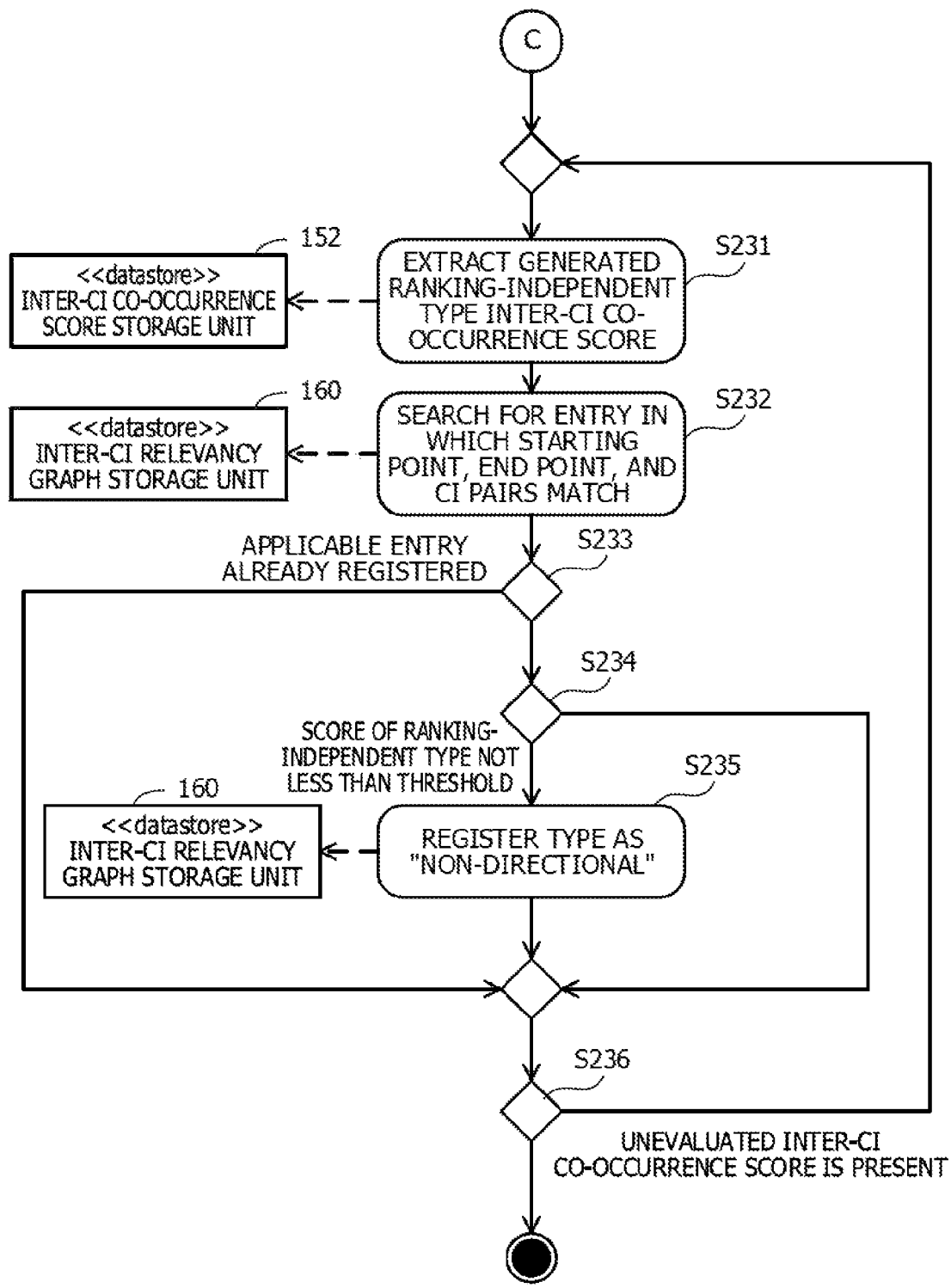

FIGS. 36 and 37 are activity diagrams illustrating an example of procedures for inter-CI relevancy graph creation processing. The processing illustrated in FIG. 36 will be explained with step numbers.

[Step S221]

The inter-CI relevancy graph creating unit 153 refers to the inter-CI co-occurrence score storage unit 152 and extracts one entry of the generated ranking-dependent type inter-CI co-occurrence score. The starting point CI, the end point CI, and the co-occurrence score are included in the extracted entry.

[Step S222]

The inter-CI relevancy graph creating unit 153 judges whether the generated ranking-dependent type co-occurrence score is equal to or greater than the threshold. If the co-occurrence score is equal to or greater than the threshold, the processing of the inter-CI relevancy graph creating unit 153 advances to step S223. If the co-occurrence score is less than the threshold, the processing of the inter-CI relevancy graph creating unit 153 advances to step S224.

[Step S223]

The inter-CI relevancy graph creating unit 153 adds the type "directional" to the contents of the entry extracted in step S221 and registers the type in the inter-CI relevancy graph storage unit 160.

[Step S224]

The inter-CI relevancy graph creating unit 153 judges whether there is an unevaluated generated ranking-dependent type inter-CI co-occurrence score. If there is an unevaluated co-occurrence score, the processing of the inter-CI relevancy graph creating unit 153 advances to step S221. If there is no unevaluated co-occurrence score, the processing of the inter-CI relevancy graph creating unit 153 advances to step S231 (see FIG. 37).

The processing illustrated in FIG. 37 will be explained with step numbers.

[Step S231]

The inter-CI relevancy graph creating unit 153 extracts one entry of the generated ranking-independent type inter-CI co-occurrence score from the inter-CI co-occurrence score storage unit 152.

[Step S232]

The inter-CI relevancy graph creating unit 153 searches for an entry in which the starting point and the end point matches with the entry extracted in step S231, from the inter-CI relevancy graph storage unit 160.

[Step S233]

The processing of the inter-CI relevancy graph creating unit 153 advances to step S236 when it is learned that the entry is already registered in the inter-CI relevancy graph storage unit 160 due to the searching in step S232. If the entry is not registered, the processing of the inter-CI relevancy graph creating unit 153 advances to step S234.

[Step S234]

The inter-CI relevancy graph creating unit 153 judges whether the co-occurrence score of the entry extracted in step S231 is equal to or greater than the threshold. If the co-occurrence score is equal to or greater than the threshold, the processing of the inter-CI relevancy graph creating unit 153 advances to step S235. If the co-occurrence score is less than the threshold, the processing of the inter-CI relevancy graph creating unit 153 advances to step S236.

[Step S235]

The inter-CI relevancy graph creating unit 153 adds the type "non-directional" to the contents of the entry extracted in step S231 and registers the type in the inter-CI relevancy graph storage unit 160.

[Step S236]

The inter-CI relevancy graph creating unit 153 judges whether there is an unevaluated generated ranking-independent type inter-CI co-occurrence score. If there is an unevaluated co-occurrence score, the processing of the inter-CI relevancy graph creating unit 153 advances to step S231. If there is no unevaluated co-occurrence score, the inter-CI relevancy graph creating unit 153 ends the inter-CI relevancy graph creation processing.

In this way, information that defines the inter-CI relevancy graph as illustrated in FIG. 13 is stored in the inter-CI relevancy graph storage unit 160. For example, the starting point CI and the end point CI for each entry in the inter-CI relevancy table 161 illustrated in FIG. 13 are designated as nodes, and the inter-CI relevancy graph 86 as illustrated in FIG. 32 is created by coupling the nodes with the line corresponding to the influence type. The thickness of the line coupling the nodes is the thickness corresponding to the co-occurrence score of the relationship indicated by the line.

<Inter-CI Influence Calculation>

The following is an explanation of the inter-CI influence calculation processing. A CI that has a relationship with the CI that caused the failure is obtained by tracing the relevancy between CIs depicted in the inter-CI relevancy graph storage unit 160.

Figure 38:
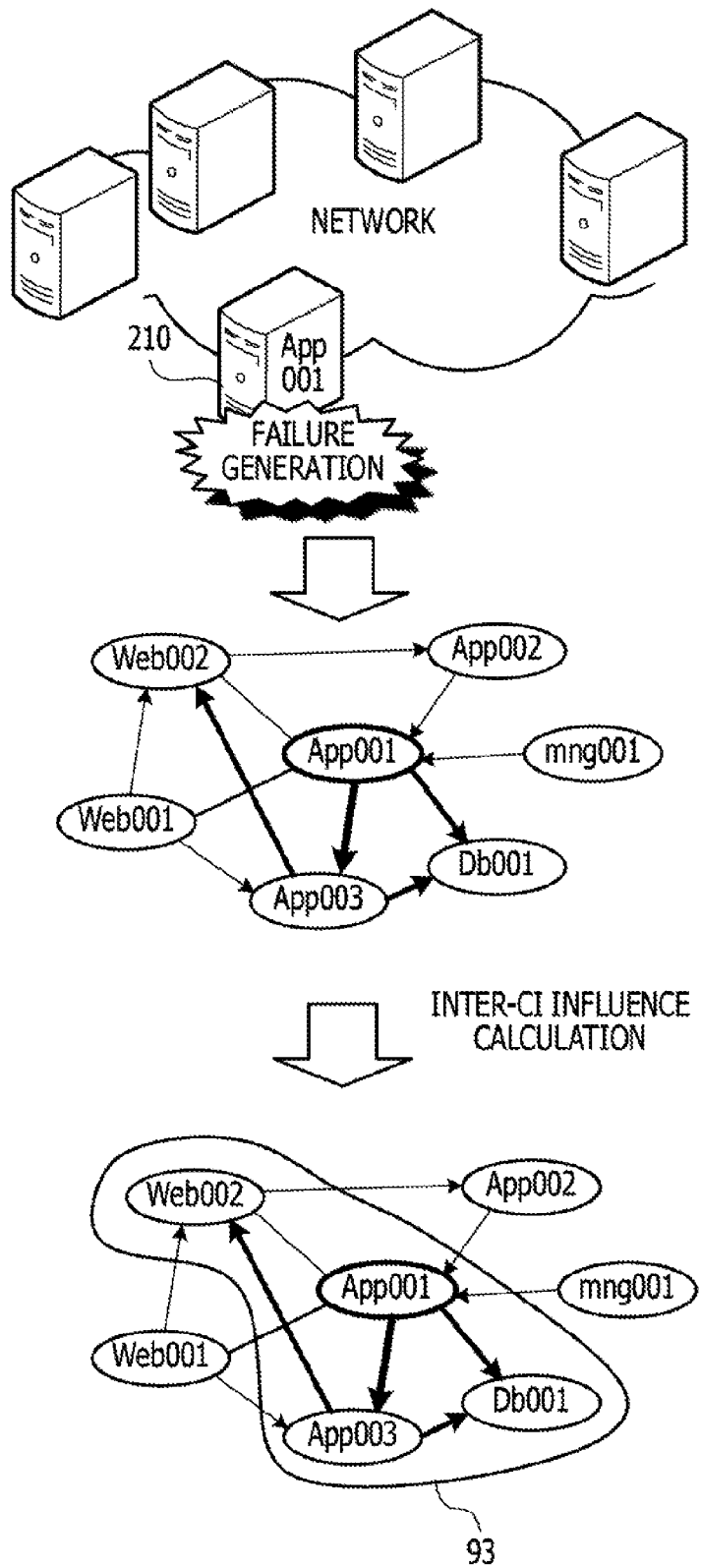
FIG. 38 illustrates an example of inter-CI influence calculation.

FIG. 38 illustrates an example of inter-CI influence calculation. For example, the CI "App001" operated in the managed machine 210 is designated as the CI in which the failure occurred. Accordingly, the inter-CI influence evaluating unit 170 of the management server 100 refers to the inter-CI relevancy graph storage unit 160, traces the relevancy of the CI "App001" as the starting point, and extracts the CI directly or indirectly relevant to the CI "App001". The inter-CI influence evaluating unit 170 then decides the range of the CIs linked by relevancy in which the strength of relevancy (co-occurrence score) equal to or greater than the threshold is determined to be an investigation range 93.

Moreover, the strength of relevancy between the CIs is indicated by the co-occurrence score in the inter-CI relevancy graph storage unit 160. The types of relevancies include a relevancy calculated from the co-occurrence relationship which takes into account the generated order ("directional" influence type) and a relevancy calculated from the co-occurrence relationship which does not take into account the generated order ("non-directional" influence type).

Messages from a plurality of CIs are generated in which the generation time is swapped according to a certain percentage. As a result, the swapping of the generation time has an influence and the actual range of influence in the system may be overlooked when only the co-occurrence relationship that takes into account the order of the messages is used to trace the relevancy between CIs. Accordingly, the inter-CI influence evaluating unit 170 uses both the relevancy calculated from the co-occurrence relationships that take into account the generated ranking and co-occurrence relationships that do not take into account the generated ranking when tracing the relevancy between CIs.

For example, the inter-CI influence evaluating unit 170 first searches for a co-occurrence relationship (self to other) that takes into account the generated ranking in order to identify the influence range of the failure when tracing the next CI from a certain CI. Next, the inter-CI influence evaluating unit 170 searches for a co-occurrence relationship (other to self) that takes into account the generated ranking in order to identify the influence range of the failure. Finally, the inter-CI influence evaluating unit 170 searches for a co-occurrence relationship that does not take into account the generated ranking in order to identify the apparatuses which influence in both directions.

The inter-CI influence evaluating unit 170 traces the relevancies while carrying out the above procedures recursively whereby the influence range is extracted without omission even if the swapping of the generation times of messages are involved. For example, in the judgment of the influence range determined by the co-occurrence relationship which only takes into account the generated ranking in the inter-CI relevancy graph illustrated in FIG. 32, the relevancy of the CI "App001" with regard to the CI "App002" is not recognized. The relevancy of the CI "App001" with regard to the CI "App002" is recognized based on the judgment of the influence range that includes the co-occurrence relationship which does not take into account the generated ranking.

Figure 39:
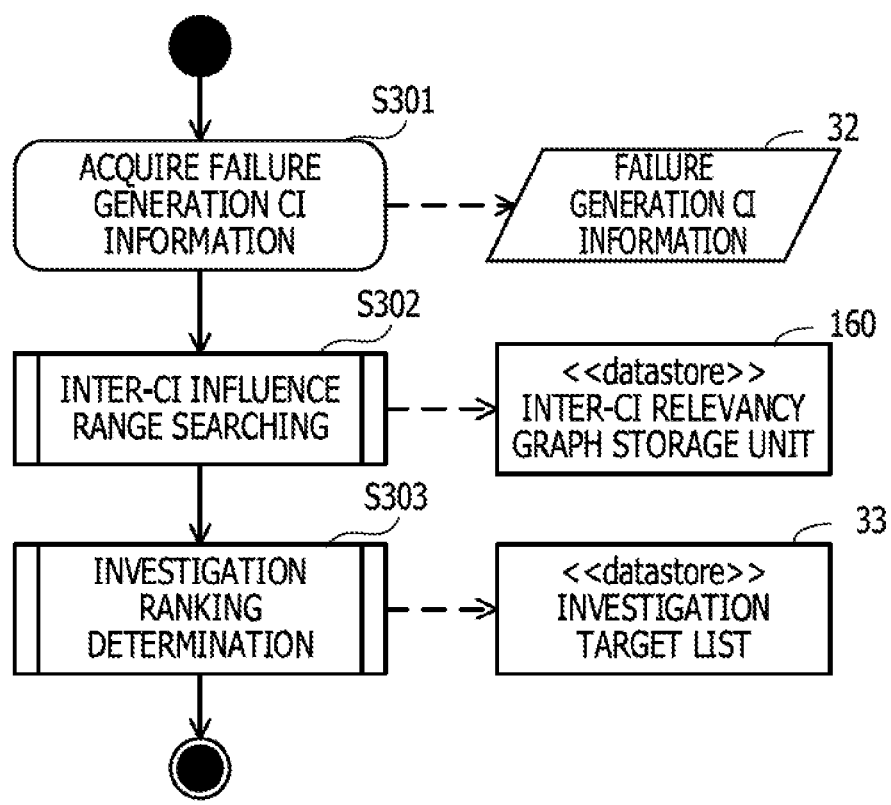
FIG. 39 is an activity diagram illustrating an example of procedures for inter-CI influence calculation processing.

FIG. 39 is an activity diagram illustrating an example of procedures for inter-CI influence calculation processing. The processing illustrated in FIG. 39 will be explained with step numbers.

[Step S301]

The inter-CI influence range searching unit 171 acquires the failure generation CI information 32. The name, for example, of the CI in which the failure is generated is included in the failure generation CI information 32. The failure generation CI information 32 is input, for example, into the management server 100 by the operator of the system. Moreover, the management server 100 identifies the CI in which the failure is generated from error messages and the like among the messages collected from the managed machines 210, 220, . . . , and the failure generation CI information 32 including the name of the applicable CI may be input automatically to the inter-CI influence range searching unit 171.

[Step S302]

The inter-CI influence range searching unit 171 refers to the inter-CI relevancy graph storage unit 160 and carries out inter-CI influence range searching processing. The inter-CI influence range searching processing is processing for searching for a CI that has a possibility of influenced by the failure, or a CI that influences up to the generation of the failure. Details of the inter-CI influence range searching processing are explained below (see FIG. 41).

[Step S303]

The investigation ranking determining unit 172 carries out investigation ranking determination processing for each CI judged as having an influence as a result of the searching. The investigation ranking determining unit 172 outputs an investigation target list 33 to which the determined investigation ranking is applied. Details of the investigation ranking determination processing is explained below (see FIG. 49).

Figure 40:
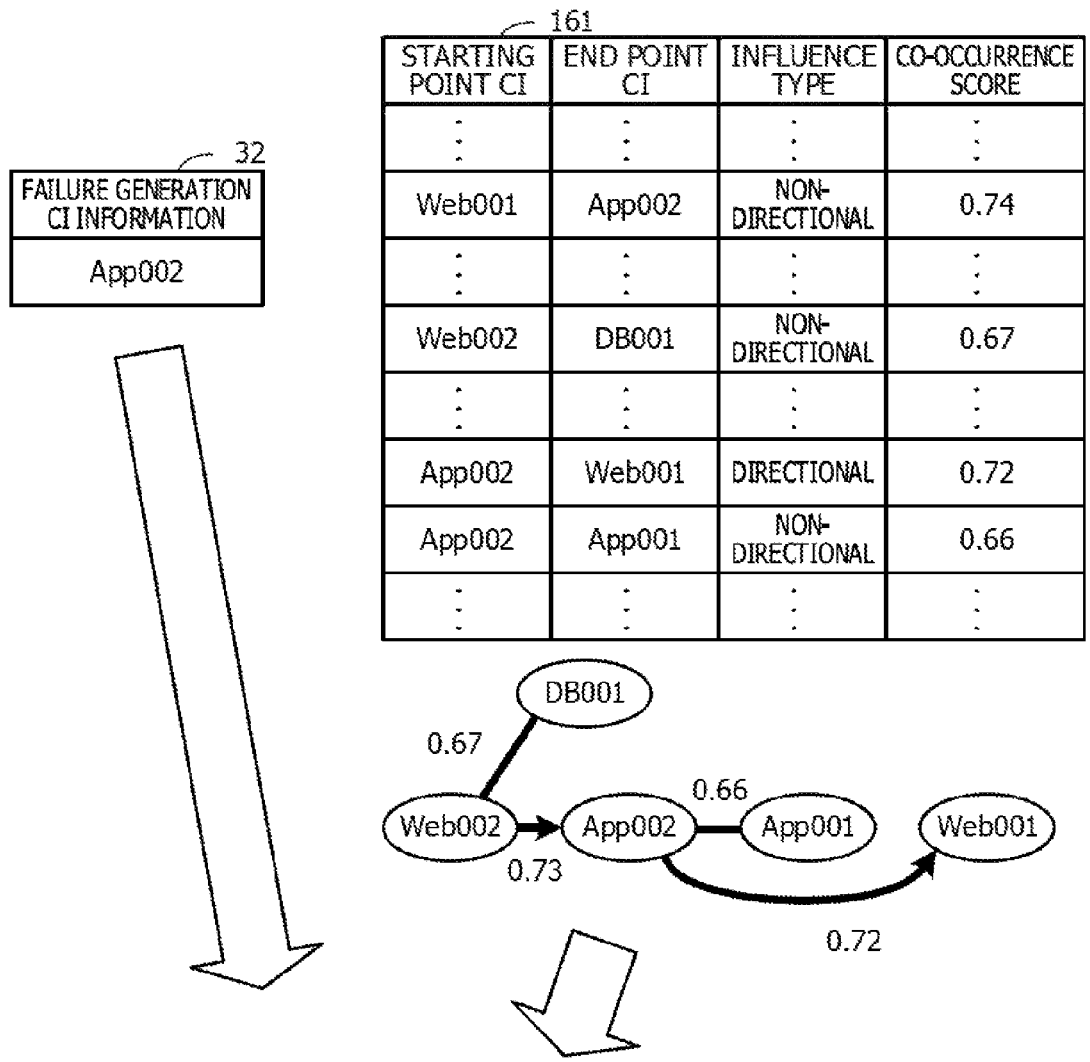
FIG. 40 illustrates an example of an output of an investigation target list due to the inter-CI influence calculation processing.

FIG. 40 illustrates an example of an output of an investigation target list due to the inter-CI influence calculation processing. The CI "App002" is depicted in the failure generation CI information 32 in the example in FIG. 40. In this case, the range of the influence on the CI "App002" is identified based on the inter-CI relevancy table 161 in the inter-CI relevancy graph storage unit 160, and the investigation target list 33 is created.

The investigation target list 33 is provided with fields of "Investigation ranking", "Investigation target", "Type" and "Score". The priority ranking of the investigation of the CIs to be investigated is set in the "Investigation ranking" field. The names of the CIs to be investigated are set in the "Investigation target" field. The types of relationships with the failure are set in the "Type" field. The types include, for example, "Cause", "Influence", and "Bi-directional". The type "Cause" indicates that the corresponding CI may be the cause of the failure. The type "Influence" indicates that the corresponding CI may be influenced by the failure. The type "Bi-directional" indicates that the corresponding CI may be the cause of the failure and may be influenced by the failure. The score indicating the priority level of the investigation is set in the "Score" field.

During the calculation of the score, when the type is "bi-directional" for example, the score is multiplied by a predetermined value (for example, "0.8") less than one as a bi-directional value with the co-occurrence score of the applicable CI serving as the criteria. Moreover, the scores of all the CIs on a path to the failure generation CI for all the CIs indirectly coupled with the failure generation CI are multiplied by the co-occurrence score of the same CI. The calculation results become the score of the CI to be investigated.

Based on the output of the investigation target list 33 in this way, the operator is able to easily judge which IC is to be investigated and is able to carry out the investigation in a suitable order. As a result, the investigation of the cause or influence of the failure can be carried out quickly.

The following is an explanation of the inter-CI influence range searching processing.

Figure 41:
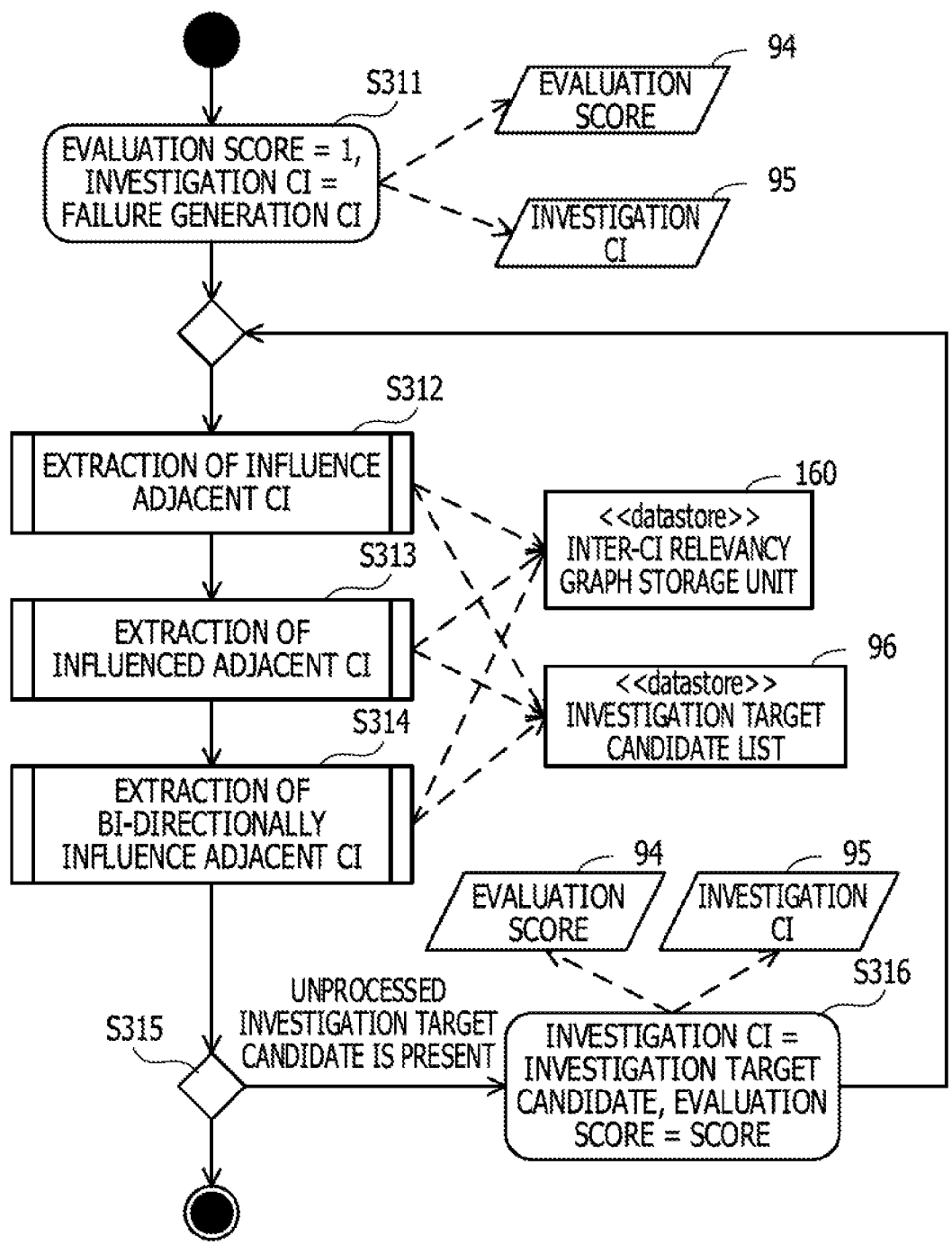
FIG. 41 is an activity diagram illustrating an example of procedures for inter-CI influence range searching processing.

FIG. 41 is an activity diagram illustrating an example of procedures for inter-CI influence range searching processing. The processing illustrated in FIG. 41 will be explained with step numbers.

[Step S311]

The inter-CI influence range searching unit 171 sets an initial value "1" as an evaluation score 94. Moreover, the inter-CI influence range searching unit 171 sets the name of the CI in which the failure is generated as an investigation CI 95.

[Step S312]

The inter-CI influence range searching unit 171 refers to the inter-CI relevancy graph storage unit 160 and carries out influence adjacent CI extraction processing. The influence adjacent CI extraction processing is processing for extracting another CI that influences the CI depicted as the investigation CI 95 among the CIs adjacent to the CI represented by the investigation CI 95. Information pertaining to the influence range of the CI is output to an investigation target candidate list 96 according to the influence adjacent CI extraction processing. Details of the influence adjacent CI extraction processing are explained below (see FIG. 43).

FIG. 42 illustrates an example of an investigation target candidate list. The investigation target candidate list 96 is provided with fields of "Investigation target", "Type" and "Score". The names of the CIs to be investigated are set in the "Investigation target" field. The types of relationships with the failure are set in the "Type" field. The score indicating the priority level of the investigation is set in the "Score" field.

The explanation now returns to FIG. 41.

[Step S313]

The inter-CI influence range searching unit 171 refers to the inter-CI relevancy graph storage unit 160 and carries out influenced adjacent CI extraction processing. The influenced adjacent CI extraction processing is processing for extracting another CI that is influenced by the CI depicted in the investigation CI 95 among the CIs adjacent to the CI represented by the investigation CI 95. Information pertaining to the influence range of the CI is output to the investigation target candidate list 96 according to the influenced adjacent CI extraction processing. Details of the influenced adjacent CI extraction processing are explained below (see FIG. 45).

[Step S314]

The inter-CI influence range searching unit 171 refers to the inter-CI relevancy graph storage unit 160 and carries out bi-directional influence adjacent CI extraction processing. The bi-directional influence adjacent CI extraction processing is processing for extracting another CI that may influence the CI depicted as the investigation CI 95 and may be influenced by the same CI among the CIs adjacent to the CI depicted as the investigation CI 95. Due to the bi-directional influence adjacent CI extraction processing, information pertaining to the influence range of the CI is output to the investigation target candidate list 96. Details of the bi-directional influence adjacent CI extraction processing are explained below (see FIG. 47).

[Step S315]

The processing of the inter-CI influence range searching unit 171 advances to step S316 if there is a CI that has not been subjected to the processing in steps S312 to S314 among the CIs of the investigation target candidates recorded in the investigation target candidate list 96. If there is no unprocessed CI, the inter-CI influence range searching unit 171 ends the inter-CI influence range searching processing.

[Step S316]

The inter-CI influence range searching unit 171 extracts one CI that has not been subjected to the processing in steps S312 to S314 from the CIs of the investigation target candidates recorded in the investigation target candidate list 96 and designates the extracted CI as the investigation CI 95. Moreover, the inter-CI influence range searching unit 171 sets the score of the extracted CI as the evaluation score 94. Thereafter, the processing of the inter-CI influence range searching unit 171 advances to step S312.

In this way, the inter-CI influence range searching processing is ended and the CIs which have an influence are listed in the investigation target candidate list 96.

Next, influence adjacent CI calculation processing will be explained.

Figure 43:
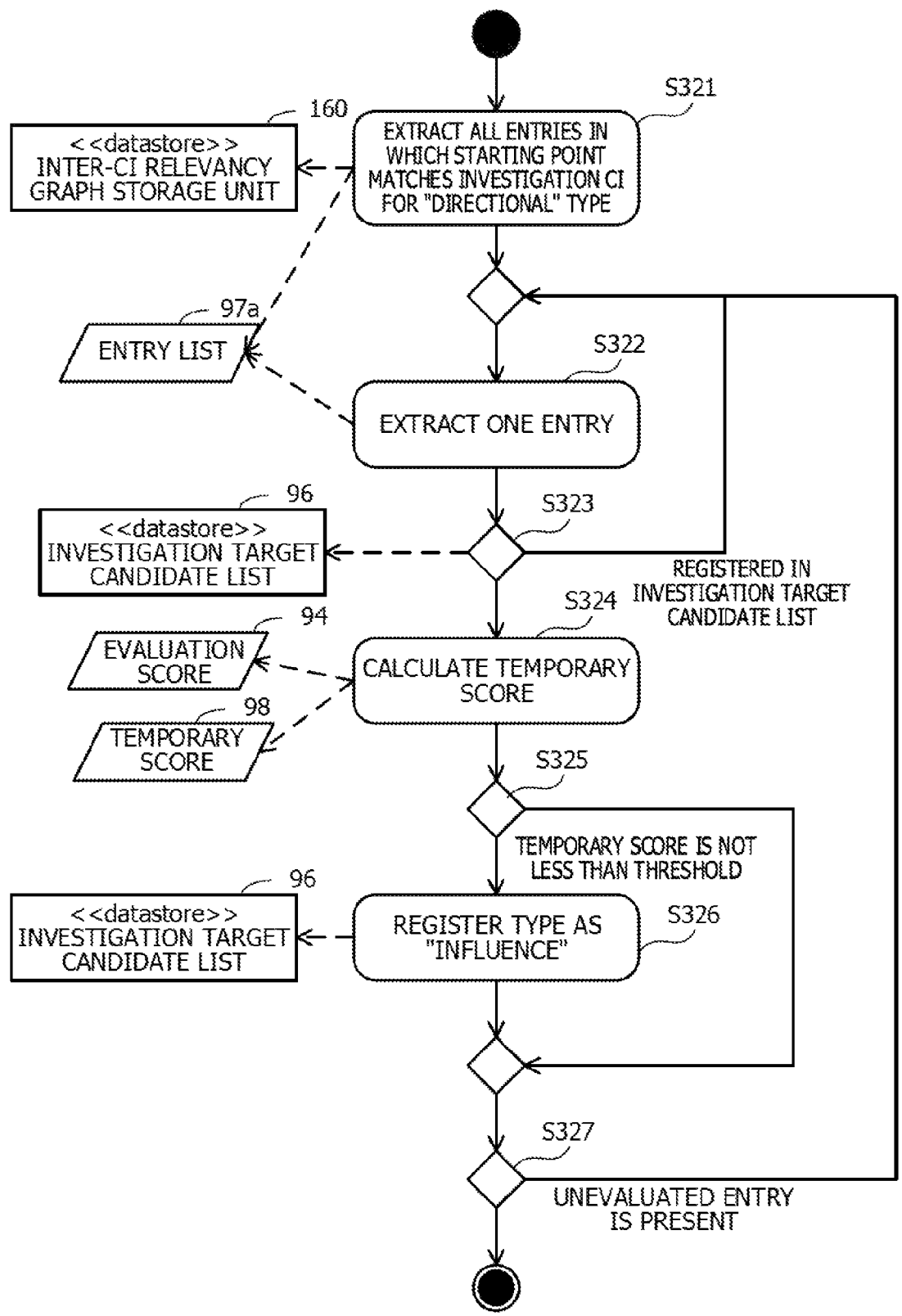
FIG. 43 is an activity diagram illustrating an example of procedures for influence adjacent CI calculation processing.

FIG. 43 is an activity diagram illustrating an example of procedures for influence adjacent CI calculation processing. The processing illustrated in FIG. 43 will be explained with step numbers.

[Step S321]

The inter-CI influence range searching unit 171 extracts all of the entries in which the starting point CI matches the investigation CI and the type is "directional" from the inter-CI relevancy graph storage unit 160. The inter-CI influence range searching unit 171 then uses the extracted entries to make an entry list 97a.

FIG. 44 illustrates an example of an entry list used in the influence adjacent CI calculation processing. The name of the investigation CI is assigned to the entry list 97a used in the influence adjacent CI calculation processing. The entry list 97a is provided with the fields of "Starting point CI", "End point CI", "Influence type", and "Score". The starting point CI of the entry extracted from the inter-CI relevancy graph storage unit 160 is set in the "Starting point CI" field. The starting point CI of the entry registered in the entry list 97a used in the influence adjacent CI calculation processing is the same as the investigation CI. The end point CI of the entry extracted from the inter-CI relevancy graph storage unit 160 is set in the "End point CI" field. The influence type of the entry extracted from the inter-CI relevancy graph storage unit 160 is set in the "Influence type" field. The influence type of the entry list 97a used in the influence adjacent CI calculation processing is "directional". The score indicating the priority level of the investigation tracing the relevancy of the set of the corresponding CIs is set in the "Score" field. The co-occurrence score of the entry extracted from the inter-CI relevancy graph storage unit 160 is set as the score at the time of registered the entry into the entry list 97a.

The explanation now returns to FIG. 43.

[Step S322]

The inter-CI influence range searching unit 171 extracts one entry from the entry list 97a.

[Step S323]

The inter-CI influence range searching unit 171 judges whether the extracted entry is already registered in the investigation target candidate list 96. If the extracted entry is already registered, the processing of the inter-CI influence range searching unit 171 advances to step S322. If the extracted entry is already registered, the processing of the inter-CI influence range searching unit 171 advances to step S322.

[Step S324]

The inter-CI influence range searching unit 171 multiplies the score of the extracted entry by the value of the evaluation score 94 to derive a temporary score 98.

[Step S325]

The inter-CI influence range searching unit 171 judges whether the value of the temporary score 98 is equal to or greater than a threshold. If the value of the temporary score 98 is equal to or greater than the threshold, the processing of the inter-CI influence range searching unit 171 advances to step S326. If the value of the temporary score 98 is less than the threshold, the processing of the inter-CI influence range searching unit 171 advances to step S327.

[Step S326]

The inter-CI influence range searching unit 171 registers the end point CI of the extracted entry in the investigation target candidate list 96 as a new entry. The inter-CI influence range searching unit 171 sets the type of the newly registered entry as "influence" and sets the value of the current temporary score 98 to the score.

[Step S327]

The inter-CI influence range searching unit 171 calculates the temporary scores 98 in the entry list 97a and judges whether there is an unevaluated entry with regard to the evaluations of whether the value of the temporary score 98 is equal to or greater than the threshold. If there is an unevaluated entry, the processing of the inter-CI influence range searching unit 171 advances to step S322. If there is no unevaluated entry, the inter-CI influence range searching unit 171 ends the influence adjacent CI calculation processing.

In this way, a CI that has the possibility of influencing the failure is derived and registered in the investigation target candidate list 96.

Next, influenced adjacent CI calculation processing will be explained.

Figure 45:
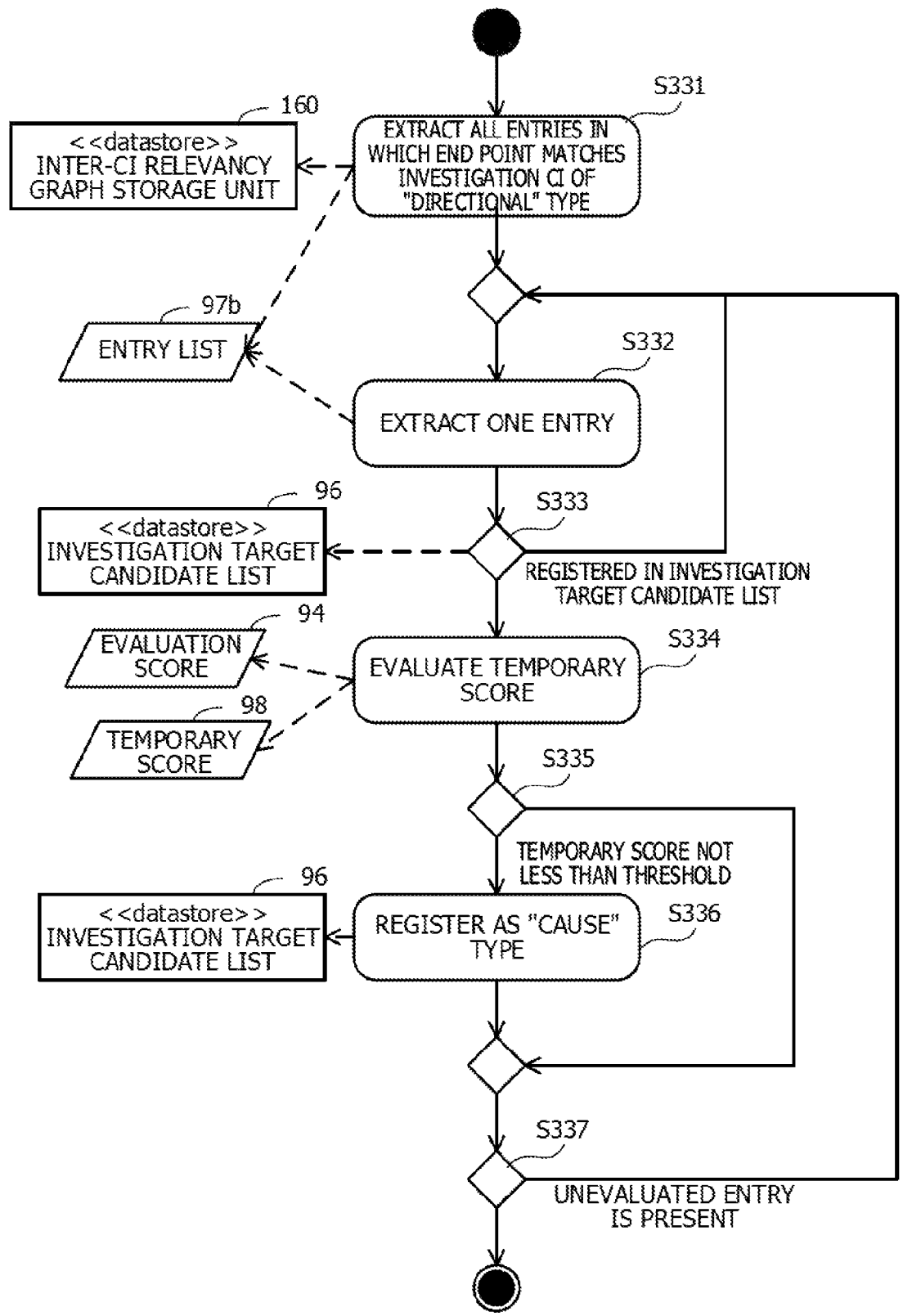
FIG. 45 is an activity diagram illustrating an example of procedures for influenced adjacent CI calculation processing.

FIG. 45 is an activity diagram illustrating an example of procedures for influenced adjacent CI calculation processing. The processing illustrated in FIG. 45 will be explained with step numbers.

[Step S331]

The inter-CI influence range searching unit 171 extracts all of the entries in which the end point CI matches the investigation CI and the type is "directional" from the inter-CI relevancy graph storage unit 160. The inter-CI influence range searching unit 171 then uses the extracted entries to make an entry list 97b.

FIG. 46 illustrates an example of an entry list used in the influenced adjacent CI calculation processing. The same information as that of the entry list 97a used in the influence adjacent CI calculation processing is set in the entry list 97b used in the influenced adjacent CI calculation processing. The end point CI of the entry registered in the entry list 97b used in the influenced adjacent CI calculation processing is the same as the investigation CI. Moreover, the influence type in the entry list 97b is "directional".

The explanation now returns to FIG. 45.

[Step S332]

The inter-CI influence range searching unit 171 extracts one entry from the entry list 97b.

[Step S333]

The inter-CI influence range searching unit 171 judges whether the extracted entry is already registered in the investigation target candidate list 96. If the extracted entry is already registered, the processing of the inter-CI influence range searching unit 171 advances to step S332. If the extracted entry is already registered, the processing of the inter-CI influence range searching unit 171 advances to step S334.

[Step S334]

The inter-CI influence range searching unit 171 multiplies the score of the extracted entry by the value of the evaluation score 94 to derive the temporary score 98.

[Step S335]

The inter-CI influence range searching unit 171 judges whether the value of the temporary score 98 is equal to or greater than a threshold. If the value of the temporary score 98 is equal to or greater than the threshold, the processing of the inter-CI influence range searching unit 171 advances to step S336. If the value of the temporary score 98 is less than the threshold, the processing of the inter-CI influence range searching unit 171 advances to step S337.

[Step S336]

The inter-CI influence range searching unit 171 registers the end point CI of the extracted entry in the investigation target candidate list 96 as a new entry. The inter-CI influence range searching unit 171 sets the type of the newly registered entry as "cause" and sets the value of the current temporary score 98 to the score.

[Step S337]

The inter-CI influence range searching unit 171 calculates the temporary scores 98 in the entry list 97b and judges whether there is an unevaluated entry with regard to the evaluations of whether the value of the temporary score 98 is equal to or greater than the threshold. If there is an unevaluated entry, the processing of the inter-CI influence range searching unit 171 advances to step S332. If there is no unevaluated entry, the inter-CI influence range searching unit 171 ends the influenced adjacent CI calculation processing.

In this way, a CI that has the possibility of being the cause the failure is derived and registered in the investigation target candidate list 96.

Next, bi-directional influence adjacent CI calculation processing will be explained.

Figure 47:
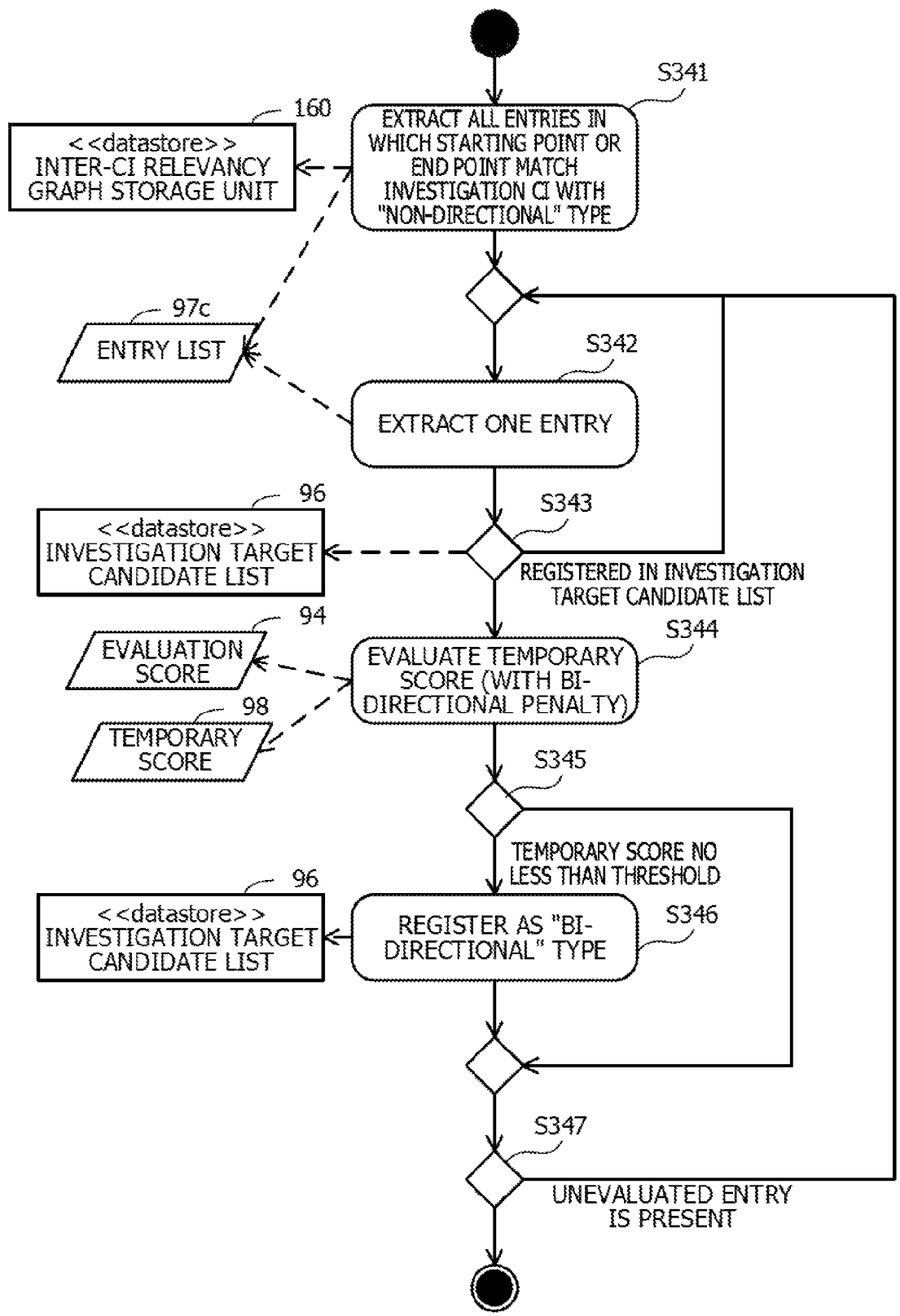
FIG. 47 is an activity diagram illustrating an example of procedures for bi-directional influence adjacent CI calculation processing.

FIG. 47 is an activity diagram illustrating an example of procedures for bi-directional influence adjacent CI calculation processing. The processing illustrated in FIG. 47 will be explained with step numbers.

[Step S341]

The inter-CI influence range searching unit 171 extracts all of the entries in which the starting point CI or end point CI matches the investigation CI and the type is "non-directional" from the inter-CI relevancy graph storage unit 160. The inter-CI influence range searching unit 171 then uses the extracted entries to make an entry list 97c.

FIG. 48 illustrates an example of an entry list used in the bi-directional influence adjacent CI calculation processing. The same information as that of the entry list 97a used in the influence adjacent CI calculation processing is set in the entry list 97c used in the bi-directional influence adjacent CI calculation processing. The starting point CI or the end point CI in the entry registered in the entry list 97c used in the bi-directional influence adjacent CI calculation processing is the same as the investigation CI. Moreover, the influence type in the entry list 97c is "non-directional".

The explanation now returns to FIG. 47.

[Step S342]

The inter-CI influence range searching unit 171 extracts one entry from the entry list 97c.

[Step S343]

The inter-CI influence range searching unit 171 judges whether the extracted entry is already registered in the investigation target candidate list 96. If the extracted entry is already registered, the processing of the inter-CI influence range searching unit 171 advances to step S342. If the extracted entry is already registered, the processing of the inter-CI influence range searching unit 171 advances to step S344.

[Step S344]

The inter-CI influence range searching unit 171 multiplies the score of the extracted entry by the value of the evaluation score 94, and multiplies the score of the extracted entry by a predetermined value less than one as the bi-directional penalty, to derive the temporary score 98.

[Step S345]

The inter-CI influence range searching unit 171 judges whether the value of the temporary score 98 is equal to or greater than a threshold. If the value of the temporary score 98 is equal to or greater than the threshold, the processing of the inter-CI influence range searching unit 171 advances to step S346. If the value of the temporary score 98 is less than the threshold, the processing of the inter-CI influence range searching unit 171 advances to step S347.

[Step S346]

The inter-CI influence range searching unit 171 registers the starting point CI of the extracted entry in the investigation target candidate list 96 as a new entry. The inter-CI influence range searching unit 171 sets the type of the newly registered entry as "bi-directional" and sets the value of the current temporary score 98 to the score.

[Step S347]

The inter-CI influence range searching unit 171 calculates the temporary scores 98 and judges whether there is an unevaluated entry in the entry list 97c with regard to the evaluations of whether the value of the temporary score 98 is equal to or greater than the threshold. If there is an unevaluated entry, the processing of the inter-CI influence range searching unit 171 advances to step S342. If there is no unevaluated entry, the inter-CI influence range searching unit 171 ends the bi-directional influence adjacent CI calculation processing.

In this way, a CI that has the possibility of influencing the failure or a CI that has the possibility of being the cause of the failure is derived and registered in the investigation target candidate list 96.

As a result of FIG. 43, FIG. 45, and FIG. 47, the investigation target candidate list 96 is acquired as illustrated in FIG. 42. The priority ranking of the investigation is not assigned for each CI listed as investigation target candidates in the investigation target candidate list 96. Accordingly, the investigation target list 33 is created by assigning the investigation ranking to the CIs of the investigation target candidates in the investigation target candidate list 96.

The investigation ranking determination processing will be explained next.

Figure 49:
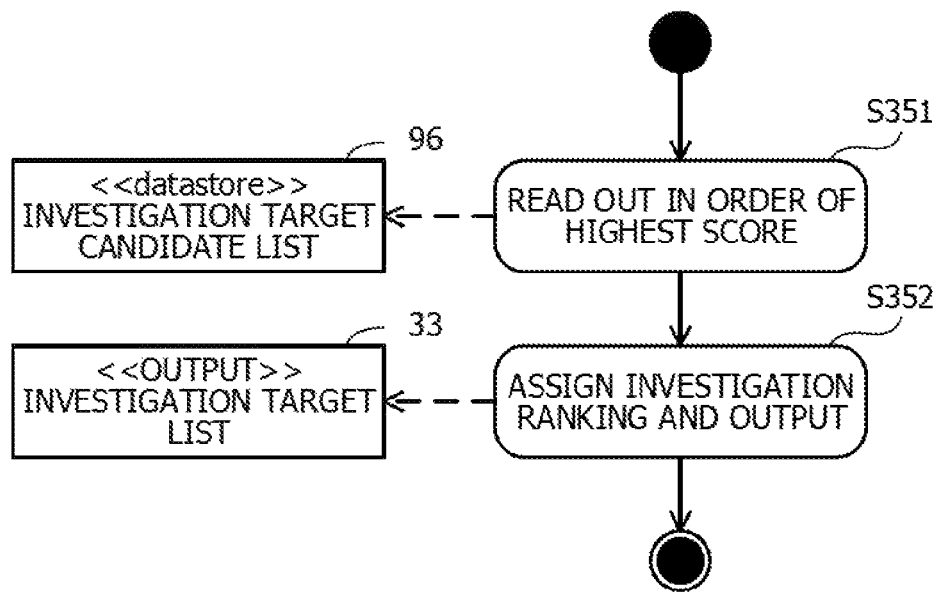
FIG. 49 is an activity diagram illustrating an example of procedures for investigation ranking determination processing.

FIG. 49 is an activity diagram illustrating an example of procedures for investigation ranking determination processing. The processing illustrated in FIG. 49 will be explained with step numbers.

[Step S351]

The investigation ranking determining unit 172 reads out the entries in the investigation target candidate list 96 in order of the highest score.

[Step S352]

The investigation ranking determining unit 172 assigns the investigation ranking in ascending order from "1" in the read out order and outputs the results as the investigation target list 33.

As a result, the investigation target list 33 in the investigation ranking is output as illustrated in FIG. 40. The investigation target list 33 is displayed, for example, on the monitor 21. The operator refers to the displayed investigation target list 33 and is able to efficiently carry out the investigation by performing the investigation in order from the CI with the highest investigation ranking. Moreover, if the management server 100 is provided with an automatic investigation function, the management server 100, for example, instructs the execution of a program for investigating from the CI with the highest investigation ranking and sends the instruction to the managed machine with the applicable CI. As a result, automatic investigations are implemented efficiently.

Third Embodiment

The following is an explanation of a third embodiment. The third embodiment involves the calculation of the strength of relevancy based on the co-occurrence probability and the number of types of co-occurrences.

For example, the inter-CI co-occurrence score calculating unit 151 integrates the co-occurrence probabilities for each type of co-occurrence relationship of the message pairs having a co-occurrence relationship generated between two CIs. The inter-CI co-occurrence score calculating unit 151 designates the integration result as an accumulated score and sets a normalized value of each accumulated score acquired for all the CI pairs as the co-occurrence score indicating the strength of relevancy between the two CIs that configure the CI pair.

FIG. 50 illustrates an example of a CI pair generation table according to the third embodiment. A generated ranking-dependent type CI pair generation table 91a and a generated ranking-independent type CI pair generation table 92a are used in the third embodiment in the same way as in the second embodiment.

The generated ranking-dependent type CI pair generation table 91a is provided with the fields of "CI1", "CI2", "Pattern ID", "Co-occurrence ID", "Co-occurrence probability", "Number of types", "Accumulated score" and "Co-occurrence score". The "CI1" field, the CI2" field, the "Pattern ID" field, the "Co-occurrence ID" field, and the "Co-occurrence probability" field are set with the same information as that of the generated ranking-dependent type CI pair generation table 91 (see FIG. 35) depicted in the second embodiment. The number of message co-occurrence patterns having a co-occurrence message pair generated from a common CI pair is set in the "Number of types" field. The total value of the co-occurrence probabilities associated with the same CI pair is set in the "Accumulated score" field. For example, the accumulated score for the CI pair CI "App001" and the CI "App002" is 1.84 (=0.99+0.85). A relative score acquired by normalizing the accumulated score for each CI pair is set as the co-occurrence score of the applicable CI pair in the "Co-occurrence score" field.

The same information as the generated ranking-dependent type CI pair generation table 91a is also stored in the generated ranking-independent type CI pair generation table 92a.

Figure 51:
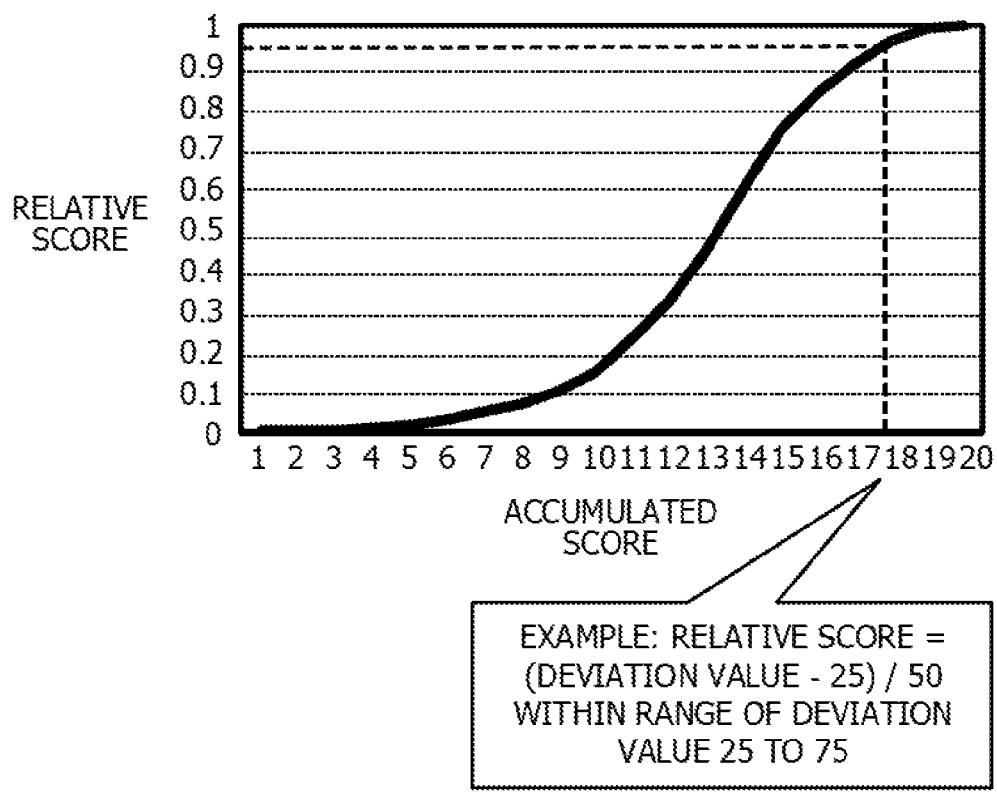
FIG. 51 illustrates an example of a method for normalizing an accumulated score according to the third embodiment.

FIG. 51 illustrates an example of a method for normalizing an accumulated score according to the third embodiment. For example, the inter-CI co-occurrence score calculating unit 151 derives a deviation value of each accumulated score based on the accumulated score for each CI pair. The inter-CI co-occurrence score calculating unit 151 sets a deviation value of "75" for a CI pair in which the calculated deviation value exceeds "75". Moreover, the inter-CI co-occurrence score calculating unit 151 sets a deviation value of "25" for a CI pair in which the calculated deviation value is less than "25". The inter-CI co-occurrence score calculating unit 151 then derives the relative score using the following equation based on the deviation value of each CI pair.

Relative score=(deviation value−25)/50

As a result, the accumulated score is normalized to a value in the range of 0 to 1. For example, if there are two types of a co-occurrence relationship having a co-occurrence probability of "0.99" and three types of a co-occurrence relationship having a co-occurrence probability of "0.80" for a certain CI pair, the accumulated score would be 4.38 (=(0.99×2)+(0.80×3)). The deviation values for the respective accumulated scores are derived from the average value and the standard deviation of the accumulated scores of all the CI pairs. The relative score normalized so that the deviation value is held within the range of 0 to 1 is used as the co-occurrence score.

Figure 52:
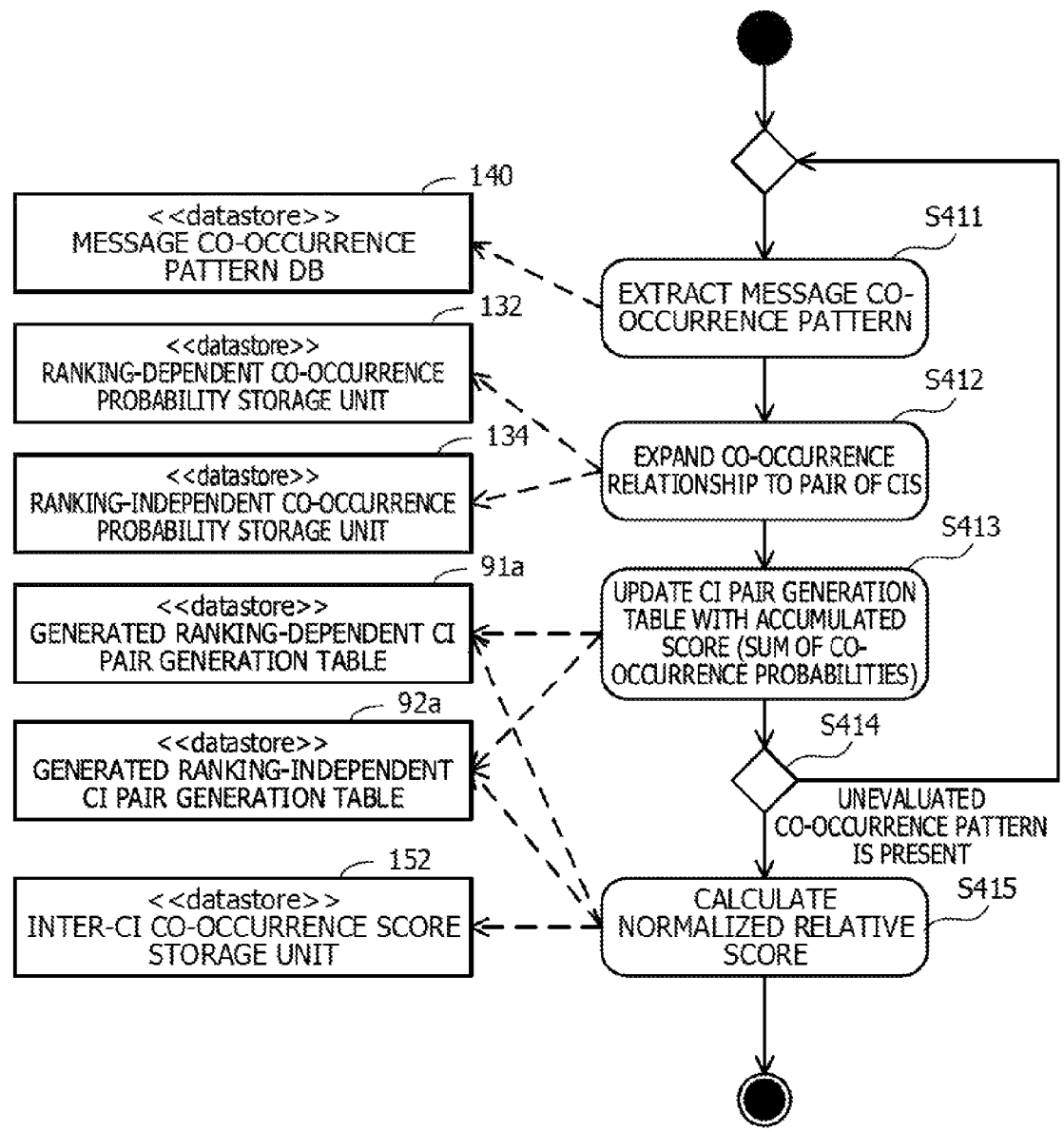
FIG. 52 is an activity diagram illustrating an example of procedures for inter-CI co-occurrence score calculation processing according to the third embodiment.

FIG. 52 is an activity diagram illustrating an example of procedures for inter-CI co-occurrence score calculation processing according to the third embodiment. The processing illustrated in FIG. 52 will be explained with step numbers.

[Step S411]
The inter-CI co-occurrence score calculating unit 151 extracts one message co-occurrence pattern from the message co-occurrence pattern DB 140.

[Step S412]
The inter-CI co-occurrence score calculating unit 151 expands the co-occurrence relationship of the extracted message co-occurrence pattern to pairs of CIs.

[Step S413]
The inter-CI co-occurrence score calculating unit 151 updates a CI pair generation table. For example, the inter-CI co-occurrence score calculating unit 151 updates the generated ranking-dependent type CI pair generation table 91a if the CI pair is extracted from a ranking-dependent co-occurrence relationship. Moreover, the inter-CI co-occurrence score calculating unit 151 updates the generated ranking-independent type CI pair generation table 92a if the CI pair is extracted from a ranking-independent co-occurrence relationship. When updating the CI pair generation tables, the inter-CI co-occurrence score calculating unit 151 adds the information of the CI pair to the generated ranking-dependent type CI pair generation table 91a or the generated ranking-independent type CI pair generation table 92a and updates the co-occurrence score corresponding to the applicable CI pair.

[Step S414]
The inter-CI co-occurrence score calculating unit 151 judges whether there is an unevaluated message co-occurrence pattern. If there is an unevaluated message co-occurrence pattern, the processing of the inter-CI co-occurrence score calculating unit 151 advances to step S411. If there is no unevaluated message co-occurrence pattern, the processing of the inter-CI co-occurrence score calculating unit 151 advances to step S415.

[Step S415]
The inter-CI co-occurrence score calculating unit 151 calculates the normalized relative score based on the accumulated score of each CI pair. For example, the inter-CI co-occurrence score calculating unit 151 refers to the generated ranking-dependent type CI pair generation table 91a, calculates the relative score of each CI pair from the accumulated score of each CI pair, and sets the result in the generated ranking-dependent type CI pair generation table 91a as the co-occurrence score. Similarly, the inter-CI co-occurrence score calculating unit 151 refers to the generated ranking-independent type CI pair generation table 92a, calculates the relative score of each CI pair from the accumulated score of each CI pair, and sets the result in the generated ranking-independent type CI pair generation table 92a as the co-occurrence score. The inter-CI co-occurrence score calculating unit 151 then extracts the co-occurrence scores set in the generated ranking-dependent type CI pair generation table 91a and the generated ranking-independent type CI pair generation table 92a, and stores the co-occurrence scores in the inter-CI co-occurrence score storage unit 152.

In this way, the co-occurrence score dependent on the co-occurrence probability and the number of types is be calculated. As a result, the strength of the relevancies between CIs can be derived more accurately.

Fourth Embodiment

The following is an explanation of a fourth embodiment. The fourth embodiment involves calculating the strength of relevancy based on the co-occurrence probability and the generation frequency of co-occurrences.

For example, for the co-occurrence relationship generated between CI pairs, the inter-CI co-occurrence score calculating unit 151 multiplies the generation frequency of the co-occurrence relationships by the co-occurrence probability, derives the total of the multiplication results of the respective co-occurrence relationships having common CI pairs, and sets the results as the accumulated score. The inter-CI co-occurrence score calculating unit 151 sets a normalized value of each accumulated score acquired for all the CI pairs as the co-occurrence score indicating the strength of relevancy between the two CIs that configure the CI pair.

FIG. 53 illustrates an example of a CI pair generation table according to the fourth embodiment. A generated ranking-dependent type CI pair generation table 91*b* and a generated ranking-independent type CI pair generation table 92*b* are used in the fourth embodiment in the same way as in the second embodiment.

The generated ranking-dependent type CI pair generation table 91*b* is provided with the fields of "CI1", "CI2", "Pattern ID", "Co-occurrence ID", "Generation frequency", "Co-occurrence probability", "Accumulated score" and "Co-occurrence score". The "CI1" field, the CI2" field, the "Pattern ID" field, the "Co-occurrence ID" field, and the "Co-occurrence probability" field are set with the same information as that of the generated ranking-dependent type CI pair generation table 91 (see FIG. 35) depicted in the second embodiment. The generation frequency of the co-occurrence relationship indicated in the corresponding co-occurrence ID is set in the "Generation frequency" field. The total value of the multiplication results of the co-occurrence probabilities and the generation frequency associated with the same CI pair is set in the "Accumulated score" field. The accumulated score of each CI pair is derived according to the following equation.

Accumulated score=Σ(generation frequency×co-occurrence probability)

For example, if a co-occurrence relationship having a co-occurrence probability of "0.99" is generated 10 times, and a co-occurrence relationship having a co-occurrence probability of "0.80" is generated 5 times, the accumulated score would be 0.927 (=((0.99×10)+(0.80×5))/(10+5)).

The relative score acquired by normalizing the accumulated score for each CI pair is set as the co-occurrence score of the applicable CI pair in the "Co-occurrence score" field.

The same information as the generated ranking-dependent type CI pair generation table 91*b* is also stored in the generated ranking-independent type CI pair generation table 92*b*.

The normalization of the accumulated score may be carried out with the same method as in the third embodiment, for example.

Figure 54:
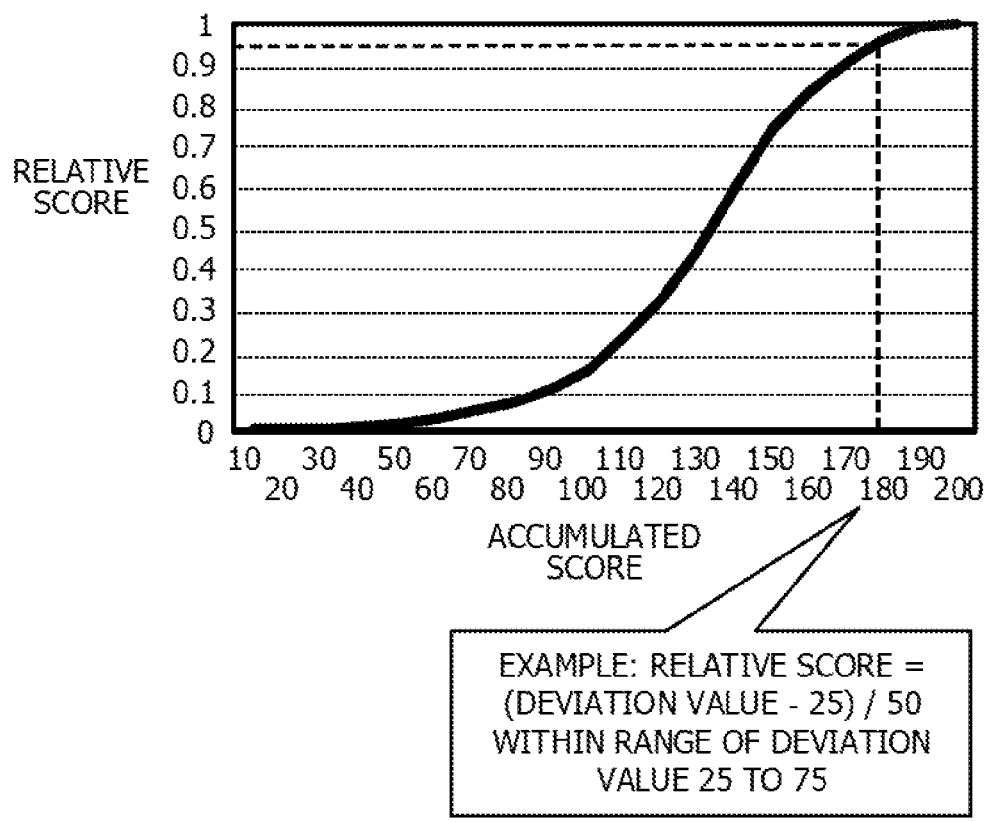
FIG. 54 illustrates an example of a method for normalizing an accumulated score according to the fourth embodiment.

FIG. 54 illustrates an example of a method for normalizing an accumulated score according to the fourth embodiment. By replacing the accumulated score with the deviation value within the range of 25 to 75 and normalizing the deviation value to a value of a range of 0 to 1, the accumulated score can be normalized in the fourth embodiment. The multiplication of the generation frequency is carried out during the calculation of the accumulated score in the fourth embodiment. As a result, the value of the accumulated score becomes larger than that of the third embodiment and a CI pair in which the accumulated score approaches "20" is generated in the example in FIG. 54.

Figure 55:
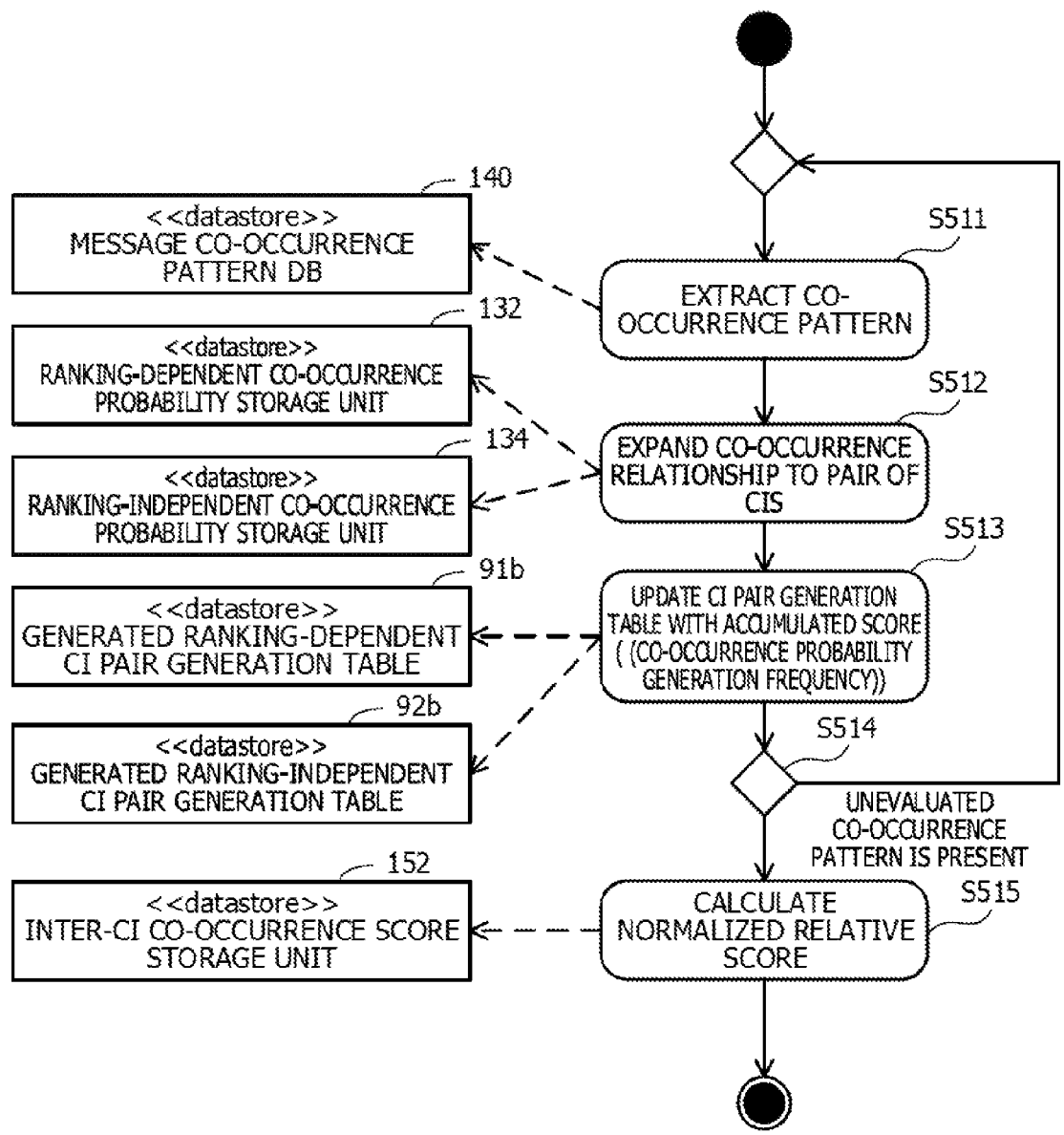
FIG. 55 is an activity diagram illustrating an example of procedures for inter-CI co-occurrence score calculation processing according to the fourth embodiment.

FIG. 55 is an activity diagram illustrating an example of procedures for inter-CI co-occurrence score calculation processing according to the fourth embodiment. The processing illustrated in FIG. 55 will be explained with step numbers.

[Step S511]
The inter-CI co-occurrence score calculating unit 151 extracts one message co-occurrence pattern from the message co-occurrence pattern DB 140.

[Step S512]
The inter-CI co-occurrence score calculating unit 151 expands the co-occurrence relationship of the extracted message co-occurrence pattern to pairs of CIs.

[Step S513]
The inter-CI co-occurrence score calculating unit 151 updates a CI pair generation table. For example, the inter-CI co-occurrence score calculating unit 151 updates the generated ranking-dependent type CI pair generation table 91*b* if the CI pair is extracted from a ranking-dependent co-occurrence relationship. Moreover, the inter-CI co-occurrence score calculating unit 151 updates the generated ranking-independent type CI pair generation table 92*b* if the CI pair is extracted from a ranking-independent co-occurrence relationship. When updating the CI pair generation tables, the inter-CI co-occurrence score calculating unit 151 adds the information of the CI pair to the generated ranking-dependent type CI pair generation table 91*b* or the generated ranking-independent type CI pair generation table 92*b* and updates the accumulated score corresponding to the applicable CI pair. The total value of the results of multiplying the generation frequency by each co-occurrence probability is used in the accumulated score calculations.

[Step S514]
The inter-CI co-occurrence score calculating unit 151 judges whether there is an unevaluated message co-occurrence pattern. If there is an unevaluated message co-occurrence pattern, the processing of the inter-CI co-occurrence score calculating unit 151 advances to step S511. If there is no unevaluated message co-occurrence pattern, the processing of the inter-CI co-occurrence score calculating unit 151 advances to step S515.

[Step S515]
The inter-CI co-occurrence score calculating unit 151 calculates the normalized relative score based on the accumulated score of each CI pair. For example, the inter-CI co-occurrence score calculating unit 151 refers to the generated ranking-dependent type CI pair generation table 91*b*, calculates the relative score of each CI pair from the accumulated score of each CI pair, and sets the result in the generated ranking-dependent type CI pair generation table 91*b* as the co-occurrence score. Similarly, the inter-CI co-occurrence score calculating unit 151 refers to the generated ranking-independent type CI pair generation table 92*b*, calculates the relative score of each CI pair from the accumulated score of each CI pair, and sets the result in the generated ranking-independent type CI pair generation table 92*b* as the co-occurrence score. The inter-CI co-occurrence score calculating unit 151 then extracts the co-occurrence scores set in the generated ranking-dependent type CI pair generation table 91*b* and the generated ranking-independent type CI pair generation table 92*b*, and stores the co-occurrence scores in the inter-CI co-occurrence score storage unit 152.

In this way, the co-occurrence score dependent on the co-occurrence probability and the generation frequency is calculated. As a result, the strength of the relevancies between CIs can be derived more accurately.

Fifth Embodiment

The following is an explanation of a fifth embodiment. The fifth embodiment involves the calculation of the strength of relevancy based on the co-occurrence probability, the number of types of co-occurrences, and the generation frequency of the co-occurrences.

Figure 56:
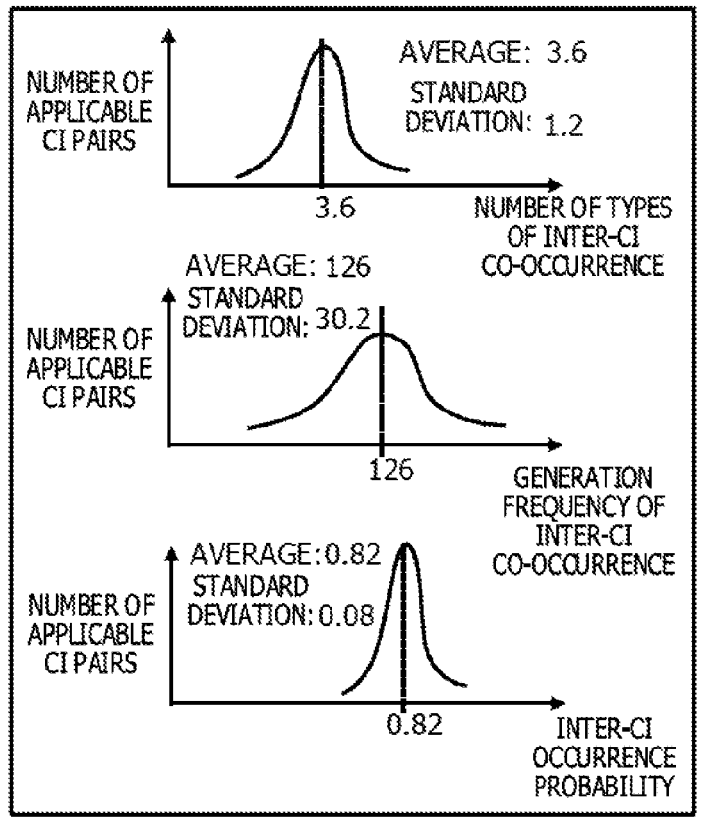
FIG. 56 illustrates an example of calculating strength of relevancy according to a fifth embodiment.

FIG. 56 illustrates an example of calculating strength of relevancy according to the fifth embodiment. For example, the inter-CI co-occurrence score calculating unit 151 makes a distribution with the following three variables for the co-occurrence relationship between CIs that have emerged.

The number of types of co-occurrence relationships seen between the CIs.

The generation frequency of the co-occurrence relationships seen between the ICs.

The co-occurrence probability between the CIs.

The average and the standard deviation are derived from the distribution conditions of each value. Accordingly, the deviation value for each variable is determined for the respective CI pairs. The value of the variable of the CI pair is x, the average value derived by the distribution of the variable is (bar x), and the standard deviation is $\sigma_x$. In this case, the deviation value (s) would be s=(10 (x−(bar x))/$\sigma_x$+50. The deviation values of the number of types of co-occurrence relationships, the generation frequency of the co-occurrence relationships, and the co-occurrence probability are derived for one CI pair. The value of the normalized sum of the deviation values is the strength of relevancy of the applicable CI pair.

The inter-CI co-occurrence score calculating unit 151 uses the CI pair generation table to manage the values used in the calculation of the strength of relevancy.

FIG. 57 illustrates an example of a CI pair generation table according to the fifth embodiment. A generated ranking-dependent type CI pair generation table 91c and a generated ranking-independent type CI pair generation table 92c are used in the fifth embodiment in the same way as in the second embodiment.

The generated ranking-dependent type CI pair generation table 91c is provided with the fields of "CI1", "CI2", "Pattern ID", "Co-occurrence ID", "Generation frequency", "Co-occurrence probability", "Number of types", "Total number of generations", "Deviation value of number of types", "Deviation value of number of generations", "Deviation value of probability", "Sum of deviation values", and "Co-occurrence score". The "CI1" field, the CI2" field, the "Pattern ID" field, the "Co-occurrence ID" field, the "Frequency generation" field, the "Co-occurrence probability" field, and the "Number of types" field are set with the same information as in the fields of the same names in the generated ranking-dependent type CI pair generation tables 91, 91a, and 91b in the respective second to fourth embodiments. The total of the generation frequencies of the corresponding CI pair is set in the "Total number of generations" field. The deviation value of the number of types is set in the "Deviation value of number of types" field. The deviation value of the total number of generations is set in the "Deviation value of number of generation" field. The deviation value of the co-occurrence probabilities is set in the "Deviation value of probability" field. The sum of the deviation value of the number of types, the deviation value of the total number of generations, and the deviation value of the co-occurrence probabilities is set in the "Sum of deviation values" field. The relative score acquired by normalizing the sum of the deviation values is set in the "Co-occurrence score" field as the co-occurrence score of the corresponding CI pair. The normalization method is the same as that of the third and fourth embodiments.

The same information as the generated ranking-dependent type CI pair generation table 91c is also stored in the generated ranking-independent type CI pair generation table 92c.

Figure 58:
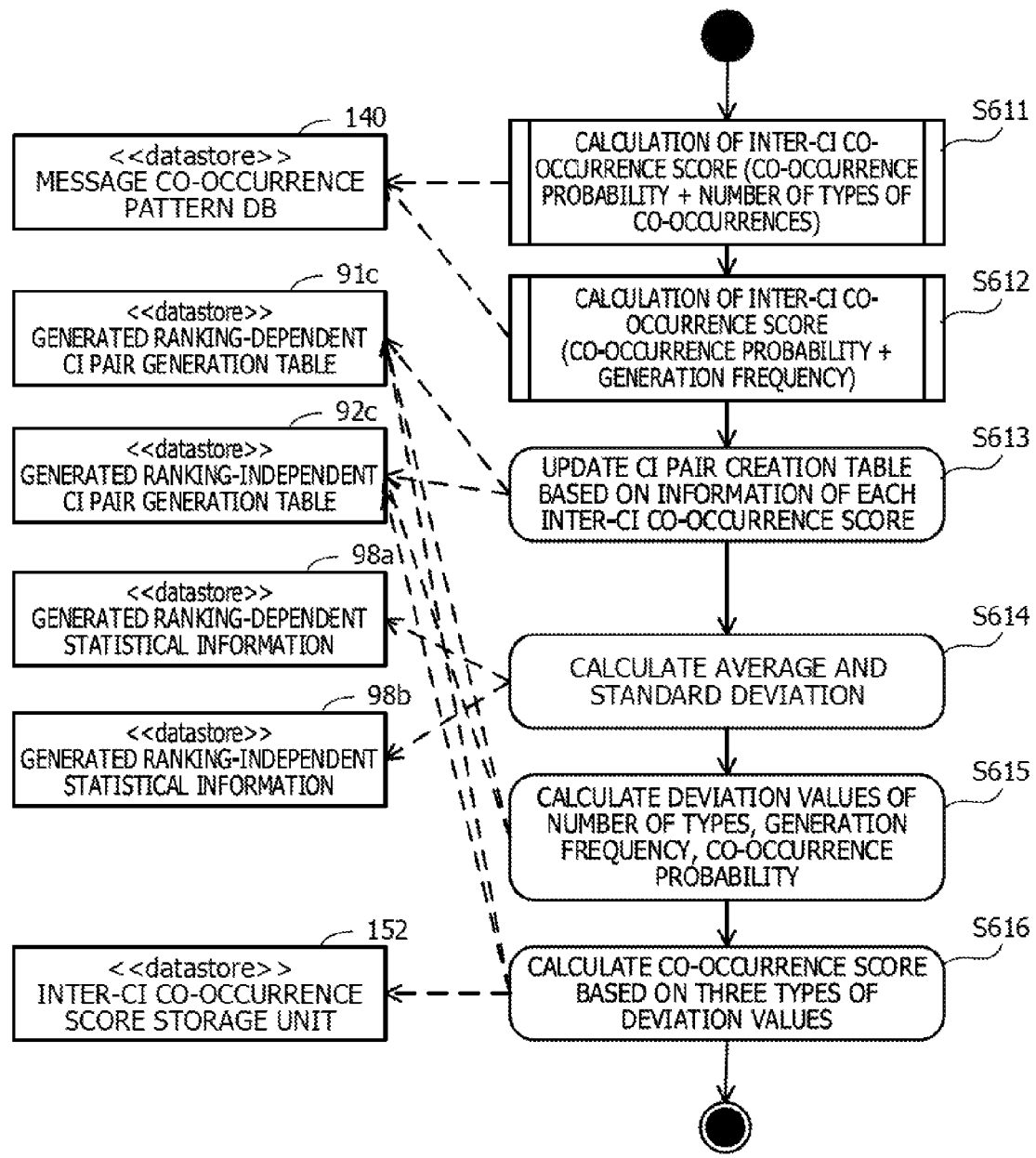
FIG. 58 is an activity diagram illustrating an example of procedures for inter-CI co-occurrence score calculation processing according to the fifth embodiment.

FIG. 58 is an activity diagram illustrating an example of procedures for inter-CI co-occurrence score calculation processing according to the fifth embodiment. The processing illustrated in FIG. 58 will be explained with step numbers.

[Step S611]

The inter-CI co-occurrence score calculating unit 151 carries out the inter-CI co-occurrence score calculation processing based on the co-occurrence probability and the number of types of co-occurrences. The details of this processing is as illustrated in FIG. 52.

[Step S612]

The inter-CI co-occurrence score calculating unit 151 carries out the inter-CI co-occurrence score calculation processing based on the co-occurrence probability and the generation frequency. The details of this processing is as illustrated in FIG. 55.

[Step S613]

The inter-CI co-occurrence score calculating unit 151 uses the information acquired in the co-occurrence score calculation steps in steps S611 and S612, and updates the generated ranking-dependent type CI pair generation table 91c and the generated ranking-independent type CI pair generation table 92c. For example, the co-occurrence ID, the generation frequency, the co-occurrence probability, and the number of types are set in association with the CI pair in the generated ranking-dependent type CI pair generation table 91c and the generated ranking-independent type CI pair generation table 92c.

[Step S614]

The inter-CI co-occurrence score calculating unit 151 calculates the average and the standard deviation for the number of types, the generation frequency, and the co-occurrence probability when dependent on and when independent of the generated order. The inter-CI co-occurrence score calculating unit 151 stores the calculated values in generated ranking-dependent type statistical information 98a and generated ranking-independent type statistical information 98b.

Figure 59:
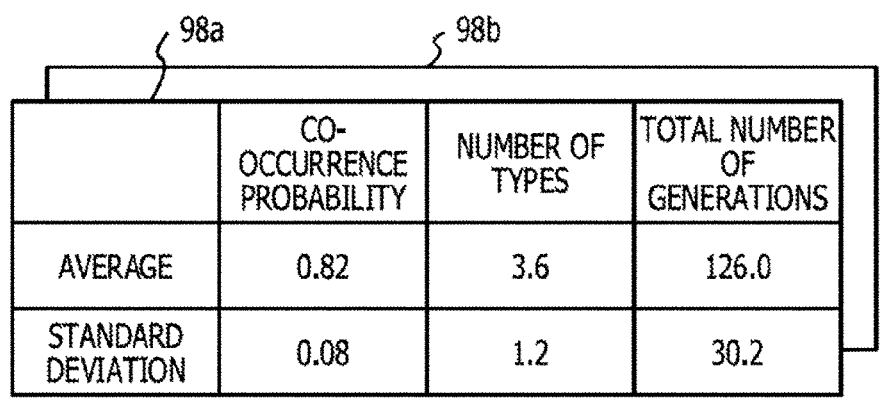
FIG. 59 illustrates an example of statistical information.

FIG. 59 illustrates an example of statistical information. The averages and the standard deviations of the respective co-occurrence probability, the number of types, and the total number of generations pertaining to the co-occurrence relationship dependent on the generated ranking, are set in the generated ranking-dependent type statistical information 98a. Similarly, the averages and the standard deviations of the respective co-occurrence probability, the number of types, and the total number of generations pertaining to the co-occurrence relationship not dependent on the generated ranking, are set in the generated ranking-independent type statistical information 98b.

The explanation now returns to FIG. 58.

[Step S615]

The inter-CI co-occurrence score calculating unit 151 calculates the deviation value of the number of types, the deviation value of the generation frequency, and the deviation value of the co-occurrence probability for each CI pair. The inter-CI co-occurrence score calculating unit 151 then sets the calculated deviation values in the generated ranking-dependent type CI pair generation table 91c and the generated ranking-independent type CI pair generation table 92c.

[Step S616]

The inter-CI co-occurrence score calculating unit 151 refers to the generated ranking-dependent type CI pair generation table 91c and calculates the sum (sum of deviation values) of the three types of deviation values for each CI pair, normalizes the sum of deviation values for each pair, and derives the generated ranking-dependent type co-occurrence score. Moreover, the inter-CI co-occurrence score calculating unit 151 refers to the generated ranking-independent type CI pair generation table 92c and calculates the sum (sum of deviation values) of the three types of deviation values for each CI pair, normalizes the sum of deviation values for each pair, and derives the generated ranking-independent type co-occurrence score. The inter-CI co-occurrence score calculating unit 151 sets the ranking-dependent type co-occurrence score (directional) and the ranking-independent type co-occurrence score (non-directional) calculated for each CI pair, in the inter-CI co-occurrence score storage unit 152.

In this way, the co-occurrence score dependent on the co-occurrence probability, the number of types of co-occurrences, and the generation frequency is calculated. As a result, the strength of the relevancies between CIs can be derived more accurately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented method comprising:
   acquiring, from a system to be monitored, a plurality of messages output by a plurality of configuration items in the system, each of the plurality of messages including an output time;
   referring to the plurality of messages and setting a plurality of configuration item pairs which combine two configuration items among the plurality of configuration items, as target configuration item pairs;
   first determining, for each of the plurality of configuration item pairs, a strength of relevancy between the target configuration item pairs based on a first co-occurrence probability which indicates a probability that a message is output from one configuration item of a target configuration item pair within a prescribed time period before or after the output time of a message output from the other configuration item of the target configuration item pair; and
   second determining, by a processor, a priority ranking for investigating one or more of the configuration items among the plurality of configuration items other than a certain configuration item based on the strength of relevancy of each of the plurality of configuration item pairs, as a response to an input of an investigation ranking determination instruction which designates the certain configuration item among the plurality of configuration items as an investigation start position.

2. The computer-implemented method according to claim 1, wherein the system includes a plurality of managed machines.

3. The computer-implemented method according to claim 1, further comprising:
   receiving the input of the investigation ranking determination instruction.

4. The computer-implemented method according to claim 1, further comprising:
   investigating the one or more configuration items according to the determined priority ranking of investigating.

5. The computer-implemented method according to claim 1, further comprising:
   outputting a list indicating the one or more configuration items with regard to the determined priority ranking of investigating.

6. The computer-implemented method according to claim 1, wherein:
   the first determining includes
      extracting, from a plurality of message groups as a co-occurrence message pair, a set of two message groups for which a second co-occurrence probability, which indicates a probability that a message belonging to one message group among the plurality of message groups is output within a certain time period before or after an output time of a message belonging to another message group among the plurality of message groups, is equal to or greater than a threshold, each message group of the plurality of message groups including one or more messages for which a configuration item that output the message and the type of the output message are shared, and
   the first co-occurrence probability is the co-occurrence probability of a co-occurrence message pair which is a set of message groups in which respective configuration items that configure the target configuration item pair are output origins of the message.

7. The computer-implemented method according to claim 6, wherein:
   the co-occurrence message pair includes a plurality of co-occurrence message pairs, and
   the first determining determines the strength of relevancy between the target configuration item pairs based on a co-occurrence probability of a highest value among the first co-occurrence probabilities of each of the plurality of co-occurrence message pairs.

8. The computer-implemented method according to claim 6, wherein:
   the co-occurrence message pair includes a plurality of co-occurrence message pairs, and
   the first determining determines the strength of relevancy between the target configuration item pairs based on a total value of the first co-occurrence probabilities for each of the plurality of co-occurrence message pairs.

9. The computer-implemented method according to claim 6, wherein:
   the first determining determines the strength of relevancy between the target configuration item pairs based on the co-occurrence probability of the co-occurrence message pair and a frequency in which the message belonging to the one message group is output within the certain time period before and after the output time of the message belonging to the other message group.

10. The computer-implemented method according to claim 6, wherein:
   the first determining determines the strength of relevancy between the target configuration item pairs based on a number of extractions of the co-occurrence message pairs extracted by the extracting, a co-occurrence probability of the co-occurrence message pair, and a frequency in which the message belonging to the one message group is output within a certain time period before and after the output time of the message belonging to the other message group for each of the co-occurrence message pairs.

11. The computer-implemented method according to claim 6, wherein:
the second determining includes
third determining, as investigation target configuration items, configuration items that can be reached by tracing relevancy of configuration item pairs having a relevancy strength equal to or greater than a predetermined value from the certain configuration item, and
fourth determining the priority ranking of the investigating of the determined investigation target configuration items.

12. The computer-implemented method according to claim 11, wherein:
the third determining includes
calculating a priority level of the investigating based on the relevancy strength traced from the certain configuration item to the investigation target configuration item, based on each of the investigation target configuration items, and
the fourth determining determines the priority ranking of the investigating in response to the calculated priority level of the investigating for each of the investigation target configuration items.

13. The computer-implemented method according to claim 12, wherein:
the extracting includes
setting, as a ranking-dependent co-occurrence message pair, a set of two message groups in which a third co-occurrence probability of a message belonging to the one message group being output within a certain time period after the output of the message belonging to the other message group, is equal to or greater than the threshold, and
setting a set of two message groups in which the second co-occurrence probability is equal to or greater than the threshold, as a ranking-independent co-occurrence message pair,
the first determining includes
calculating a directional strength of relevancy based on the ranking-dependent co-occurrence message pair and a non-directional strength of relevancy based on the ranking-independent co-occurrence message pair, for each of the plurality of configuration item pairs, and
the calculating the priority level of the investigating includes
weighting the directional strength of relevancy higher than the non-directional strength of relevancy.

14. A system comprising:
a memory; and
a processor coupled to the memory and configured to:
acquire, from a system to be monitored, a plurality of messages output by a plurality of configuration items in the system, each of the plurality of messages including an output time,
refer to the plurality of messages and setting a plurality of configuration item pairs which combine two configuration items among the plurality of configuration items, as target configuration item pairs,
determine, for each of the plurality of configuration item pairs, a strength of relevancy between the target configuration item pairs based on a first co-occurrence probability which indicates a probability that a message is output from one configuration item of a target configuration item pair within a prescribed time period before or after the output time of a message output from the other configuration item of the target configuration item pair, and
determine a priority ranking for investigating one or more of the configuration items among the plurality of configuration items other than a certain configuration item based on the strength of relevancy of each of the plurality of configuration item pairs, as a response to an input of an investigation ranking determination instruction which designates the certain configuration item among the plurality of configuration items as an investigation start position.

15. A non-transitory storage medium storing a program for causing a computer to execute a process, the process comprising:
acquiring, from a system to be monitored, a plurality of messages output by a plurality of configuration items in the system, each of the plurality of messages including an output time;
referring to the plurality of messages and setting a plurality of configuration item pairs which combine two configuration items among the plurality of configuration items, as target configuration item pairs;
first determining, for each of the plurality of configuration item pairs, a strength of relevancy between the target configuration item pairs based on a first co-occurrence probability which indicates a probability that a message is output from one configuration item of a target configuration item pair within a prescribed time period before or after the output time of a message output from the other configuration item of the target configuration item pair; and
second determining a priority ranking for investigating one or more of the configuration items among the plurality of configuration items other than a certain configuration item based on the strength of relevancy of each of the plurality of configuration item pairs, as a response to an input of an investigation ranking determination instruction which designates the certain configuration item among the plurality of configuration items as an investigation start position.

* * * * *